(12) United States Patent
Morton

(10) Patent No.: US 6,317,819 B1
(45) Date of Patent: Nov. 13, 2001

(54) DIGITAL SIGNAL PROCESSOR CONTAINING SCALAR PROCESSOR AND A PLURALITY OF VECTOR PROCESSORS OPERATING FROM A SINGLE INSTRUCTION

(76) Inventor: Steven G. Morton, 39 Old Good Hill Rd., Oxford, CT (US) 06478

( * ) Notice: Subject to any disclaimer, the term of this patent is extended or adjusted under 35 U.S.C. 154(b) by 0 days.

(21) Appl. No.: 09/256,961

(22) Filed: Feb. 24, 1999

Related U.S. Application Data

(63) Continuation-in-part of application No. 09/158,208, filed on Sep. 22, 1968, now Pat. No. 6,088,783, which is a continuation of application No. 08/602,220, filed on Feb. 16, 1996, now Pat. No. 5,822,606.
(60) Provisional application No. 60/077,041, filed on Mar. 6, 1998, and provisional application No. 60/009,800, filed on Jan. 11, 1996.

(51) Int. Cl.[7] ............................................. G06F 15/80
(52) U.S. Cl. ................................ 712/22; 712/2; 712/10; 711/147
(58) Field of Search .............................. 712/22, 2, 7, 20, 712/21; 711/147, 168; 713/502

(56) References Cited

U.S. PATENT DOCUMENTS

| | | | |
|---|---|---|---|
| 4,622,632 | 11/1986 | Tanimoto et al. | 364/200 |
| 4,641,350 | 2/1987 | Bunn | 382/4 |
| 4,807,115 | 2/1989 | Torng | 364/200 |
| 4,845,610 | 7/1989 | Parvin | 364/200 |
| 4,992,933 | 2/1991 | Taylor | 364/200 |
| 5,203,002 | 4/1993 | Wetzel | 395/800 |
| 5,313,551 | 5/1994 | Labrousse et al. | 395/425 |
| 5,353,426 | 10/1994 | Patel et al. | 395/425 |
| 5,465,373 | 11/1995 | Kahle et al. | 395/800 |
| 5,504,931 | 4/1996 | Furtek | 395/800 |
| 5,522,083 * | 5/1996 | Gove et al. | 712/22 |
| 5,555,428 * | 9/1996 | Radigan et al. | 712/22 |
| 5,574,939 | 11/1996 | Keckler et al. | 395/800 |
| 5,655,133 | 8/1997 | Dupree et al. | 395/800.23 |
| 5,680,597 | 10/1997 | Kumar et al. | 395/567 |
| 5,682,491 | 10/1997 | Pechanek et al. | 395/385 |
| 5,692,210 | 11/1997 | Mita et al. | 395/800 |
| 5,727,229 | 3/1998 | Kan et al. | 395/800 |
| 5,752,068 | 5/1998 | Gilbert | 395/800.16 |
| 5,761,726 * | 6/1998 | Guttag et al. | 711/147 |
| 5,765,037 * | 6/1998 | Morrison et al. | 713/502 |
| 5,778,244 | 7/1998 | Putnins et al. | 395/800.5 |
| 5,892,926 | 6/1999 | Cloutier | 395/800.16 |
| 6,038,647 * | 3/2000 | Shimizu | 711/168 |

* cited by examiner

Primary Examiner—Zarni Maung
Assistant Examiner—Wen-Tai Lin

(57) ABSTRACT

A digital data processor integrated circuit (1) includes a plurality of functionally identical first processor elements (6A) and a second processor element (5). The first processor elements are bidirectionally coupled to a first cache (12) via a crossbar switch matrix (8). The second processor element is coupled to a second cache (11). Each of the first cache and the second cache contain a two-way, set-associative cache memory that uses a least-recently-used (LRU) replacement algorithm and that operates with a use-as-fill mode to minimize a number of wait states said processor elements need experience before continuing execution after a cache-miss. An operation of each of the first processor elements and an operation of the second processor element are locked together during an execution of a single instruction read from the second cache. The instruction specifies, in a first portion that is coupled in common to each of the plurality of first processor elements, the operation of each of the plurality of first processor elements in parallel. A second portion of the instruction specifies the operation of the second processor element. Also included is a motion estimator (7) and an internal data bus coupling together a first parallel port (3A), a second parallel port (3B), a third parallel port (3C), an external memory interface (2), and a data input/output of the first cache and the second cache.

11 Claims, 46 Drawing Sheets

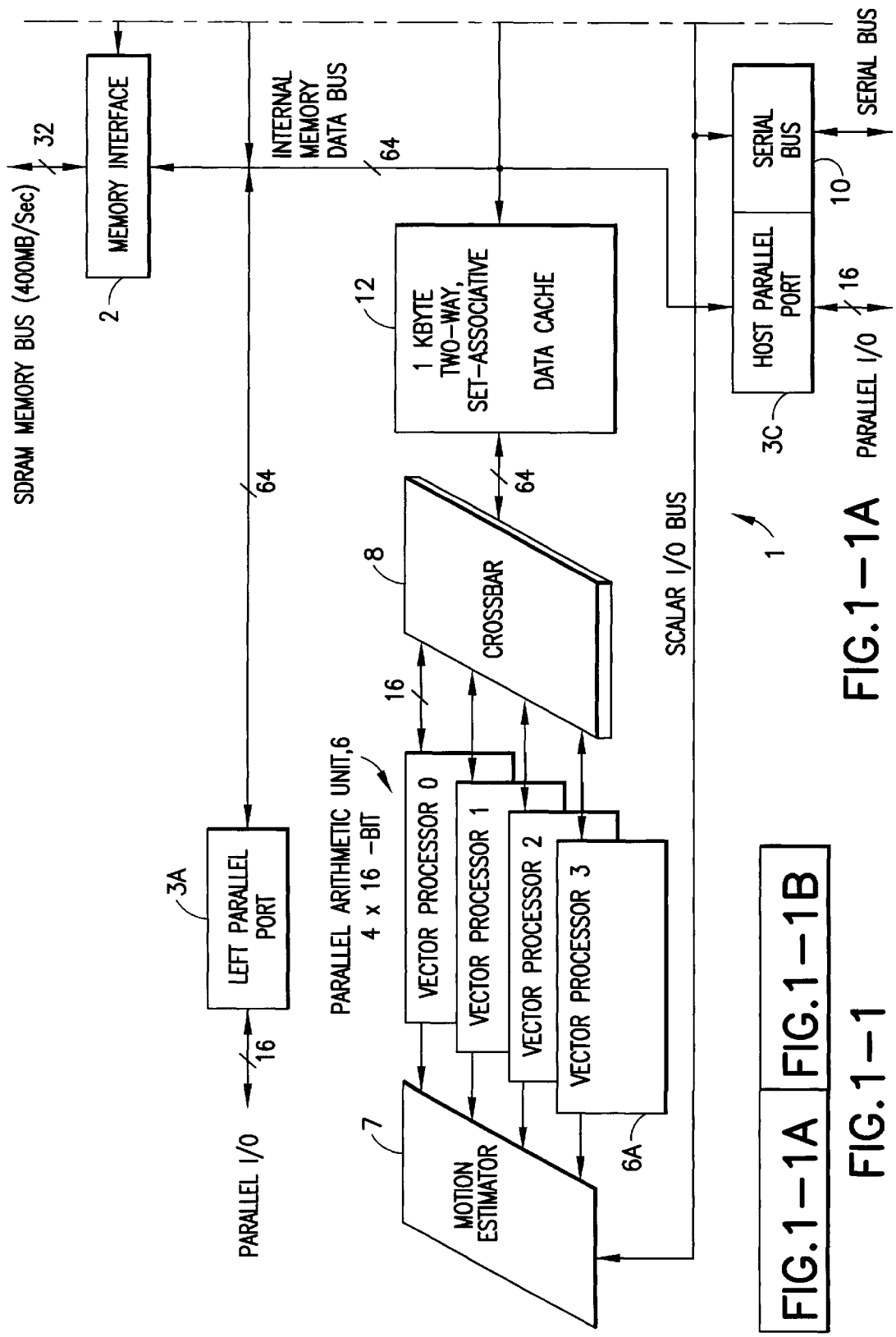

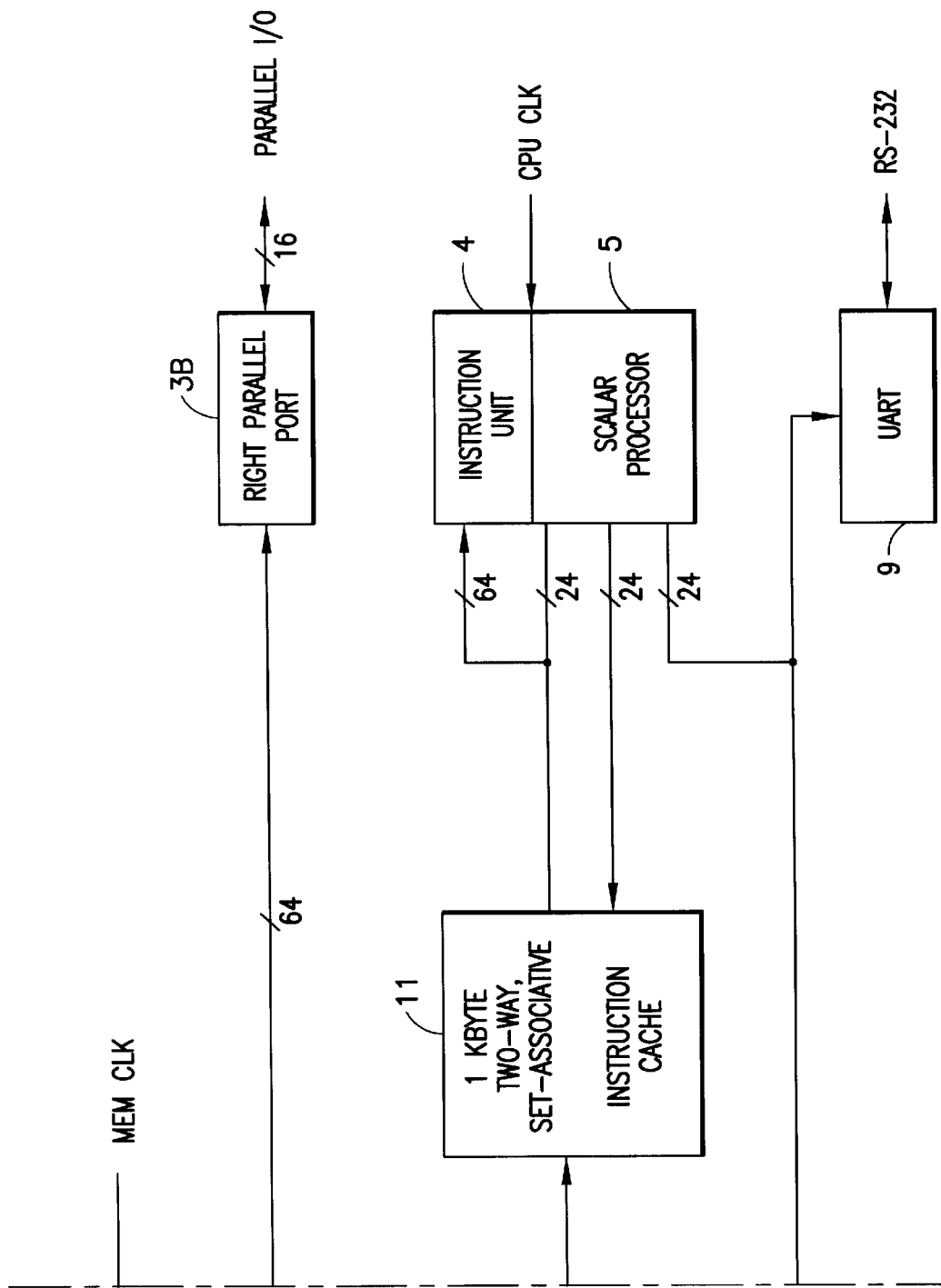

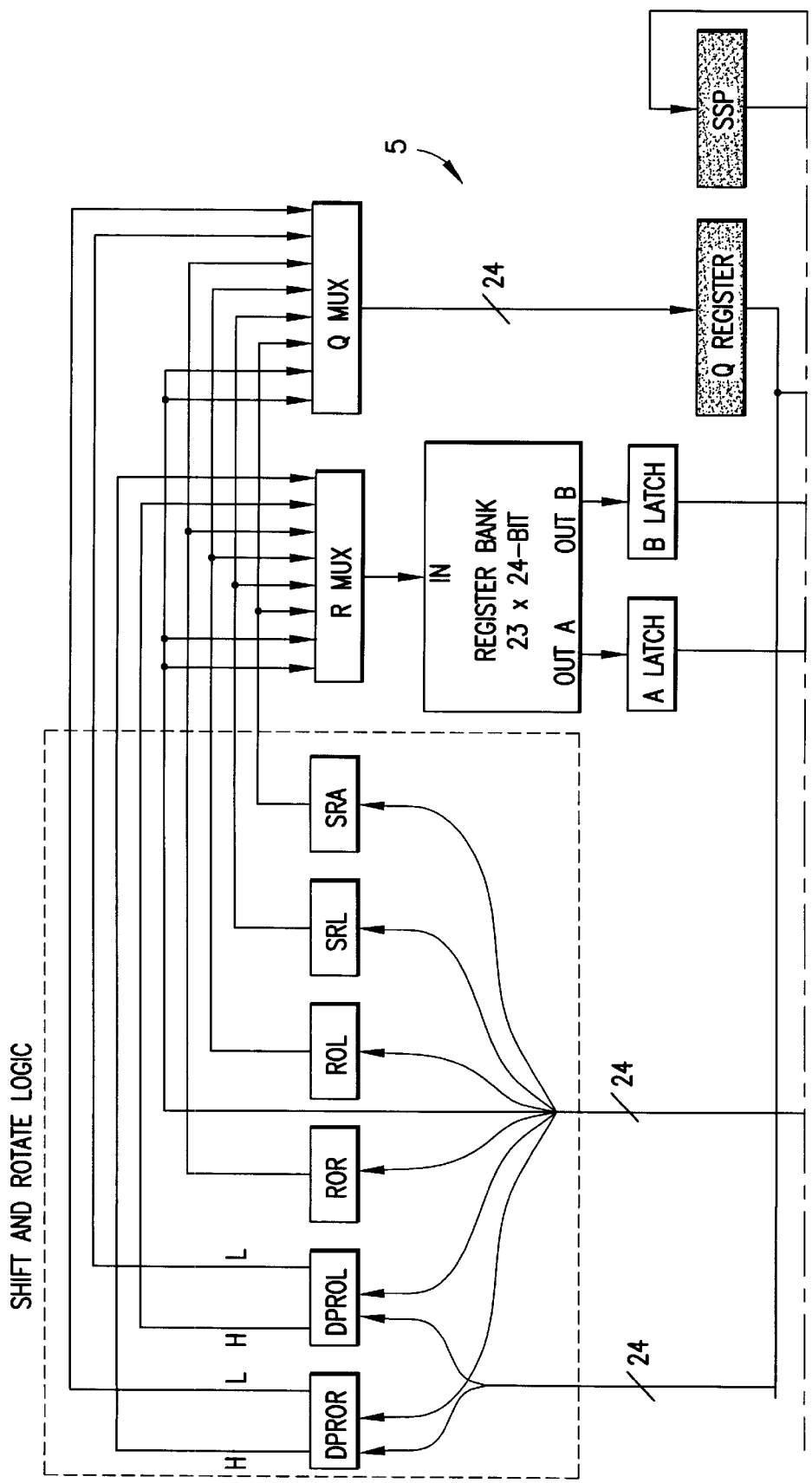

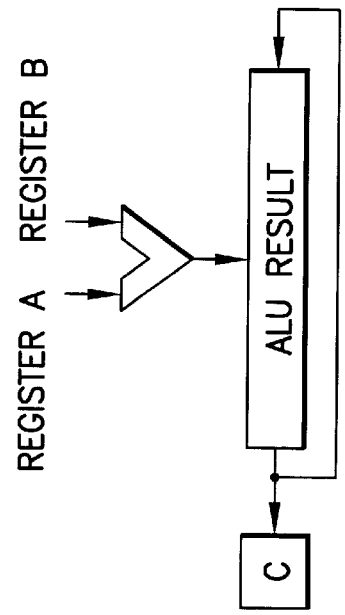
ROTATE LEFT LOGICAL
FIG.5.5.1.2
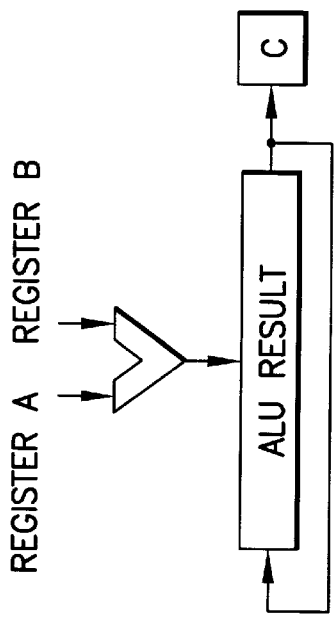
ROTATE RIGHT LOGICAL
FIG.5.5.1.1
SHIFT RIGHT LOGICAL
FIG.5.5.2.2
SHIFT RIGHT ARITHMETIC
FIG.5.5.2.1

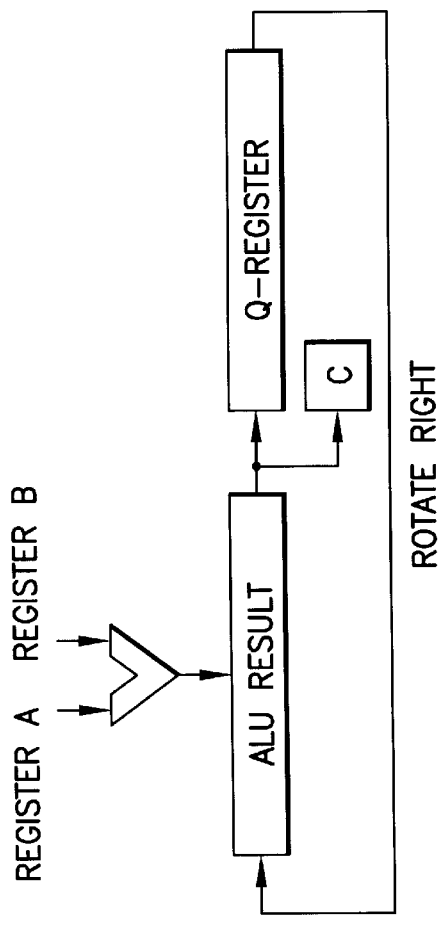
FIG.5.5.3.1 ROTATE RIGHT
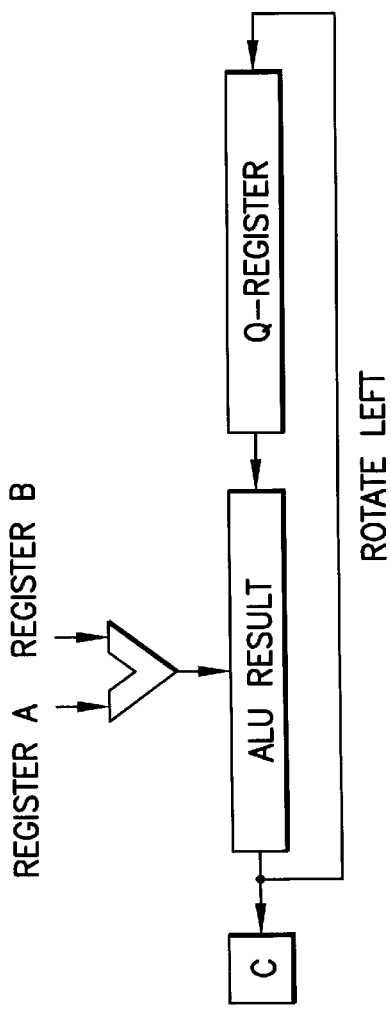
FIG.5.5.3.2 ROTATE LEFT

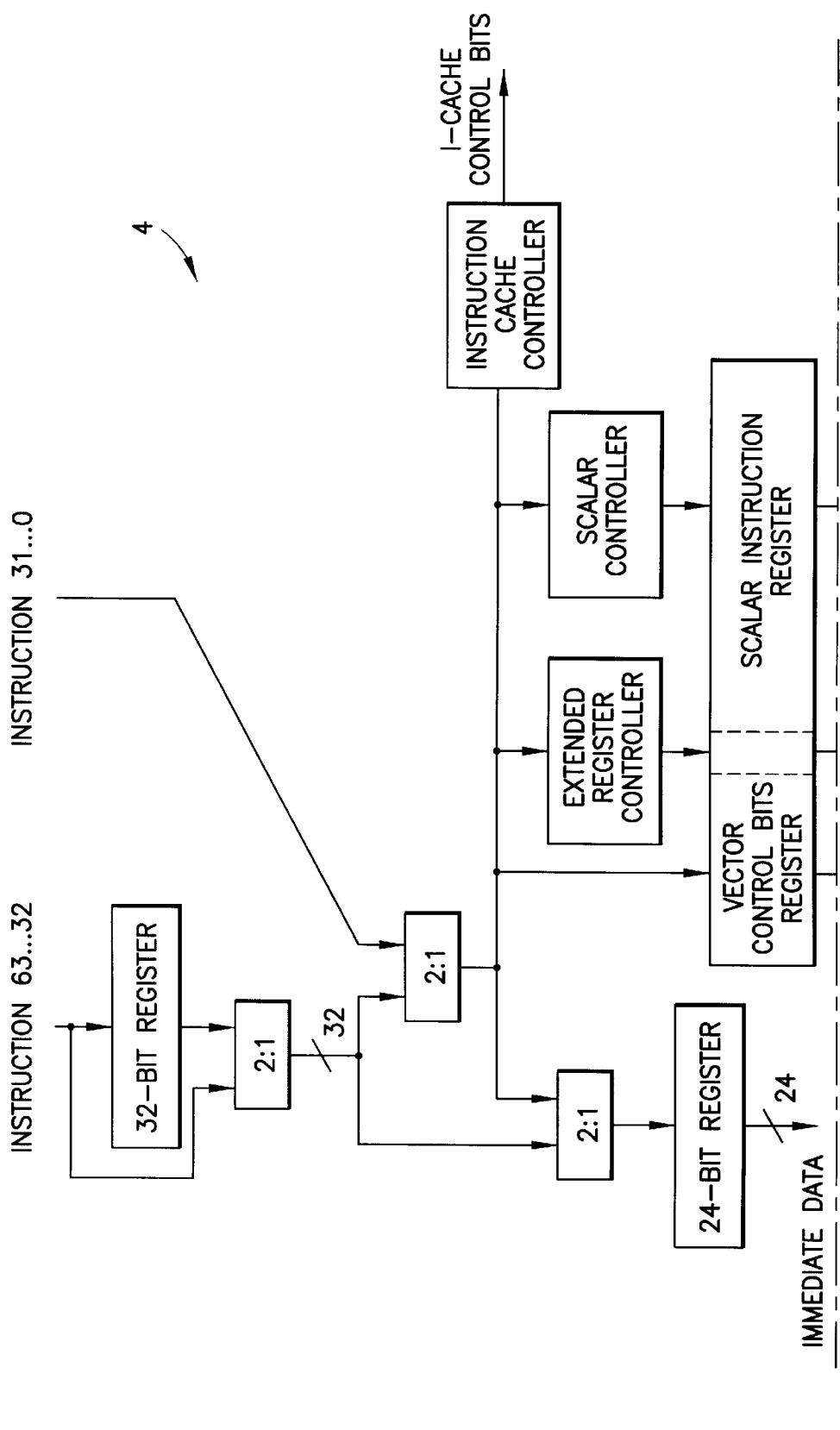

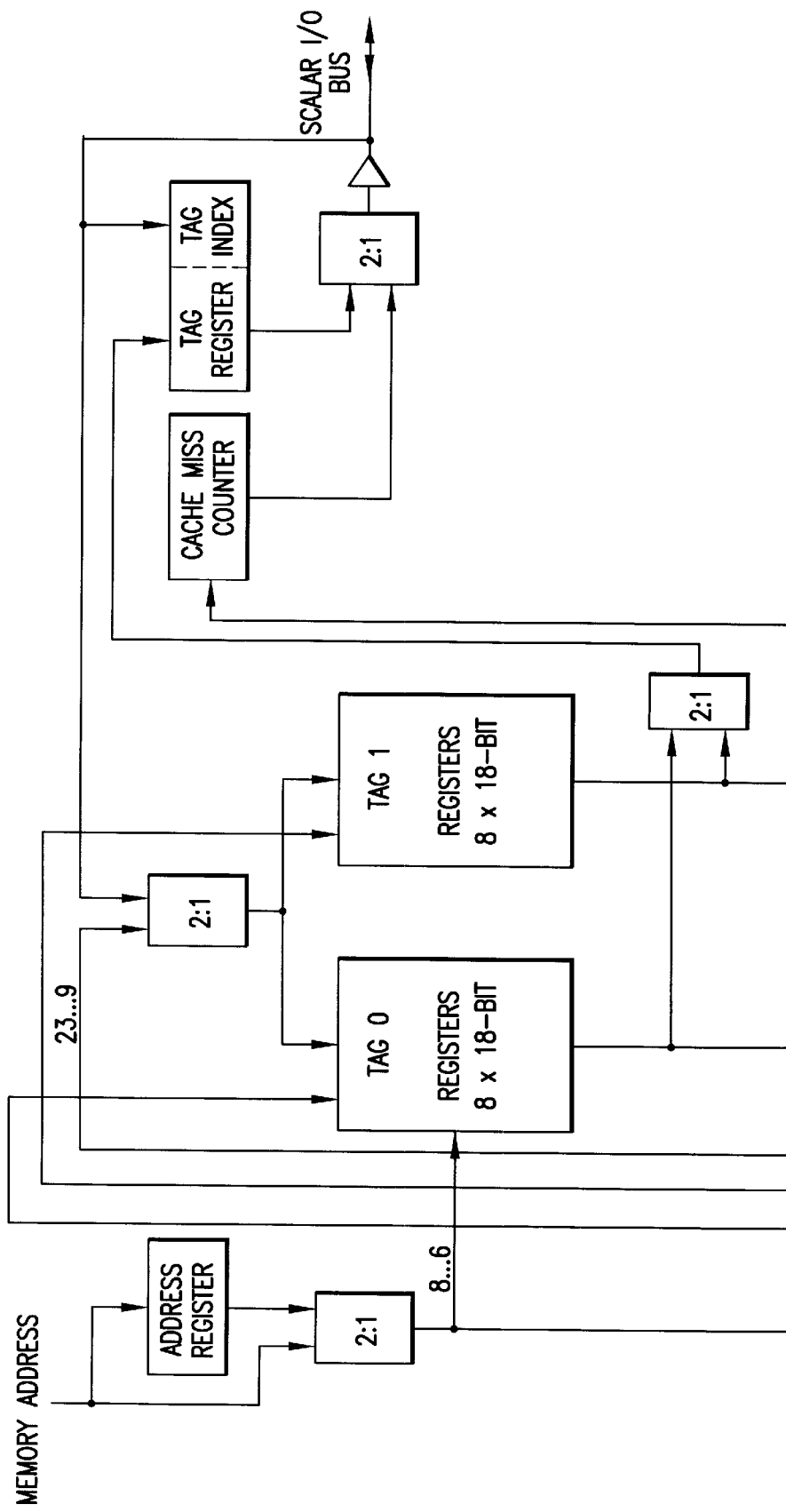

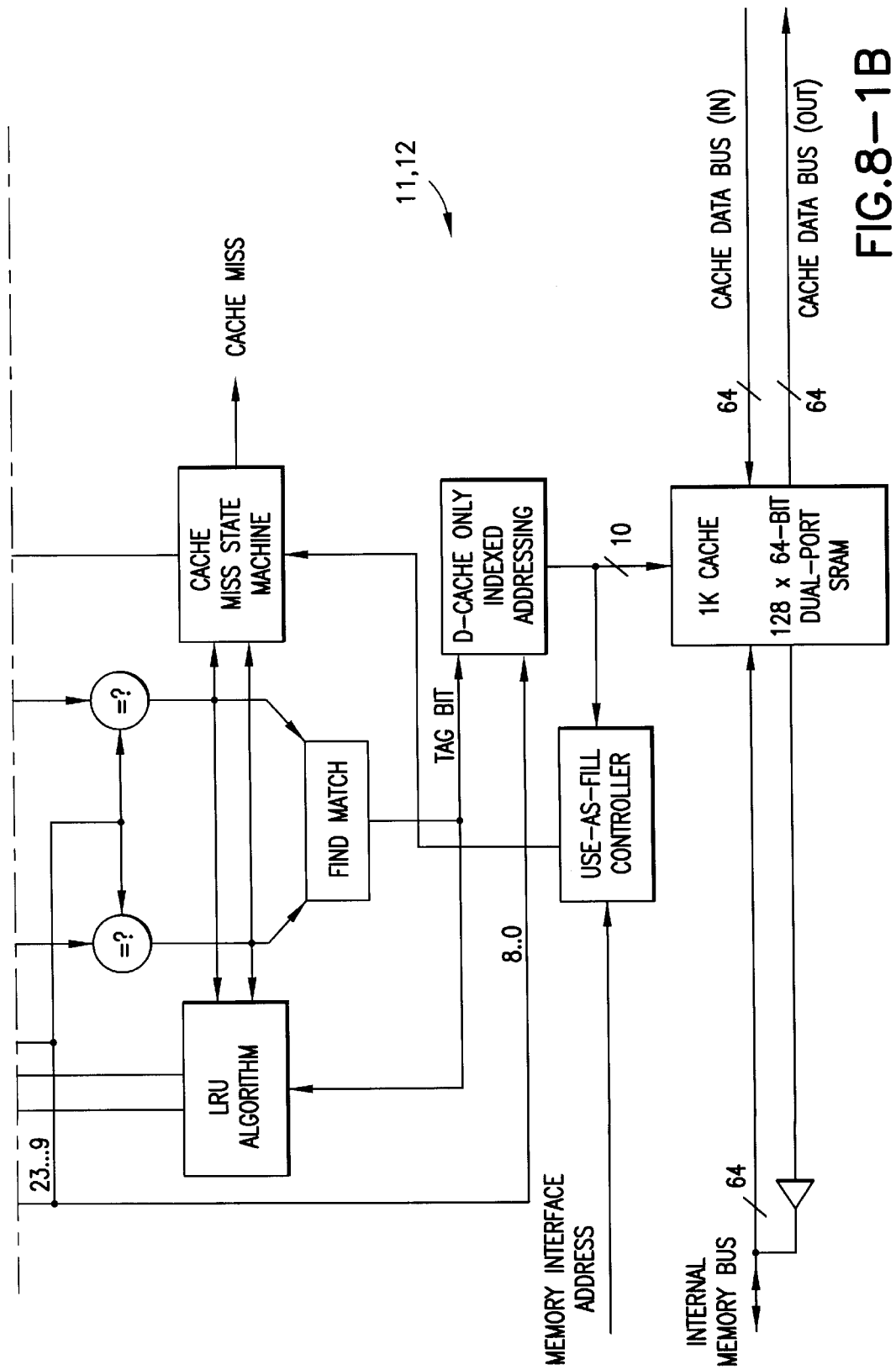

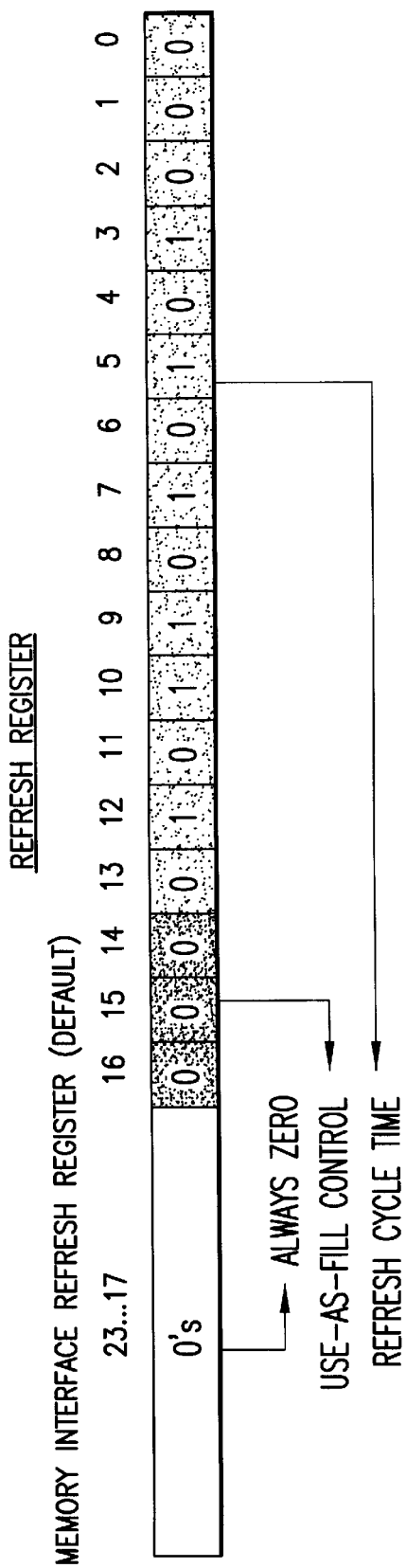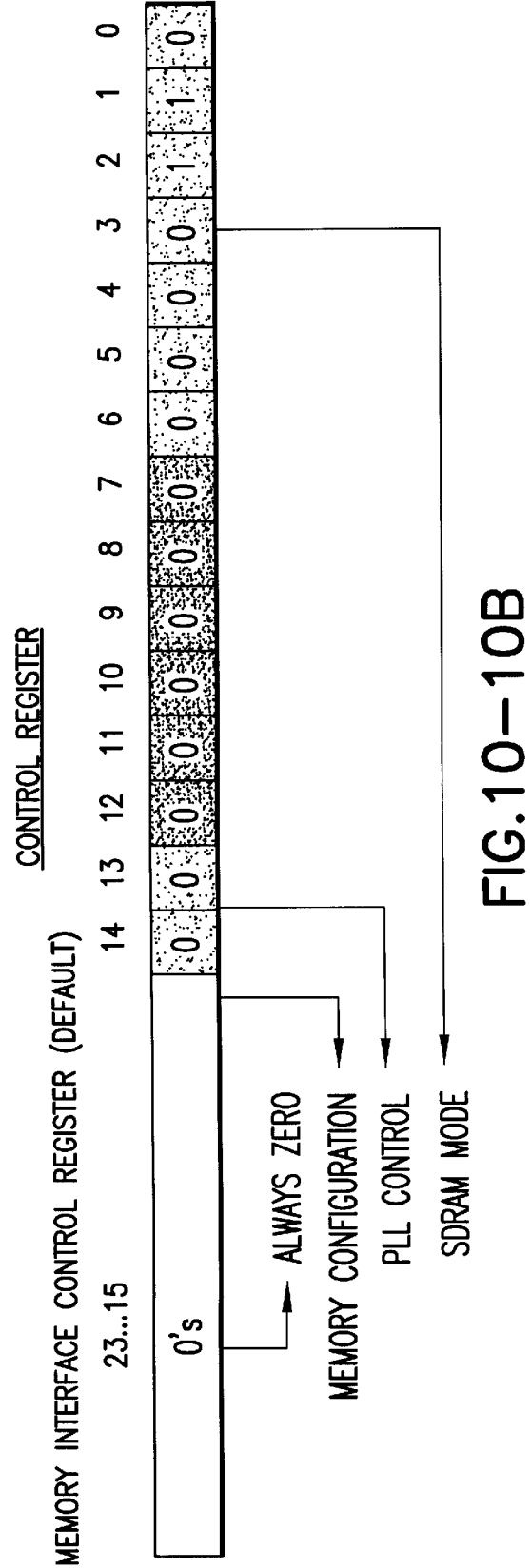

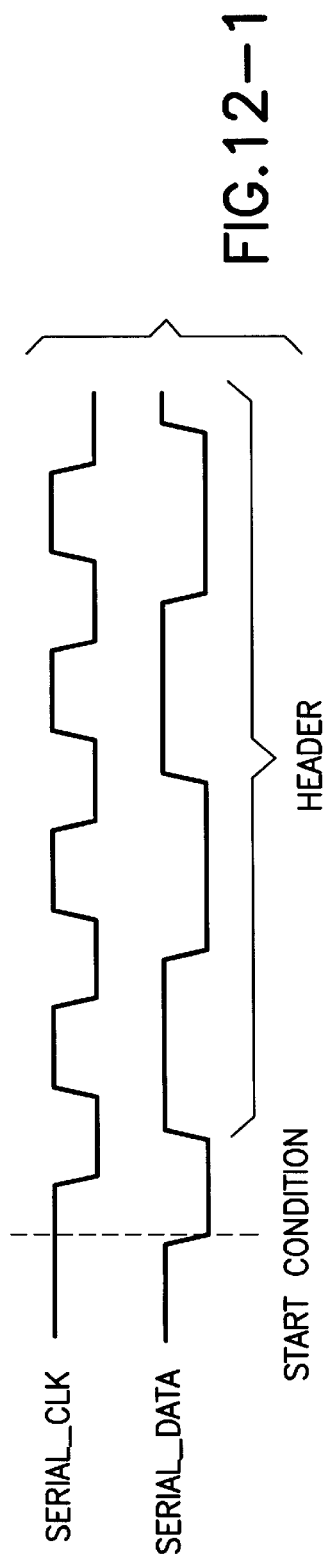
FIG.12-1
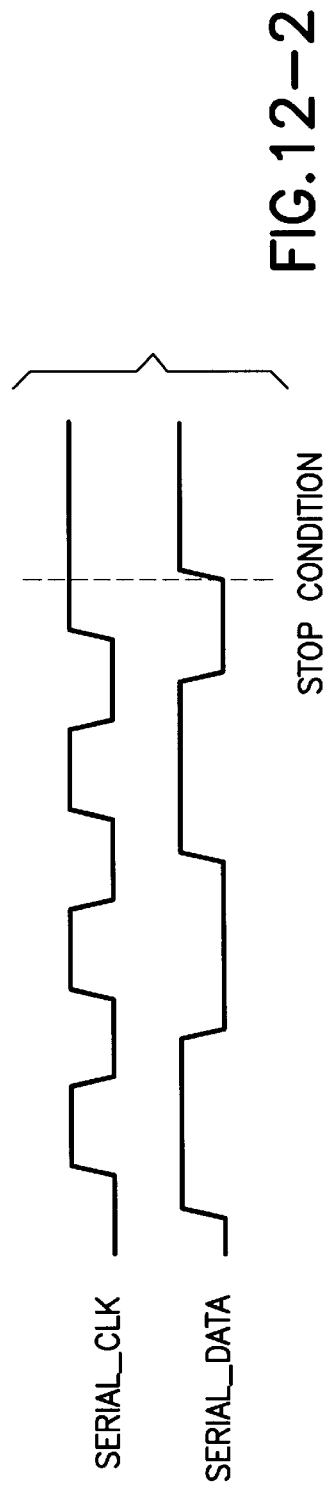
FIG.12-2
| ADDRESS BYTE 0 | ADDRESS BYTE 1 | SLAVE ADDRESS | | | | | | |
|---|---|---|---|---|---|---|---|---|
| $A_7 \ldots A_0$ | $A_{15} \ldots A_8$ | dt3 | dt2 | dt1 | dt0 | ds2 | ds1 | ds0 | 0 |
FIG.12-3

DIGITAL SIGNAL PROCESSOR CONTAINING SCALAR PROCESSOR AND A PLURALITY OF VECTOR PROCESSORS OPERATING FROM A SINGLE INSTRUCTION

CLAIM OF PRIORITY FROM PROVISIONAL PATENT APPLICATION

This patent application claims priority under 35 U.S.C. §119(e) from copending Provisional Patent Application No. 60/077,041, filed on Mar. 6, 1998, the disclosure of which is incorporated by reference herein in its entirety.

CROSS-REFERENCE TO A RELATED PATENT APPLICATION

This patent application is a continuation-in-part of copending U.S. patent application Ser. No. 09/158,208, filed Sep. 22, 1998, entitled "DSP Having a Plurality of Like Processors Controlled in Parallel by an Instruction Word, and a Control Processor Also Controlled by the Instruction Word" by Steven G. Morton (now U.S. Pat. No. 6,088,783, issued Jul. 11, 2000), which is a continuation of U.S. patent application Ser. No. 08/602,220, filed Feb. 16, 1996, now U.S. Pat. No. : 5,822,606, issued Oct. 13, 1998, which claims priority from Provisional Patent Application No. 60/009,800, filed Jan. 6, 1996. The disclosure of U.S. Pat. No. 5,822,606, issued Oct. 13, 1998, is incorporated by reference herein in its entirety.

STATEMENT OF GOVERNMENT RIGHTS

This invention was made with government support under grant number DAAB07-93-C-027 awarded by the U.S. Army SBIR. The government has certain rights in this invention.

FIELD OF THE INVENTION

This invention relates generally to digital data processors and, in particular, to digital data processors that are implemented as integrated circuits to process input data in parallel, as well as to techniques for programming such data processors.

BACKGROUND OF THE INVENTION

Digital signal processor (DSP) devices are well known in the art. Such devices are typically used to process data in real time, and can be found in communications devices, image processors, video processors, and pattern recognition processors.

One drawback to many conventional DSPs is their lack of parallelization, that is, an ability to apply multiple processors in parallel to the execution of desired operations on a given data set. As can be appreciated, the parallel execution of a plurality processors can yield significant increases in processing speed, so long as the multiple processors are properly controlled and synchronized.

OBJECTS AND ADVANTAGES OF THE INVENTION

It is a first object and advantage of this invention to provide an improved DSP having a capability to enable a single instruction unit to simultaneously control a plurality of processors in parallel using a group of bits.

It is a further object and advantage of this invention to provide a technique for programming the improved DSP.

SUMMARY OF THE INVENTION

The foregoing and other problems are overcome and the objects and advantages are realized by methods and apparatus in accordance with embodiments of this invention.

In one aspect this invention teaches a digital data processor integrated circuit that includes a plurality of functionally identical first processor elements and a second processor element. The plurality of functionally identical first processor elements are bidirectionally coupled to a first cache via a crossbar switch matrix. The second processor element is coupled to a second cache. Each of the first cache and the second cache comprise a two-way, set-associative cache memory that uses a least-recently-used (LRU) replacement algorithm and that operates with a use-as-fill mode to minimize a number of wait states said processor elements need experience before continuing execution after a cache-miss.

An operation of each of the plurality of first processor elements and an operation of the second processor element are locked together during an execution of a single instruction word read from the second cache. The single instruction word specifies, in a first portion that is coupled in common to each of the plurality of first processor elements, the operation of each of the plurality of first processor elements in parallel. A second portion of the single instruction specifies the operation of the second processor element.

The digital data processor integrated circuit further includes a motion estimator having inputs coupled to an output of each of the plurality of first processor elements, and an internal data bus coupling together a first parallel port, a second parallel port, a third parallel port, an external memory interface, and a data input/output of the first cache and the second cache.

BRIEF DESCRIPTION OF THE DRAWINGS

The above set forth and other features of the invention are made more apparent in the ensuing Detailed Description of the Invention when read in conjunction with the attached Drawings, wherein:

FIG. 1-1 is a block diagram of a Parallel Video Digital Signal Processor Chip, or DSP Chip.

FIG. 2-1 is a block diagram of a Vector Processor.

FIG. 2-2 is a block diagram of the Vector Processor ALU.

FIG. 2-3 is a flow chart for Quad-Byte Saturation.

FIG. 2-4 is a flow chart for Octal-Byte Saturation.

FIG. 2-5 is a diagram of Multiplier Data Flow.

FIG. 3-1 is a block diagram of crossbar's input and output switches.

FIG. 3-2 shows quad byte packed accesses with rotates of four (*a*) and one (*b*).

FIG. 3-3 shows quad byte interleaved accesses with rotates of four (*a*) and one (*b*).

FIG. 3-4 shows quad word accesses with rotates of four (*a*) and one (*b*).

FIG. 3-5 shows octal byte accesses with rotates of four (*a*) and one (*b*).

FIG. 3-6 depicts a byte write broadcast of four (*a*) and one (*b*), and a byte read broadcast of four (*c*) and one (*d*).

FIG. 3-7 is a data flow diagram of the input switch controller.

FIG. 3-8 is a data flow diagram of the output switch controller.

FIG. 4-1 is a data flow diagram of pixel distance computation.

FIG. 4-2 is a data flow diagram of pixel best computation.

FIG. 5-1 is a block diagram of the scalar processor.

FIG. 5-2 is a program counter block diagram.

FIGS. 5.5.1.1, 5.5.1.2, 5.5.2.1, 5.5.2.2, 5.5.3.1 and 5.5.3.2 illustrate scalar processor ALU rotate right logical, rotate left logical, shift right arithmetic, shift right logical, rotate right, and rotate left operations, respectively.

FIG. 5-3 shows the steps for pushing data to a stack.

FIG. 5-4 shows the steps for popping data from a stack.

FIG. 5-5 shows window mapping relative to vector register number.

FIG. 6-1 depicts the format of a timer interrupt vector.

FIG. 7-1 is a block diagram of the instruction unit.

FIG. 7-2 illustrates the instruction unit pipeline data flow.

FIG. 8-1 is a block diagram of a level-1 cache.

FIG. 8-2 is a diagram of data cache indexed addressing.

FIG. 8-3 is a diagram of a clock pulse stretching circuit.

FIG. 9-1 is a block diagram of a parallel port.

FIG. 9-2 is an illustration of FIFO access partitioning.

FIG. 9-3 is an illustration of line, field, frame, and buffer terms for interlaced video.

FIG. 9-4 shows the relationship of the vertical blanking and horizontal blanking signals used in video formatting.

FIG. 9-5 illustrates field and frame identification using the field synchronization video signal.

FIG. 9-6 is an illustration of two video formats, interlaced and non-interlaced.

FIG. 9-7 illustrates the use of video control signals.

FIG. 9-8 is a magnified region of FIG. 9-7 illustrating the use of the vertical and horizontal blanking periods.

FIG. 9-9 illustrates a master packet mode transfer sequence.

FIG. 10-1 is a block diagram of a memory interface.

FIG. 10-2 is a block diagram of a memory interface input pipeline.

FIG. 10-3 is a block diagram of a memory interface output pipeline.

FIG. 10-4 is a block diagram of a phase lock loop.

FIG. 10-5 illustrates three phase-detection scenarios.

FIG. 10-6 is a diagram of a phase shifter.

FIG. 10-7 illustrates a memory row address construction.

FIG. 10-8 illustrates a memory column address construction.

FIG. 10-9 illustrates a memory interface read sequence.

FIG. 10-10 illustrates a memory interface write sequence.

FIG. 10-10A depicts a refresh register organization.

FIG. 10-10B depicts a control register organization.

FIG. 10-11 is an illustration of supported memory configurations.

FIG. 11-1 is a block diagram of a UART.

FIG. 12-1 illustrates the serial bus start of transfer.

FIG. 12-2 illustrates the serial bus end of transfer.

FIG. 12-3 shows the format for the serial bus header.

FIG. 12-4 illustrates the serial bus read sequence.

FIG. 12-5 illustrates the serial bus write sequence.

FIG. 13-1 is a block diagram of a test mode output configuration.

DETAILED DESCRIPTION OF THE INVENTION

1. Architecture

Figures 1, 2:
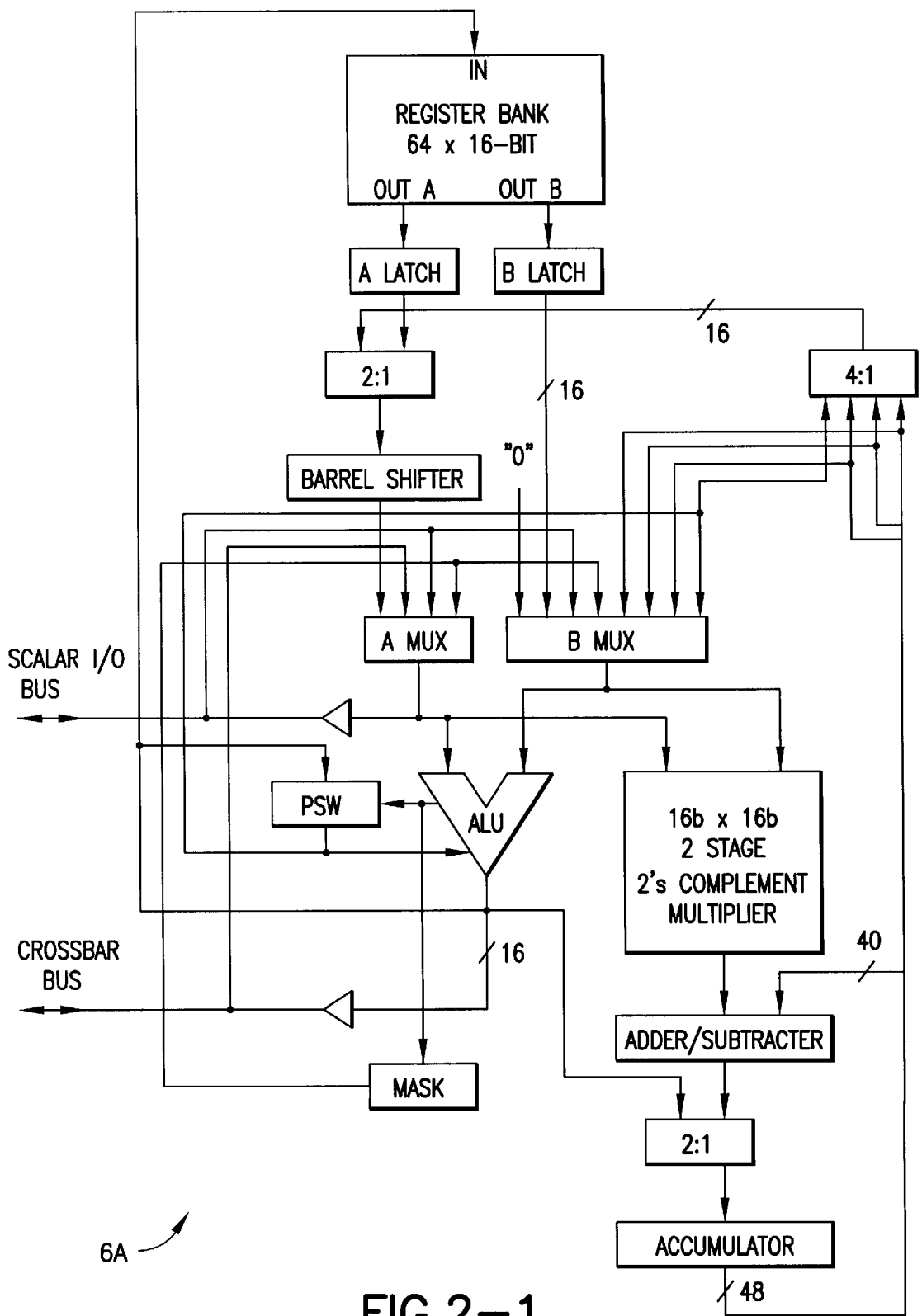
Figure 2:
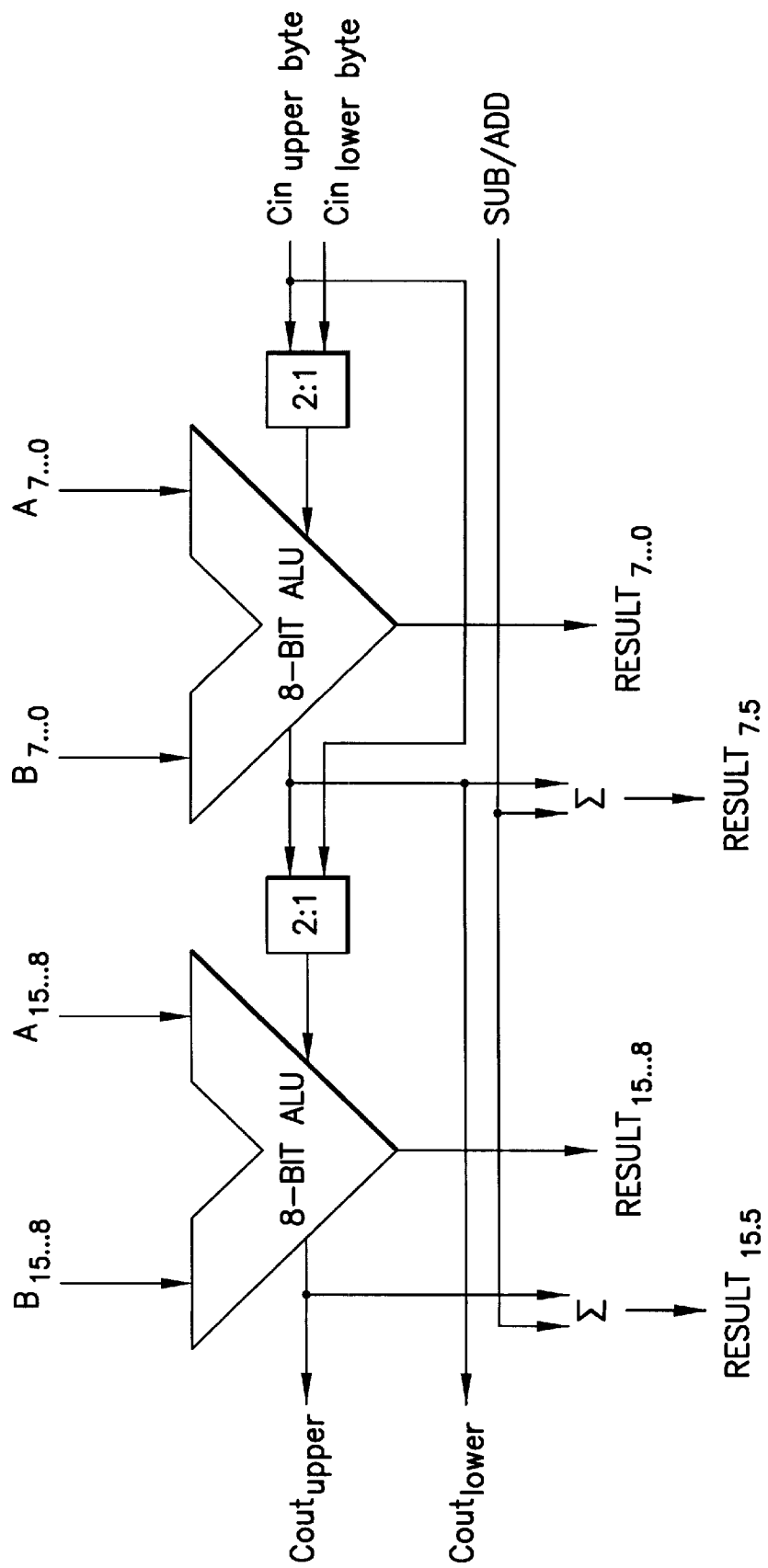

FIG. 1-1 is an overall block diagram of a Digital Signal Processor Chip, or DSP Chip 1, in accordance with the teachings of this invention. The major blocks of the integrated circuit include: a memory interface 2, parallel interfaces 3A, 3B and 3C, instruction unit 4, scalar processor (24-bit) 5, parallel arithmetic unit (4×16 bit) 6 having four vector processors 6A in parallel, a motion estimator 7, crossbar switch 8, universal asynchronous receiver/transmitter (UART) 9, serial bus interface 10, 1 KB instruction cache 11 and 1 KB data cache 12. These various component parts of the DSP Chip 1 are discussed in further detail below.

In general, the DSP Chip 1 is a versatile, fully programmable building block for real-time digital signal processing applications. It is specially designed for real-time video processing, although it can be applied to a number of other important applications, such as pattern recognition. It has an enhanced, single-instruction, multiple-data (SIMD) architecture and simplified programming.

The DSP Chip 1 has four 16-bit vector processors 6A, each with dedicated multiply-accumulate logic that can accumulate products to 40-bits. Each vector processor 6A has 64, 16-bit registers to provide instant access to numerous frequently used variables. The vector processors 6A communicate with the data cache 12 via the crossbar 8. The crossbar 8 provides rotate and broadcast capabilities to allow sharing of data among the vector processors 6A.

Two level-1 cache memories are provided, namely the data cache 12 and the instruction cache 11. These caches are two-way, set-associative and use a least-recently-used (LRU) replacement algorithm to provide an optimized stream of data to the processors. Special use-as-fill modes are provided to minimize the number of wait states the processors need before continuing execution after a cache-miss.

A 24-bit scalar processor 5 is provided for program control, and computing data and program addresses and loop counts. The scalar processor 5 has dedicated shift and rotate logic for operation on single and double precision words. The scalar processor's I/O bus provides communication and control paths for coupling to the vector processors 6A, motion estimator 7, parallel ports 3, memory interface 2, and serial interfaces 9, 10. The integrated synchronous memory interface 2 provides access to SDRAMs (not shown) via a 32-bit, 400 MB/sec bus. The use of SDRAMs reduces system costs by utilizing inexpensive DRAM technology rather than expensive fast SRAM technology. Hence, a large main memory is cost effective using SDRAMs.

Three, 16-bit, bi-directional, asynchronous, parallel ports 3A, 3B, 3C are provided for loading programs and data, and for passing information among multiple DSP Chips 1. The parallel ports have special modes that allow for direct interfacing with NTSC compliant video encoders and decoders. This allows for a complete video processing system with a minimum of external support logic.

The dedicated motion estimator 7 is provided for data compression algorithms, such as MPEG-2 video compression. The motion estimator 7 can compute a sum-of-differences with eight, 8-bit pixels each cycle.

Two serial interfaces 9, 10 are provided to provide interfacing with "slow" devices. The UART 9 provides four pins for interfacing with RS-232 devices. The serial bus 10 provides two pins for interfacing with a serial EEPROM, that contains a bootstrap routine, and other devices that utilize a simple 2-wire communication protocol.

The DSP Chip 1 can be implemented with low power CMOS technology, or with any suitable IC fabrication methodologies.

2. Parallel Arithmetic Unit 6

The DSP Chip 1 includes the four, 16-bit Vector Processors 6A. Collectively, they form the Parallel Arithmetic Unit 6. The block diagram of a Vector Processor 6A is shown in FIG. 2-1. The Vector Processors 6A operate in lock step with a nominal processor clock rate of 40 MHz. Each Vector Processor 6A includes: a register bank, ALU, hardware multiplier, 40-bit adder/subtractor, 48-bit accumulator, barrel shifter, and connections to the crossbar switch 8.

Register Bank

Each Vector Processor 6A has a register bank of 64 locations. The large number of registers is provided to increase the speed of many image processing and pattern recognition operations where numerous weighted values are used. The register bank is implemented as a triple-port SRAM with one read port, A, one read port, B, and a third write port (IN). The address for read port B and the write port are combined. This configuration yields one read port and a read/write port, i.e., a two-address device. In a single cycle, two locations, A and B, can be read and location B can be updated.

Two transparent latches are provided to separate read and write operations in the register bank. During the first half of the clock cycle, data from the register bank is passed through the A Latch and the B Latch for immediate use and the write logic is disabled. During the second half of the clock cycle, the data in the latches is held and the write logic is enabled.

Register Windows

Register Windows are used to address a large number of registers while reducing the number of bits in the instruction word used to access the register banks. The port A address and port B address are both mapped, and they are mapped the same. The processor status words in the Scalar Processor 5 contain the Register Window Base that controls the mapping.

The Register Window has 32 registers. Sixteen of these are fixed and do not depend upon the value of the register window base. The remaining sixteen are variable and depend upon the value of the register window base. The window can be moved in increments of eight registers to provide overlap between the registers in successive window positions. For example, register window base 0 points to registers 0h to Fh (h=hexadecimal) and register window base 1 points to registers 8h to 17h with overlapping registers 8h to Fh.

Power Conservation

Due to Register Windows, only a small portion of the register bank can be accessed at a time. Since the majority of the register bank is not active it is disabled to conserve power. The register bank is divided into quadrants containing 16 registers each. Quadrants are enabled when registers contained in their address range are accessed and disabled otherwise. Since some of the Register Windows overlap adjacent quadrants, two quadrants may be enabled simultaneously. No more than two quadrants can be enabled at a time, with at least one enabled when a register bank access occurs.

Arithmetic Logic Unit

Each Vector Processor 6A has a 16-function Arithmetic Logic Unit (ALU), supporting common arithmetic and Boolean operations. The functions can operate on bytes or words depending on the opcode selected. For octal byte operations, a 16-bit operand is treated as two separate bytes and the ALU operates on them independently and simultaneously. A block diagram of the ALU is seen in FIG. 2-2.

Two carry-in and two carry-out paths are provided to allow the Vector Processor ALU to function as two byte ALUs. In word and quad-byte modes the $Cout_{upper}$ and $Cin_{lower}$ serve as the carry-out and carry-in respectively. The two 8-bit ALUs are joined together by the carry-out of the lower ALU and the carry-in of the upper ALU. In octal-byte mode the path joining the two ALUs is broken providing two additional carriers, $Cout_{lower}$ and $Cin_{upper}$. When performing octal-byte arithmetic $Cout_{lower}$ and $Cin_{lower}$ are the carries for the lower byte and $Cout_{upper}$ and $Cin_{upper}$ are the carries for the upper byte. Two additional results are also generated, $result_{15.5}$ and $result_{7.5}$.

The additional summers for $result_{15.5}$ and $result_{7.5}$ are provided to support arithmetic operations on unsigned bytes in octal byte mode. An arithmetic operation on two unsigned byte quantities requires a 9-bit result. The bits for 15.5 and 7.5 provide the $9^{th}$ bit. The $9^{th}$ bit is also used for saturation operations. Executing an octal byte arithmetic operation will store $result_{15.5}$ and $result_{7.5}$ for use during the next cycle. Executing a saturation operation will use the stored bits to determine if the previous operation saturated.

| Code | ALU Function | Code | ALU Function |
|------|--------------|------|--------------|
| 0h   | A and B      | 8h   | A plus Carry FF |
| 1h   | A xor B      | 9h   | A plus B plus Carry FF |
| 2h   | A or B       | Ah   | A plus not (B) plus Carry FF |
| 3h   | A            | Bh   | not (A) plus B plus Carry FF |
| 4h   | not (A) and B| Ch   | A minus 1 |
| 5h   | A xnor B     | Dh   | A plus B |
| 6h   | not (A) or B | Eh   | A minus B |
| 7h   | not (A)      | Fh   | B minus A |

Saturation

The Vector Processor ALU has saturation features for quad-byte and octal-byte operands. Saturation operates only for Boolean operations. In fact, a move with saturate is the most obvious choice. In the case of octal-byte operands saturation is more restrictive and the move is the only choice.

Figures 2, 3:
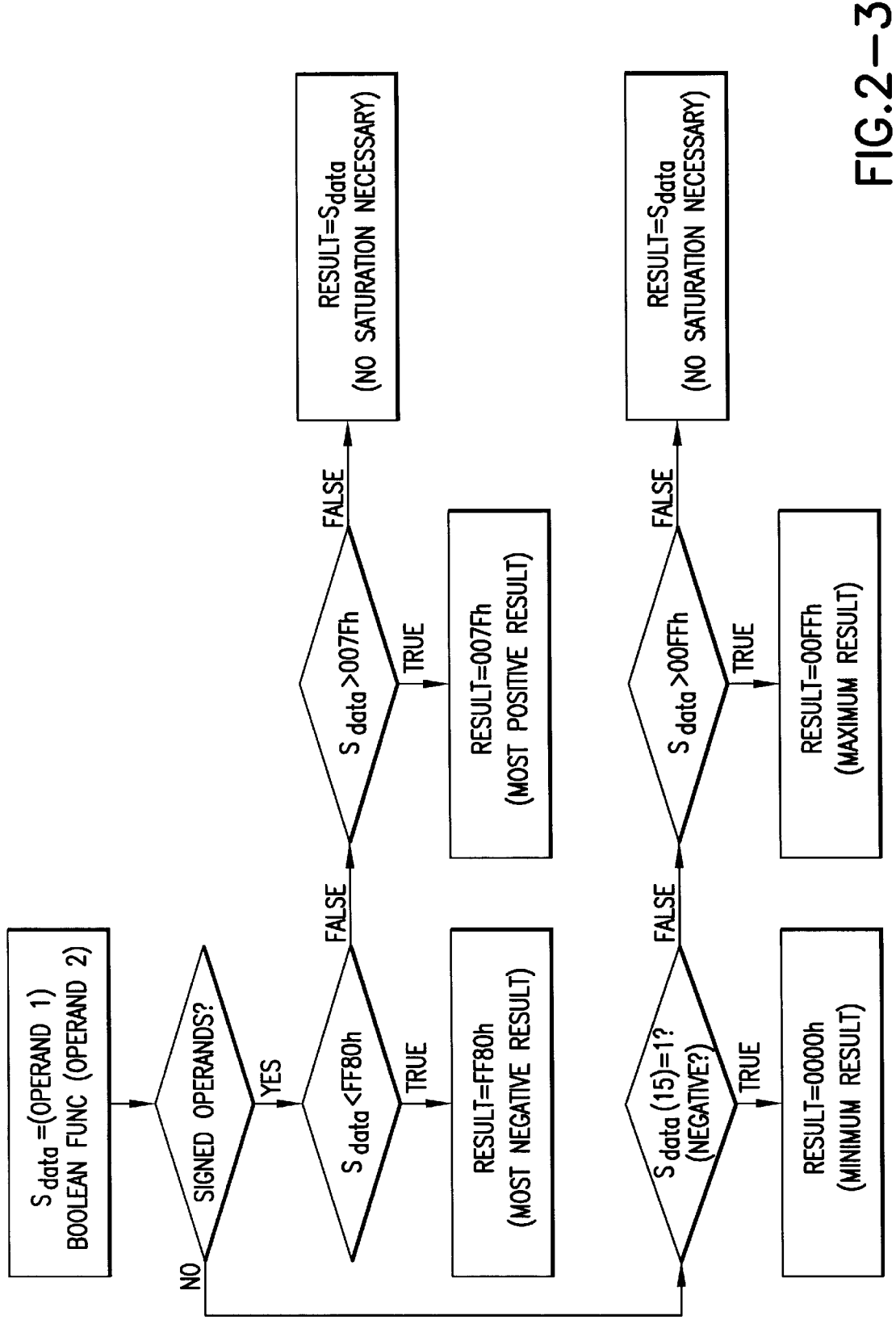

Saturation with quad-byte operands operates according to the rules illustrated in FIG. 2-3. Since all the information necessary to determine if a value needs to saturate is contained within a 16-bit quad-byte value, saturation can take place at any time. For example, a series of pixel operations can be performed with the results stored in the Vector Processor register bank. Next, each of these results can be saturated with no attention being paid to order.

Figures 2, 3, 4:
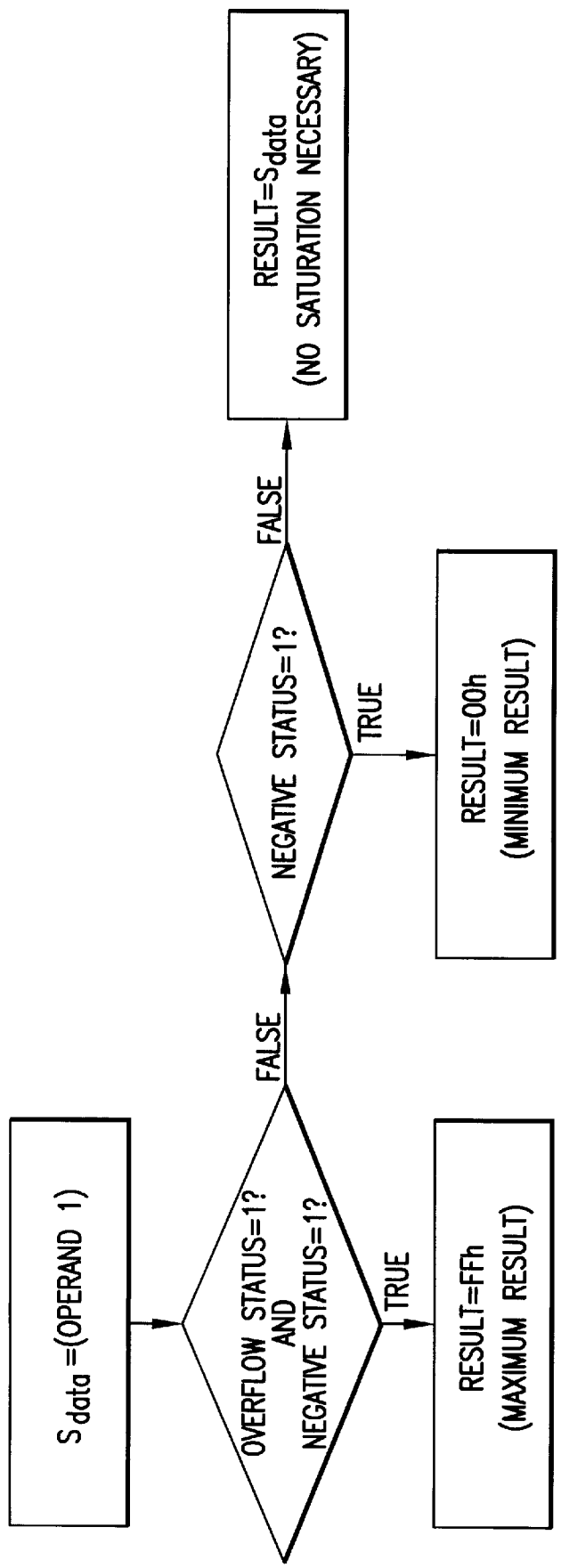

Saturation with octal-byte operands functions differently than quad-byte saturation. Since the information to determine saturation is not contained in each byte operand it is determined from the negative and overflow bits in the status word. The status word is updated on each arithmetic operation, therefore, it is imperative to saturate a result the cycle following the arithmetic operation. The general form for an octal-byte saturation is:

reg B←reg A arithmetic func reg B; perform octal-byte arithmetic reg B←reg B (sat); octal-byte saturate previous unit Saturation with octal-byte operands operates according to the rules illustrated in FIG. 2-4.

Hardware Multiplier

The hardware multiplier is a 16-bit×16-bit, two stage, 2's complement multiplier. The multiplier is segmented into two stages to allow for higher frequencies of operation. The first stage is responsible for producing and shifting partial products. The second stage, separated from the first by a register, is responsible for summing the partial products and producing a 32-bit product. The diagram in FIG. 2-5 illustrates the two stages.

Power Saving Mode

When the multiplier is not being used it can be placed into a power saving mode by zeroing the inputs. With the inputs fixed at zero a masking of any input changes that may occur is achieved. Since the inputs are fixed, the internal gates will settle and not switch until the inputs are allowed to change again. A CMOS circuit that is not changing state consumes negligible power.

Accumulator

The accumulator in the Vector Processors is 48-bits. However, only 40-bits of the accumulator can be used by the multiply-add and multiply-subtract logic. The additional 8-bits are provided to allow the ALU to write to any one of three words in the accumulator, serving as three additional general-purpose registers.

Barrel Shifter

Each Vector Processor 6A has a 16-bit barrel shifter. The shift is a logical right shift, i.e., data shifted out of the least-significant bit is shifted back into the most-significant bit. The barrel shifter can shift between 0 (no shift) and 15. The barrel shifter's input is taken from either the A port of the register bank, the processor status word, or the lower, middle, or high word of the accumulator.

Mask Register

The mask register is provided for performing masking operations using the sign bit (negative status bit). This register is read only since it is not actually a register. Rather it is an expansion of the negative status bit in the processor status register. The expansion forms a 16-bit quantity. In octal-byte mode the mask register has two halves, upper and lower. The upper 8-bits are an expansion of the negative status form the upper byte and the lower 8-bits are an expansion of the negative status from the lower byte.

One important application for masking is the image processing technique known as chroma keying. Chroma keying is an overlay technique that allows an image to be extracted from an unwanted background, namely a monochromatic color. Using an inverse mask, the extracted image can be overlaid on a desirable background. Chroma keying has numerous applications involving the joining of two images to create a more desirable unified image.

Processor Status Register

The 16-bit Vector Processor status word is:

Y: carry status, multiplier partial-products adder

3. Crossbar Switch 8

The crossbar 8 assists in the sharing of data among the vector processors 6A and the data cache 12. The crossbar 8 can perform these functions: pass data directly from the data cache 12 to the vector processors 6A; reassign connections between the data cache 12 and the vector processors 6A, e.g., to rotate data among the vector processors 6A via the data cache 12; replicate the data from a vector processor 6A throughout a 64-bit, data cache memory word, and to broadcast data from a vector processor 6A to the data cache 12.

A block diagram of the crossbar 8 is seen in FIG. 3-1. The crossbar switch 8 allows for extremely flexible addressing, down to individual bytes.

Addressing Modes

The crossbar 8 handles four addressing modes. These are quad byte packed, quad byte interleaved, 16-bit word, and octal byte. Each of the modes requires specific connection control that is performed by the input and output switch controllers.

Quad-byte operands are handled differently from words and octal bytes. This is because quad byte operands are read and stored in memory in groups of 32-bits, one byte for each vector processor 6A. Therefore when a quad byte operand is read from memory, the crossbar 8 will append a zero byte (00h) to the byte taken from memory to form a 16-bit word for each vector processor 6a. In this manner a 32-bit memory read is converted into a 64-bit word required by the vector processors 6A. Writes are handled similarly. The 16-bit word from each vector processor 6A is stripped of its upper byte by the crossbar 8. The crossbar 8 concatenates the four vector processor 6A bytes to form a 32-bit memory word.

Rotates

Rotates allow the vector processors 6A to pass data among themselves using the Data Cache 12. The crossbar 8 always rotates data to the right and in increments of one byte. Data in the least significant byte is rotated into the most significant byte.

Rotates are controlled by the least significant 3-bits of an address. This provides rotates between zero (no rotate) and seven. For example, if the vector processors 6A access address 000002h, then a rotate of two to the right will be performed. Likewise, an address 000008h will rotate zero.

Quad Byte Packed

|      | Z  | N  | C  | OF | E  | S16 | S8 | NB | CB | OFBU | OFBL | X | Y | O's   |
|------|----|----|----|----|----|-----|----|----|----|------|------|---|---|-------|
| bit: | 15 | 14 | 13 | 12 | 11 | 10  | 9  | 8  | 7  | 6    | 5    | 4 | 3 | 2...0 | mnemonic definition

Z: quad-word/quad-byte zero status

N: quad-word/quad-byte/octal byte$_{upper}$ negative (sign) status

C: quad-word/quad-byte/octal-byte$_{upper}$ carry status

OF: quad-word/quad-byte overflow status

E: vector processor enable

S16: ALU result$_{15.5}$ (see FIG. 2-2)

S8: ALU result$_{7.5}$ (see FIG. 2-2)

NB: octal-byte$_{lower}$ negative (sign) status

CB: octal-byte$_{lower}$ carry status

OFBU: octal-byte$_{upper}$ overflow status

OFBL: octal-byte$_{lower}$ overflow status

X: carry status, accumulator adder/subtractor

A quad packed byte is four contiguous address locations, where each address provides one byte. Rotates move the four byte "window" to any set of four locations. FIG. 3-2 demonstrates two rotate examples.

Quad Byte Interleaved

A quad interleaved byte is four address locations, but the addresses are separated from each other by one byte. This result is an interleaved pattern. A rotate will move the pattern a fixed number as specified in the address. FIG. 3-3 demonstrates two interleaved rotate examples.

Quad Word

A quad word is four contiguous address locations, where each address provides one 16-bit word. This addressing mode is flexible enough to even allow passing of bytes among vector processors 6A even though they are operating on words. This can be done with odd rotates (1,3,5,7). FIG. 3-4 demonstrates two quad word examples.

Octal Byte

Octal byte mode is identical to quad word mode except that each word that is accessed is treated as two separate bytes internal to the vector processors 6A. Since the handling of data is internal to the vector processors 6A, the crossbar 8 treats octal byte mode the same as quad word mode (this does not apply to broadcasts). Notice the similarities in FIG. 3-4 and FIG. 3-5.

Broadcasts

Broadcasts allow any one vector processor 6A to replicate its data in memory to form a 64-bit word for quad word and octal byte modes or a 32-bit word for quad byte modes. An additional memory access allows the vector processors 6A to each receive the same data from the one vector processor 6A that stored its data, i.e., a broadcast. There are two types of broadcasts, word and byte. As their names imply, the word broadcast will replicate a 16-bit word and a byte broadcast will replicate a byte.

The least significant 3-bits of the address are used to select which vector processor 6A broadcasts its data. In the case of byte modes, the address even determines the byte from a vector processor 6A that is broadcast.

FIG. 3-6 provides examples of byte broadcasting. The same technique applies to words except two contiguous bytes are used. Consider the case of a write broadcast using words. For an address specifying a broadcast of 1, the most significant byte of VP0 and the least significant byte of VP1 are concatenated to form a word and then this word is broadcast.

Input Switch Controller

The input switch has a dedicated controller for configuring the switch to move data on its input (vector processors 6A) to the appropriate location on its output (data cache 12).

Each mux of the input switch is configured independently. The mux select bits are based upon the address, the data mode (rotate or broadcast), the addressing mode (word or byte), and the mux's number (0 through 7). These factors are combined to determine how a mux propagates data.

The equations for determining an input mux's select bits are listed below and diagramed in FIG. 3-7.

| Data/Addressing Mode | mux select bits$_{2...0}$ = S |
|---|---|
| quad byte packed | S=(mux number–address$_{2...0}$) * 2 |
| quad byte interleaved | S = mux number – address$_{2...0}$ |
| quad word | S = mux number – address$_{2...0}$ |
| broadcast bytes | S = address$_{2...0}$ |
| broadcast words | S = address$_{2...0}$ + <br> 0 if even mux number, <br> 1 if odd mux number |

Output Switch Controller

The output switch has a dedicated controller for configuring the switch to move data on its input (data cache 12) to the appropriate location on its output (vector processors 6A).

Each mux of the output switch is configured independently. The mux select bits are based upon the address, the data mode (rotate or broadcast), the addressing mode (word or byte), and the mux's number (0 through 7). These factors are combined to determine how a mux propagates data.

The equations for determining an output mux's selection bit are listed below and diagramed in FIG. 3-8.

| Data/Addressing Mode | mux select bits$_{2...0}$ = S |
|---|---|
| quad byte packed | S=(mux number/2)+address$_{2...0}$ |
| quad byte interleaved | S = mux number – address$_{2...0}$ |
| quad word | S = mux number – address$_{2...0}$ |
| broadcast bytes | S = address$_{2...0}$ |
| broadcast words | S = address$_{2...0}$ + <br> 0 if even mux number, <br> 1 if odd mux number |

Motion Estimator 7

Video compression algorithms correlate video frames to exploit temporal redundancy. Temporal redundancy is the similarity between two or more sequential frames. A high degree of compression can be achieved by making use of images which are not entirely new, but rather have regions that have not changes. The correlation measure between sequential frames that is used most commonly is the absolute value of differences or pixel distance.

Motion estimation is the primary computation in video compression algorithms such as MPEG-2. Motion estimation involves scanning a reference frame for the closest match by finding the block with the smallest absolute difference, or error, between target and reference frames. Pixel distance is used to calculate this absolute difference and the best pixel function is used to determine the smallest error, i.e., the pixel blocks most similar.

Pixel Distance

The DSP Chip 1 computes pixel distance efficiently in two modes, quad-byte mode and octal-byte mode. The quad-byte mode computes the absolute difference for four 8-bit pixels, and the octal-byte mode computes the absolute difference for eight 8-bit pixels. Each cycle a four-pixel difference or eight-pixel distance can be calculated and accumulated in the pixel distance register.

The first step in computing pixel distance is to compute the difference between pixel pairs. This is performed using the vector processor's 6A ALUs. In quad-byte mode, the difference between four pairs of 8-bit pixels is computed and registered. In octal-byte mode, the difference between eight pairs of 8-bit pixels is computed and registered. To preserve precision, 9-bits are used for storing the resulting differences.

The second step is to find the absolute value of each of the computed differences. This is performed by determining the sign of the result. Referring to FIG. 4-1, S0, S1, . . . , and S7 represent the sign of the difference result from the vector processor 6A ALUs. If the result is negative then it is transformed into a positive result by inverting and adding a '1' (2's complement) to the sum at some point in the summing tree. If the result is positive then no transformation is performed.

The third step is to sum the absolute values. A three stage summing tree is employed to compute the sum of 8 values. In quad-byte mode, four of the 8 values are zero and do not contribute to the final sum. Each stage halves the number of operands. The first stage reduces the problem to a sum of four operands. The second stage reduces the problem to a sum of two operands. The third stage reduces the problem to a single result. At each stage, an additional bit in the result is necessary to maintain precision.

The seven summing nodes in step 3 have carry ins that are derived from the sign bits of the computed differences from step 1. For each difference that is negative, a '1' needs to be added into the final result since the 2's complement of a negative difference was taken.

The forth and last step is to accumulate the sum of absolute differences, thereby computing a pixel distance for a region or block of pixels. This final summing node is also responsible for adding in the $8^{th}$ sign it for the 2's complement computation on the $8^{th}$ difference.

Best Pixel Distance

Ultimately the best pixel distance value computed is sought, indicating the block of pixels that are most similar. This function is implemented in hardware within the motion estimator 7 to speed operations that are identifying similar pixel blocks. The motion estimator 7 has a dedicated best pixel compute engine.

The best pixel distance value is found by executing a series of pixel distance calculations that are accumulated in the pixel distance register and storing the best result in another register. A series of calculations is typically a 16×16 pixel block. The series is terminated by reading the pixel distance register. A diagram of this process is illustrated in FIG. 4-2.

Reading the pixel distance register initiates a two-register comparison for the best result. The comparison is performed with the pixel distance register and the pixel best register. If the smaller of the two is the pixel best register then no further updates are performed. If the smaller of the two is the pixel distance register then the pixel best register is updated with the value in the pixel distance register along with its associated match count.

The match count is a monotonically increasing value assigned to each series to aid in identification. No more than 256 pixel distance calculations should be performed or the counter will overflow.

Regardless of the comparison results, reading the pixel distance register will clear its contents and the match counter will increment in preparation for a new series of pixel distance computations.

Extended Registers

The motion estimator adds two read/write registers to the extended register set, the pixel distance register and the pixel best register. These two registers can be accessed from the scalar processor 5.

The pixel distance register has special read characteristics. Reading from the pixel distance register initiates a best pixel distance calculation, as explained above. This then causes a series of updates: the pixel best register may be updated with the contents of the pixel distance register; the pixel distance match counter (upper 8-bits) is incremented; and the pixel distance register cleared on the following cycle.

Scalar Processor 5

Figures 2, 3, 4, 5:
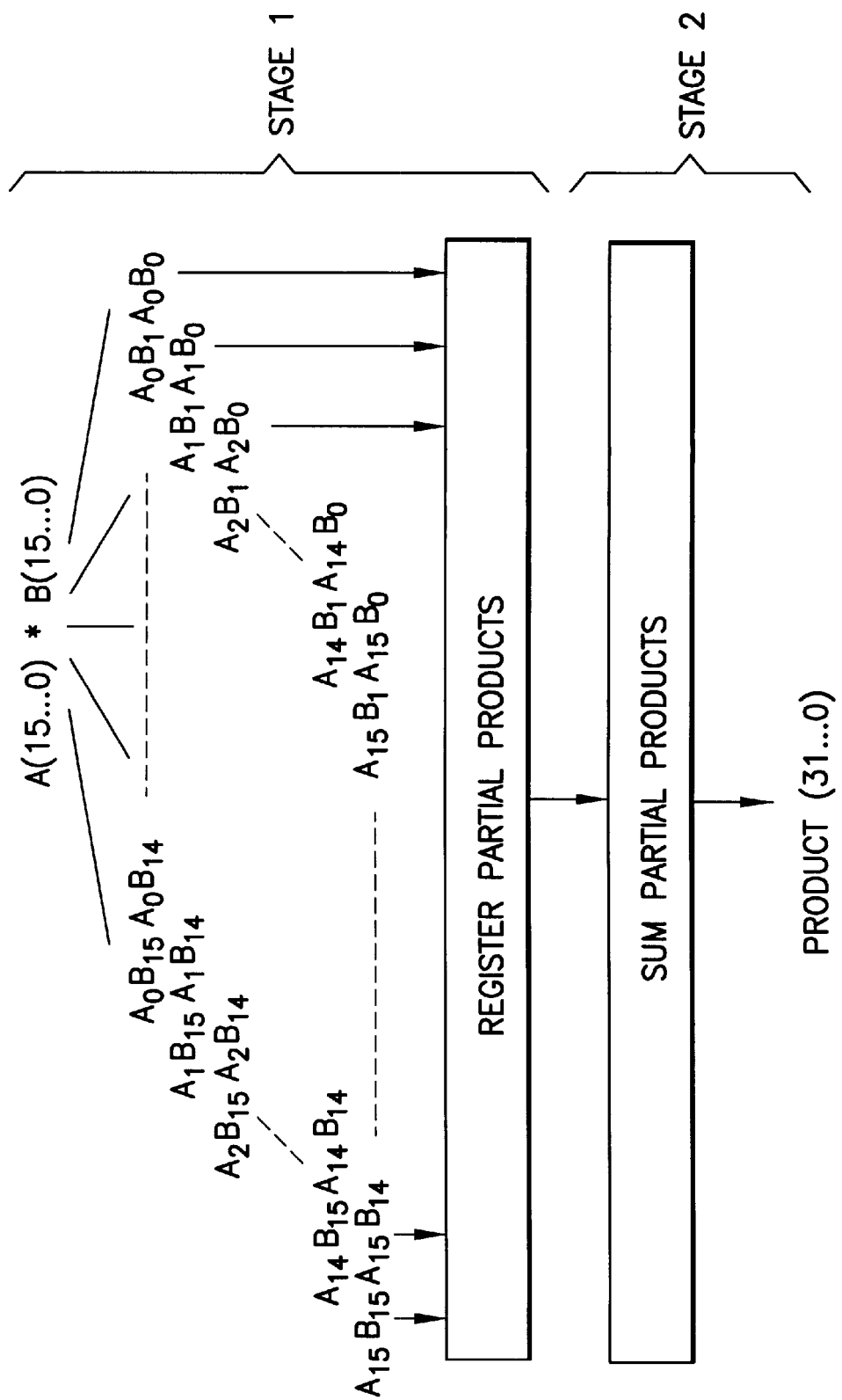

Referring to FIG. 5-1, the scalar processor 5 includes: a register bank, ALU, program counter, barrel shifter (rotate right), shift and rotate logic for single and double precision operands, Q-register, stack pointers, connections to the scalar memory (instruction cache 11), and connections to the extended registers.

The scalar processor 5 is controlled by the instruction unit 4, like the vector processors 6A, and operates in parallel with the vector processors 6A in lock step. It generates addresses for the data cache 12 when the vector processors 6A access the vector memory. It also generates addresses for itself when it needs to access the scalar memory 11. The scalar processor's program counter is responsible for accessing the instruction cache 11 for instruction fetches.

When computing addresses, the scalar processor 5 uses postfix addressing. The B operand input to the ALU is tied directly to the memory address register to support postfix addressing. Postfix operations are characterized by the fact that the operand is used before it is updated.

All memory is addressed uniformly, as a part of the same memory address space. Thus the instruction cache 11, data cache 12, and parallel port FIFOs 3 are all addressed the same. A single memory address generated by the scalar processor 5 is used simultaneously by all the vector processors 6A and itself. The scalar processor 5 has a 24-bit word size to address a maximum of 16 MB of RAM.

Register Bank

The scalar processor 5 has a register bank composed of 23 locations. The register bank is implemented as a triple-port SRAM with one read port, A, one read port, B, and a third write port. The address for read port B and the write port are combined. This configuration yields one read port and a read/write port—a two-address device. In a single cycle, two locations, A and B, can be read and location B can be updated.

Twenty-two of the register locations are general purpose. the $23^{rd}$, and last register, is intended as a vector stack pointer. It can be accessed as a general purpose register, but may be modified by the instruction unit 4 for vector stack operations.

Two transparent latches are provided to separate read and write operations in the register bank. During he first half of the clock cycle, data from the register bank is passed through the A latch and the B latch for immediate use and the write logic is disabled. During the second half of the clock cycle, the data in the latches is held and the write logic is enabled.

Arithmetic Logic Unit

The scalar processor 5 has a 16-function Arithmetic Logic Unit (ALU), supporting common arithmetic and Boolean operations. Unlike the vector processors 6A, the ALU can operate on only one data type, or 24-bit words in this embodiment of the invention. The scalar processor 5 ALU does not have saturation logic. ALU FUNCTIONS

| ALU FUNCTIONS | | | |
|---|---|---|---|
| Code | ALU Function | Code | ALU Function |
| 0h | A and B | 8h | A plus Carry FF |
| 1h | A xor B | 9h | A plus B plus Carry FF |
| 2h | A or B | Ah | A plus not (B) plus Carry FF |
| 3h | A | Bh | not (A) plus B plus Carry FF |
| 4h | not (A) and B | Ch | A minus 1 |
| 5h | A xnor B | Dh | A plus B |
| 6h | not (A) or B | Eh | A minus B |
| 7h | not (A) | Fh | B minus A |

Program Counter

The scalar processor 5 has a 24-bit program counter that is used to fetch instructions for the instruction unit. Although this is a writable register, it is preferred not to write to the program counter, as it will cause an unconditional branch. Instructions exist to support branching and subroutine calls, and these should be employed for making program counter modifications.

A block diagram of the program counter is seen in FIG. 5-2. There are two main blocks that comprise the program counter, the instruction fetch counter and the next address execute register. The instruction fetch counter is a self-incrementing, 24-bit counter with the task of addressing the instruction cache. The next address execute (NAE) register provides the address of the next instruction to execute when the program counter is read.

This program counter configuration is desired due to the pipelining in the instruction unit 4. The actual contents of the instruction fetch counter may contain addresses of instructions that will not execute for a several cycles, or that may not execute at all. Some fetched instructions will not execute if the instruction unit fetches too far ahead and a change of program flow occurs. Since the user is concerned with the program counter contents as they apply to executing instructions, rather than the contents as they apply to the instruction fetch mechanism, the Next Address Execute (NAE) register is provided. This register stores the address of the next instruction to execute. When the program counter is read, the contents of this register are used rather than the contents of the instruction fetch counter.

The next NAE register contents are loaded from the instruction fetch counter if extended instructions (64 bits) are executed or a pipeline burst is necessary. Pipeline bursts are caused by changes in program flow.

The next NAE register contents are loaded from the current NAE register contents, plus an offset of 4, if basic instructions are executed. Basic instructions are handled differently because of the way the instruction unit 4 handles fetches. The instruction unit 4 fetches 64 bits each cycle. If this word is actually two, 32-bit basic instructions then the instruction fetch counter stalls for a cycle to allow the first basic instruction to execute and the second 32-bit instruction to begin decode. When the instruction fetch counter stalls the NAE register calculates the next address using an offset of 4.

Barrel Shifter

The scalar processor 5 has a 24-bit barrel shifter. The shift is a logical right shift, i.e., data shifted out of the least significant bit is shifted back into the most significant bit. The barrel shifter can shift between 0 (no shift) and 15. If a shift greater than 15 is necessary, a couple of shifts (2 cycles) are needed. The barrel shifter's input is taken from the A port of the register bank.

Shifts and Rotates

In addition to the barrel shifter, the scalar processor 5 has dedicated shift and rotate logic for single and double precision operands. The shift and rotate logic takes its input from the ALU result for single precision and form both the ALU result and Q-register for double precision. Shift and rotates include the carry bit to allow extension of the operations to multiple words.

Single Precision Rotates

The rotate logic will rotate all the bits of the scalar ALU result one position and store the result in the scalar register bank or the Q-register.

Reference should be had to FIGS. 5.5.1.1 to 5.5.3.2 for the ensuing description of the various rotate and shift operations.

Rotate Right Logical

The most significant bit is loaded from the least significant bit. Bit 0 is shifted into the carry bit of the scalar status register.

Rotate Left Logical

The least significant bit is loaded from the most significant bit. Bit 23 is shifted into the carry bit of the scalar status register.

Single Precision Shifts

The shift logic will shift all the bits of the scalar ALU result one position to the right and store the result in the scalar register bank or the Q-register.

Shift Right Arithmetic

Each bit of the scalar ALU result is shifted to the right one bit. The sign bit (msb) is replicated, implementing a sign extenuation. Bit 0 is shifted into the carry bit of the scalar status register.

Shift Right Logical

Each bit of the scalar ALU result is shifted to the right one bit. The sign bit (msb) is stuffed with zero. Bit 0 is shifted into the carry bit of the scalar status register.

Double Precision Rotates

For double precision rotates, the scalar ALU result and the Q-register are concatenated to form a double precision long-word. All the bits of the long-word are rotated one position. Vacant bits in the scalar ALU result are filled with bits sifted out from the Q-register. Vacant bits in the Q-register are filled with bits sifted out from the scalar ALU result. The upper word ($bits_{47 \ldots 24}$) is stored in the Q-register.

Rotate Right

The double precision rotate (FIG. 5.5.3.1) right loads the most significant bit of the scalar ALU result with the least significant bit of the Q-register. The least significant bit of the scalar ALU result is shifted into the carry bit of the scalar status register as well as the most significant bit of the Q-register.

Rotate Left

The double precision rotate left (FIG. 5.5.3.2) loads the least significant bit of the scalar ALU result with the most significant bit of the Q-register. The most significant bit of the scalar ALU result is shifted into the carry bit of the scalar status register as well as the least significant bit of the Q-register.

Stack Pointers

Three stack pointers are provided to simplify the pushing and popping of data to and from stacks. These stack pointers are the scalar stack pointer, the interrupt stack pointer, and the vector stack pointer. The scalar stack pointer is provided for storing data related to the scalar processor. The interrupt stack pointer is provided for store data related to interrupts. Lastly, the vector stack pointer is provided for storing data related to the vector processors 6A. The scalar and interrupt stack pointers access data via the instruction cache and the vector stack pointer accesses data via the data cache.

The rules for stack operations are as follows. (A) The stack grows towards lower addresses. (B) The stack pointer contains the address of the last word entered into the stack. (C) The push (see FIG. 5-3) is implemented by pre-decrementing the stack pointer. The next cycle this new stack pointer can be used to address the stack and one cycle later the data can be written to the stack. If a series of pushes are needed then the same series of operations are pipelined resulting in a push every cycle. The last push should leave the stack pointer addressing the last word entered (rule B). (D) A pop (see FIG. 5-4) is implemented by using the current stack pointer to address the stack while postincrementing the stack pointer for subsequent stack operations. The next cycle data can be read from the stack. If a series of pops are needed then the operations can be pipelined resulting in a pop every cycle. Since the stack pointer in post-incremented for popping, it points to the last datum and no further stack alignment is necessary.

Additional stacks can be implemented using the scalar processor 5 general purpose registers. However, the user is responsible for adjusting the stack pointers and other stack management.

Scalar Stack Pointer

The scalar stack pointer is implemented from a 22-bit self-incrementing and self-decrementing counter. Only 22 bits are necessary since the least significant 2 bits are always zero, i.e., addressing only on 4 byte boundaries.

Interrupt Stack Pointer

The interrupt stack pointer is implemented from a 21-bit self-incrementing and decrementing counter. Only 21 bits are necessary since the least significant 3 bits are always zero, i.e., addressing only on 8 byte boundaries.

Vector Stack Pointer

The vector stack pointer is implemented from a dedicated register in the scalar register bank. The register with address 1Ch (i.e. $1C_{16}$) is set aside for this purpose. Since this is a general purpose register it has no self-incrementing and self-decrementing capabilities. The vector stack pointer relies on the scalar processor 5 ALU to perform these operations.

When any vector stack instruction is executed, the vector stack register is accessed as the destination register and the scalar ALU will force a constant 8h on its A input (which would normally be the source register). A constant 8h is used because the vector processors 6A must store 64 bits, therefore the pointer can only move in increments of 8 bytes. The scalar ALU executes either an add or subtract to complete the vector stack pointer update.

Immediate Operands

Immediate operands are necessary for loading constants into the scalar register bank. Instructions are 32-bits except when immediate data is appended forming a 64-bit instruction. Although 32-bits are provided for storing immediate data, only 24-bits are used. The instruction unit passes the 24-bits of immediate data to the immediate register in the scalar processor. The upper 8-bits are discarded. When the instruction that references immediate data is executed, the data passes from the immediate register to the destination. The immediate register is updated each cycle; therefore the contents are only valid with the instruction that referenced the immediate register.

Immediate operands can also be used as addresses. Using an appropriate pair of instructions, immediate data can be forced to propagate to the memory address register in either the instruction cache 11 or the data cache 12.

Since the immediate register is read only it can be used as a destination register without affecting its contents. This forces the immediate data to propagate to the memory address select logic via the B mux (see FIG. 5-1.) Provided the next instruction to execute is a memory reference, the immediate data is then be used as an address.

Return Address Register

The return address register is not directly addressable. It is used exclusively by the instruction unit's interrupt controller for hardware and software interrupts and subroutine calls.

Processor Status Register

The 24-bit scalar processor 5 status word is:

OF: scalar processor 5overflow status
WB: register window base

Software Interrupt Data

The non-maskable software interrupt has a 4-bit interrupt code field that is used to pass a 4-bit parameter to the interrupt routine. This 4-bit parameter is stored in the SWD field of the processor status word.

When a software interrupt is executed, the instruction unit 4 extracts the software interrupt data. This software interrupt data is stored in the processor status word immediately after the status word is placed on the scalar stack and before the interrupt routine begin execution. Therefore, the newly stored software interrupt data is available for use in the interrupt routing but is not restored when a return is executed. However, the contents of the SWD field before executing the software interrupt are restored.

Selecting Vector Processor 6A Status Bits

To provide immediate access to any one of the vector processor 6A status registers, a 4-bit SV field is provided in the scalar processor 5 status word. Although only two bits are used to select a vector processor 6A, four bits are provided to allow for expansion. The contents of the upper two bits are not significant. The SV field selects vector processors 6A according to the following:

| $SV_{16...13}$ | selected vector processor |
|---|---|
| XX00 | VP0 |
| XX01 | VP1 |
| XX10 | VP2 |
| XX11 | VP3 |

The selected vector processor 6A status bits reflect the contents of the appropriate processor. These status bits are read only since the scalar processor 5 cannot modify the status bits of any of the vector processors 6A.

Two additional bits, not associated with any one vector processor 6A, are provided to give information on vector processor 6A status. The contents of the SV field have no affect on these bits. The AD bit indicates if all the vector processors 6A are disabled and the AZ bit indicates if all enabled vector processors 6A have their zero status bits set.

Register Window Base

Register Windows are used to address a large number of registers in the vector processors 6A while reducing the

| SWD | IE | AD | AZ | SV | VZ | VN | VC | VOF | VE | C | N | Z | OF | WB |
|---|---|---|---|---|---|---|---|---|---|---|---|---|---|---|
| bit: 23..20 | 19 | 18 | 17 | 16..13 | 12 | 11 | 10 | 9 | 8 | 7 | 6 | 5 | 4 | 3..0 | mnemonic description

SWD: software interrupt data

IE: hardware-interrupt enable

AD: all vector processors 6A disabled

AZ: all vector processors 6A zero

SV: select vector processor 6A

VZ: selected vector processor 6A zero status

VN: selected vector processor 6A negative (sign) status

VC: selected vector processor 6A carry status

VOF: selected vector processor 6A overflow status

VE: selected vector processor 6A enable status

C: scalar processor 5carry status

N: scalar processor 5negative (sign) status

Z: scalar processor 5zero status number of bits in the instruction word used to access the register banks. The port A address and port B address are both mapped, and they are mapped the same. The WB field of the processor status word controls the mapping.

The 64 registers in the vector processor 6A register bank are divided into 8 windows of 16 registers. The windows move in increments of eight registers to provide overlap between registers in successive windows, as seen in FIG. 5-5.

The WB field only uses three bits to control the window mapping. A fourth bit is provided for future versions. The mapping for the WB field is listed below:

| $WB_{3...0}$ | window mapping |
|---|---|
| X000 | register window 0 |
| X001 | register window 1 |
| X010 | register window 2 |
| X011 | register window 3 |
| X100 | register window 4 |
| X101 | register window 5 |
| X110 | register window 6 |
| X111 | register window 7 |

Extended Registers

The DSP Chip 1 has 54 extended registers, which are accessed via the scalar processor 5. These registers are considered extended because they are not part of the programming model and are addressed using special instructions.

Each extended register is assigned a device number, associating the register with a particular functional unit. Additionally, each extended register is assigned a specific number within each device. The combination of the device number and register number results in an extended register address.

Scalar I/O Bus The extended registers are accessed via the 24-bit, bi-directional scalar I/O bus. Only the scalar processor 5 can use the I/O bus for transferring data. Although the scalar I/O bus is bi-directional, the scalar processor 5 can only read or only write in a single cycle. Therefore, in the presently preferred (but limiting) embodiment of this invention, it is not possible to perform read-modify-writes with an extended register as it is possible with the scalar registers. The data must instead be read, modified, and stored in a local register—and on a subsequent cycle, the result written back to the appropriate extended register. The scalar I/O bus is driven from the A-mux of the scalar processor 5.

Interrupt Timer

The DSP Chip 1 has 24-bit interrupt timer driven from the CPU clock. This timer is implemented using a 24-bit decrementing counter. When the counter reaches zero it generates an interrupt request, provided the interrupt timer has been enabled. Additionally, when the timer reaches zero it reloads itself with a countdown time specified in one of the timer control registers.

Control Registers

The interrupt timer has two control registers, an interrupt vector register and timer countdown register. The interrupt vector register stores two control bits and the address of the interrupt routine that executes when the timer requests an interrupt. The timer countdown register stores the 24-bit value that is loaded into the timer counter when it reaches zero (see FIG. 6-1).

The timer interrupt vector contains only 22 bits because the instruction unit 4 has a minimum instruction-addressing offset of 4 bytes. If a timer interrupt is granted, the interrupt controller loads the program counter with the address specified by the timer interrupt vector. Two zeros are stuffed into the first two bit-positions to form a 24-bit address.

The E field is the timer enable bit. Setting this bit enables the timer to generate interrupt requests. At reset, this bit is cleared, preventing the timer from interrupting until it has been appropriately configured.

The IR field is the interrupt request bit that triggers a response from the interrupt controller. The interrupt timer sets this bit if the E field is set and the timer reaches zero. Clearing this bit removes the interrupt request. The user can set this bit, although it is not recommended since it will trigger a hardware interrupt. At reset, this bit is cleared.

CPU Cycle Counter

The CPU Cycle Counter is a free-running 24-bit counter. This counter resets to zero when the RESET pin is asserted and counts up by one each cycle of the CPU clock. When the counter reaches FFFFFFh, the maximum count, it rolls over the zero to begin counting again.

External Trigger (SYNC)

When a write to the CPU cycle counter is performed, rather than update the counter contents, an external trigger is strobed. A SYNC pin of the DSP Chip 1 is the trigger output.

Enumerated Extended Register Set

A listing of all the extended registers is provided below in ascending order:

| Device | Device Number | Register Number | Description |
|---|---|---|---|
| Scalar processor | 0 | 1Fh . . . 0h | local register set |
| Right Parallel Port | 1 | 0h | Source address |
| | | 1h | Field start (video mode)/Destination address |
| | | 2h | Line start (video mode) |
| | | 3h | Buffer start (video mode) |
| | | 4h | Line length (video mode) |
| | | 5h | Frame status |
| | | 7h . . . 6h | not used |
| | | 8h | Transfer size |
| | | 9h | Port status word |
| | | Ah | Interrupt vector |
| | | Bh | Interrupt status |
| Left Parallel Port | 2 | 0h | Source address |
| | | 1h | Field start (video mode)/Destination address |
| | | 2h | Line start (video mode) |
| | | 3h | Buffer start (video mode) |
| | | 4h | Line length (video mode) |
| | | 5h | Frame status |
| | | 7h . . . 6h | not used |
| | | 8h | Transfer size |
| | | 9h | Port status word |
| | | Ah | Interrupt vector |
| | | Bh | Interrupt status |
| Host Parallel Port | 3 | 0h | Source address |
| | | 1h | Field start (video mode)/Destination address |
| | | 2h | Line start (video mode) |
| | | 3h | Buffer start (video mode) |
| | | 4h | Line length (video mode) |
| | | 5h | Frame status |
| | | 7h . . . 6h | not used |
| | | 8h | Transfer size |
| | | 9h | Port status word |
| | | Ah | Interrupt vector |
| | | Bh | Interrupt status |
| RS232 Port (UART) | 4 | 0h | Receive buffer/ Transmitter holding register |
| | | 1h | RS232 interrupt enable |
| | | 2h | Interrupt identification (read)/FIFO control (write) |

-continued

| Device | Device Number | Register Number | Description |
|---|---|---|---|
| | | 3h | Line control |
| | | 4h | MODEM control |
| | | 5h | Line status |
| | | 6h | MODEM status |
| | | 7h | not used |
| | | 8h | Interrupt Vector |
| none | 7 . . . 5 | none | unused devices |
| Instruction Cache Controller | 8 | 0h | Miss Counter (read only) |
| | | 1h | Tag register |
| Data Cache Controller | 9 | 0h | Miss Counter (read only) |
| | | 1h | Control register |
| System | 11 | 0h | CPU cycle counter (read)/external trigger (write) |
| | | 1h | Timer countdown value |
| | | 2h | Timer interrupt vector |
| | | 3h | Timer (read only) |
| | | 7h . . . 4h | not used |
| | | 8h | Pixel distance register |
| | | 9h | Best pixel distance register |
| Vector processor 6A 0 | 12 | 0h | A-mux (read only) |
| Vector processor 6A 1 | 13 | 0h | A-mux (read only) |
| Vector processor 6A 2 | 14 | 0h | A-mux (read only) |
| Vector processor 6A 3 | 15 | 0h | A-mux (read only) |

Instruction Unit 4

Figures 1, 3:
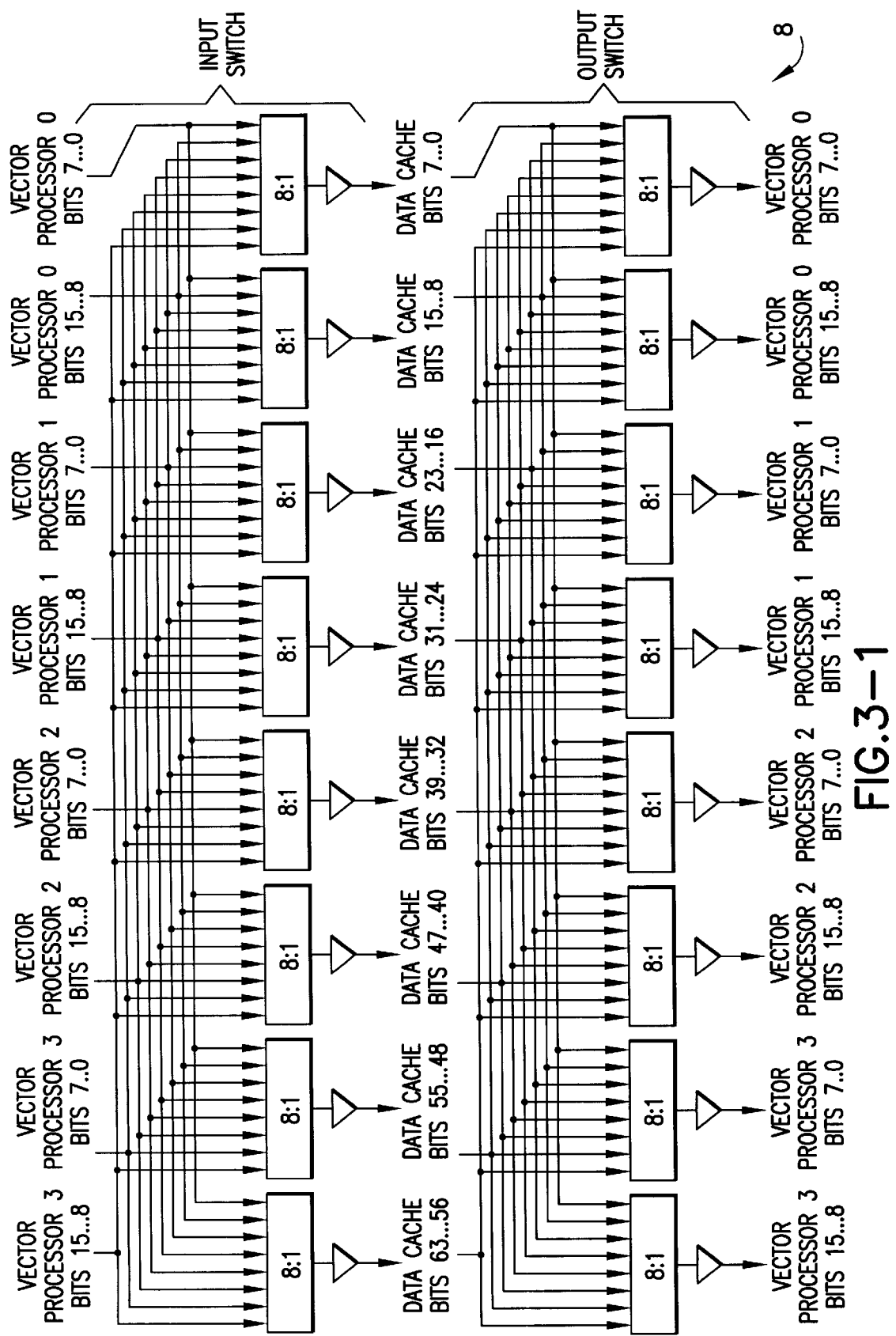
Figures 2A, 3:
Figures 2B, 3:
Figures 3, 3A:
Figures 3, 3B:
Figures 3, 4, 4A:
Figures 3, 4, 4B:
Figures 3, 4, 5, 5A:
Figures 3, 4, 5, 5B:
Figures 3, 4, 5, 6, 6C:
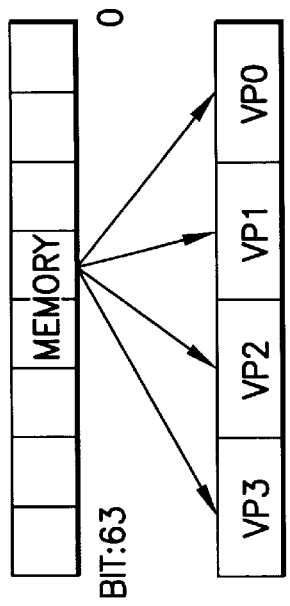
Figures 3, 4, 5, 6, 6D:
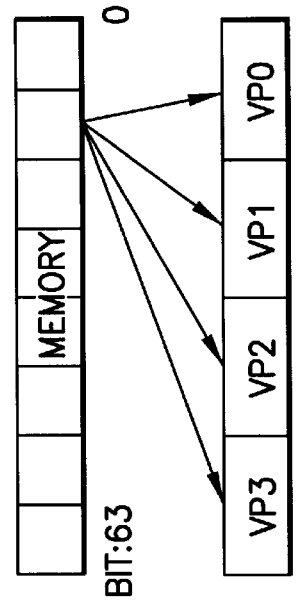
Figures 3, 4, 5, 6, 6A:
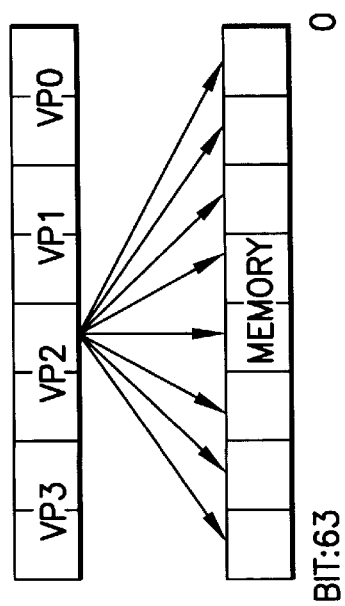
Figures 3, 4, 5, 6, 6B:
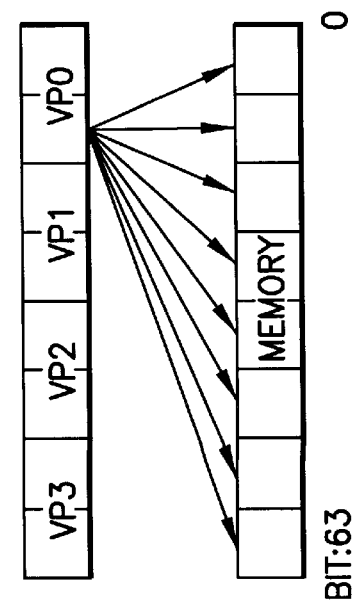
Figures 3, 4, 5, 6, 7:
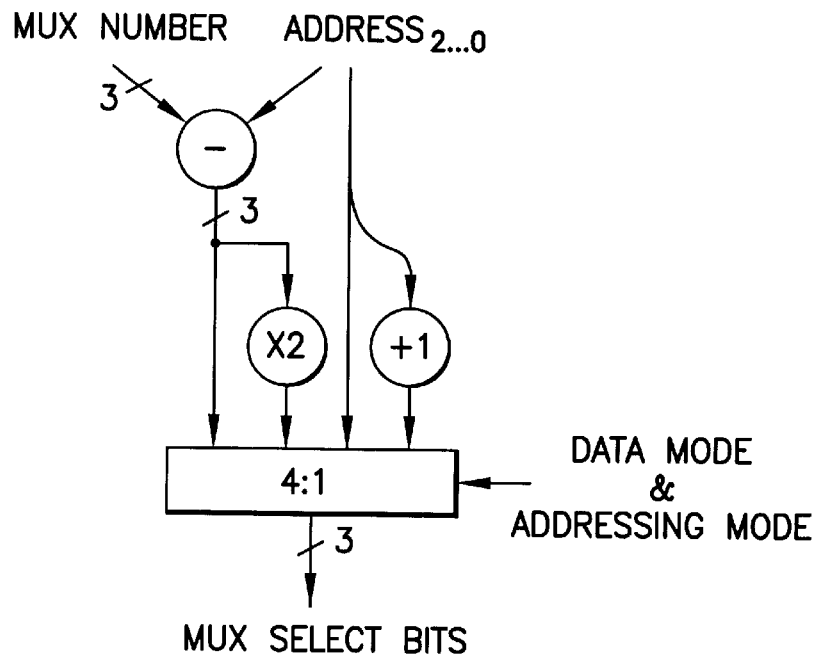

Referring to FIG. 7-1, the DSP Chip 1 Instruction Unit 4 is responsible for fetching, decoding, and executing all instructions. The instruction unit 4 accomplishes its task with a multi-stage pipeline and several controllers. The pipeline is responsible for maintaining a constant flow of instructions to the controllers. The controllers are responsible for decoding instructions and producing control signals for the appropriate functional unit.

Pipeline

The instruction unit 4 contains a pipeline with two stages for the instruction cache 11 control bits and three stages for the scalar processor 5 and data cache 12 control bits, and lastly a fourth stage for the vector processor 6A control bits. The main stages are program counter, instruction decode, scalar instruction register and vector instruction register as seen in FIG. 7-2.

The operation of the instruction unit 4 for a simple case is as follows.

(1) The contents of the program counter are used to access the tag RAM in the instruction cache 11. The cache tag and program counter are compared to detect the presence of the required address. The tag RAM register is loaded at the end of the clock cycle. The program counter is loaded or updated at the end of every active cycle.

(2) If the instruction is in the instruction cache 11, the cache is accessed using the contents of the tag RAM register; otherwise a cache miss operation is begun which will require waiting until the required address is present. With the instruction present, the contents of the decode buffer, which are 64-bits long, are partially decoded to determine whether a basic instruction (32-bits) or an extended instruction (64-bits) is begin decoded, and if any scalar memory accesses will execute next. Additionally, the register window for the vector processors 6A is resolved. Finally, the opcode modifier is decoded to provide secondary decoding for the scalar opcode field. The scalar instruction register is loaded from the decode buffer at the end of the clock cycle.

(3) The contents of the program counter are used to access the tag RAM in the instruction cache 11. The cache tag and program counter are compared to detect the presence of the required address. The tag RAM register is loaded at the end of the clock cycle. The program counter is loaded or updated at the end of every active cycle.

(4) If the instruction is in the instruction cache 11, the cache is accessed using the contents of the tag RAM register; otherwise a cache miss operation is begun which requires waiting until the required address is present. With the instruction present, the contents of the decode buffer, which are 64-bits long, are partially decoded to determine whether a basic instruction (32-bits) or an extended instruction (64-bits) is begin decoded and if any scalar memory accesses will execute next. Additionally, the register window for the vector processors 6A is resolved. Finally, the opcode modifier is decoded to provide secondary decoding for the scala opcode field. The scalar instruction register is loaded from the decode buffer at the end of the clock cycle.

(5) The contents of the scalar instruction register, which are somewhat longer than 64-bits, are executed by the scalar processor 5. The major data paths, such as scalar register addressing and the ALU operations in the scalar processor 5 are controlled directly. The opcode modifier, register in the scalar instruction register, is again used to provide secondary decoding, now for the vector opcode field. Vector memory accesses are decoded and the vector instruction register is loaded from the vector control bits of the scalar instruction register at the end of the cycle.

(6) The contents of the vector instruction register are executed by the vector processors 6A. The major data paths of the vector processors 6A and vector register addressing are controlled directly.

The scalar processor 5 and vector processors 6A execute instructions out of phase because there is an inherent one cycle delay between the scalar processor 5 and the vector processors 6A when performing memory references. This is because the scalar processor 5 must generate the address for the memory reference one cycle before the vector processors 6A access the memory, i.e., the cache needs to tag the address in advance of the memory access.

Requiring the scalar processor 5 to execute one stage earlier in the pipeline provides the DSP Chip 1 with a simplified programming model. For example, the programmer can code a scalar addressing instruction in parallel with a vector memory reference, rather than programming an addressing instruction in series with a memory access.

Instruction Unit 4 Controllers

The DSP chip 1 instruction unit 4 has seven combinatorial logic blocks (controllers) that are responsible for decoding instructions to produce signals that directly control the various logic blocks, data paths, and registers of the DSP chip 1. The functional units include the scalar processor 5, vector processors 6A, the crossbar 8, etc. of FIG. 1-1.

Instruction Cache Controller

The instruction (I) cache controller is responsible for generating all the signals needed to control the instruction cache 11. The input of the I-cache controller is taken from the instruction decode buffer. The output is set directly to the instruction cache 11. The instruction cache controller decodes a cycle before the scalar instruction executes because it is necessary to determine if the next scalar instruction will access the instruction cache 11. This one cycle allows the instruction cache 11 to address a location for the data that will be produced by the scalar processor 5 on the next cycle.

Scalar Controller

The scalar controller is responsible for generating all the signals needed to control the scalar processor 5. The input of the scalar controller is taken from the instruction decode buffer. The output of the scalar controller is registered in the scalar instruction register for immediate use at the beginning of the next cycle.

Data Cache Controller

The data (D) cache controller is responsible for generating all the signals needed to control the data cache 12. The input of the D-cache controller is taken from the scalar instruction register. The output of the data cache controller is sent directly to the data cache 12. The data cache controller decodes a cycle before the vector instruction executes because it is necessary to determine if the next vector instruction will perform a data cache 12 access. This one cycle allows the data cache 12 to address a location for the data that will be produced by the vector processors 6A on the subsequent cycle.

Parallel Arithmetic Unit Controller

The parallel arithmetic unit controller is responsible for generating all the signals needed to control the vector processors 6A in lock step. The input of the parallel arithmetic unit controller is take n from the scalar instruction register and the output of registered in the vector instruction register for immediate use in the next cycle.

Crossbar Switch Controller

The crossbar switch controller is responsible for generating the control signals for the crossbar switch 8. Since the crossbar 8 and parallel arithmetic unit operate in concert to perform memory operations, the crossbar controller works in parallel with the parallel arithmetic unit. The crossbar controller takes its input from the scalar instruction register and its output is registered in the vector instruction register for immediate use on the next cycle.

Extended Register Controller

Each extended register is handled as an independent register since it must access the scalar I/O bus independently. However, only one device on the scalar I/O bus can be active at a time. To control which register is active, the instruction unit 4 has a dedicated extended register controller to handle all input and output control for these registers. The extended register controller also controls the scalar processor 5 I/O bus tri-state drivers.

Interrupt Controller

The interrupt controller is responsible for performing all the overhead necessary to store and restore the processor state when a subroutine call, software interrupt, or hardware interrupt is executed.

Interrupt Priorities

The hardware interrupts are given priorities according to the following:

| Priority Level | Functional Unit |
| --- | --- |
| Highest Priority | Right Parallel Port |
| 2 | Left Parallel Port |
| 3 | Host Parallel Port |
| 4 | Interrupt Timer |
| Lowest Priority | UART Interrupts |

Interlocks

There are some combinations of instructions that cannot be separated because they create a sequence of indivisible operations that collectively perform a single task. While any one of these indivisible operations is being performed, the interrupt controller generates an interlock to prevent hardware interrupts, software interrupts, and subroutine calls from breaking the pair. The interlocks are as follows:

Scalar memory addressing—Whenever the scalar processor 5 addresses the scalar memory it must execute the next instruction that modifies the addressed location.

Inter-processor communications—Whenever the Scalar Processor Broadcast (SPB) register in the vector processors 6A is addressed as a read or write, then the next vector instruction must execute.

Subroutine calls—The instruction unit 4 must complete a subroutine call and begin executing new instructions before additional subroutine calls or hardware interrupts or software interrupts can be executed.

Program jumps—Similar to subroutine calls, program jumps cannot be interrupted until execution begins at the new program location.

Returns (interrupt or subroutine)—A return from interrupt and a return from subroutine are identical, except for which stack is used to retrieve previously stored information. Each causes an interlock until program execution resumes.

Level 1 Caches

The DSP Chip 1 has two level-1 caches, namely the instruction cache 11 and the data cache 12. Both of these caches are implemented in the same manner, except the data cache 12 has additional logic to implement indexed addressing. The caches are central to the operation of the DSP chip 1, as all data and instructions are accessed through the caches. To improve performance, optimizations such as caching policies and replacement algorithms are implement in hardware.

As was stated previously, the caches are two-way, set-associative memories that provide data to the vector processors 6A, scalar processor 5, and instruction unit 4. Their capacity of 1 Kbyte is sufficient to store between 128 and 256 instructions, i.e., enough to store I/O routines and several program loops, or 1 Kbyte of vector data.

A small tag RAM stores the information necessary to determine whether or not a program segment, scalar data, or vector data is stored in the cache. The tag RAM also stores information used in implementing a least recent used (LRU) replacement algorithm. The tag RAM contains two halves for storing information concerning two sets (or ways).

To improve performance further, both caches have dedicated use-as-fill logic. Use-as-fill allows the memory interface to write data into the cache via the memory interface side, while data can be accessed from the other side for use by the processors 5 or 6A, hence use-as-fill. This technique may save several cycles of execution time by allowing the processors to proceed as soon as the needed data is available.

Figures 3, 4, 5, 6, 7, 8:
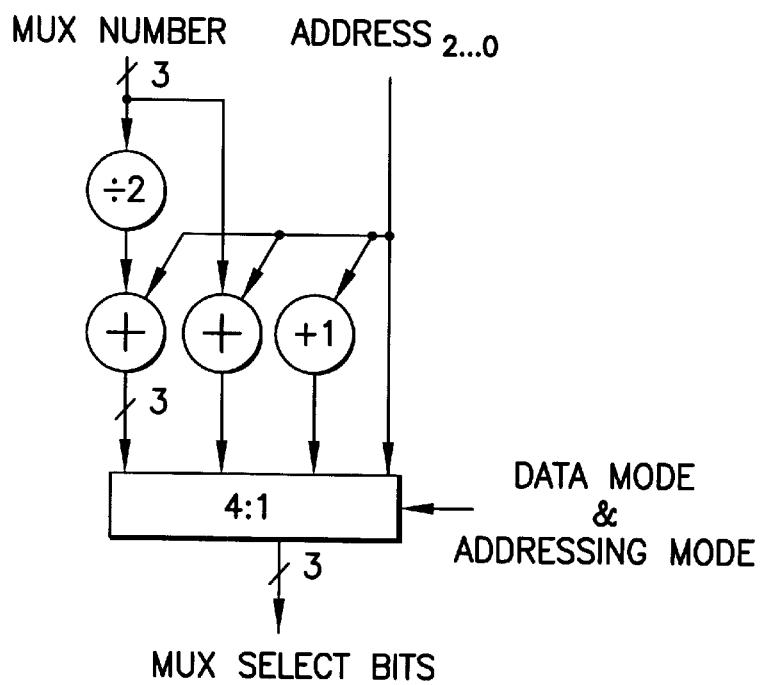
Figures 1, 4:
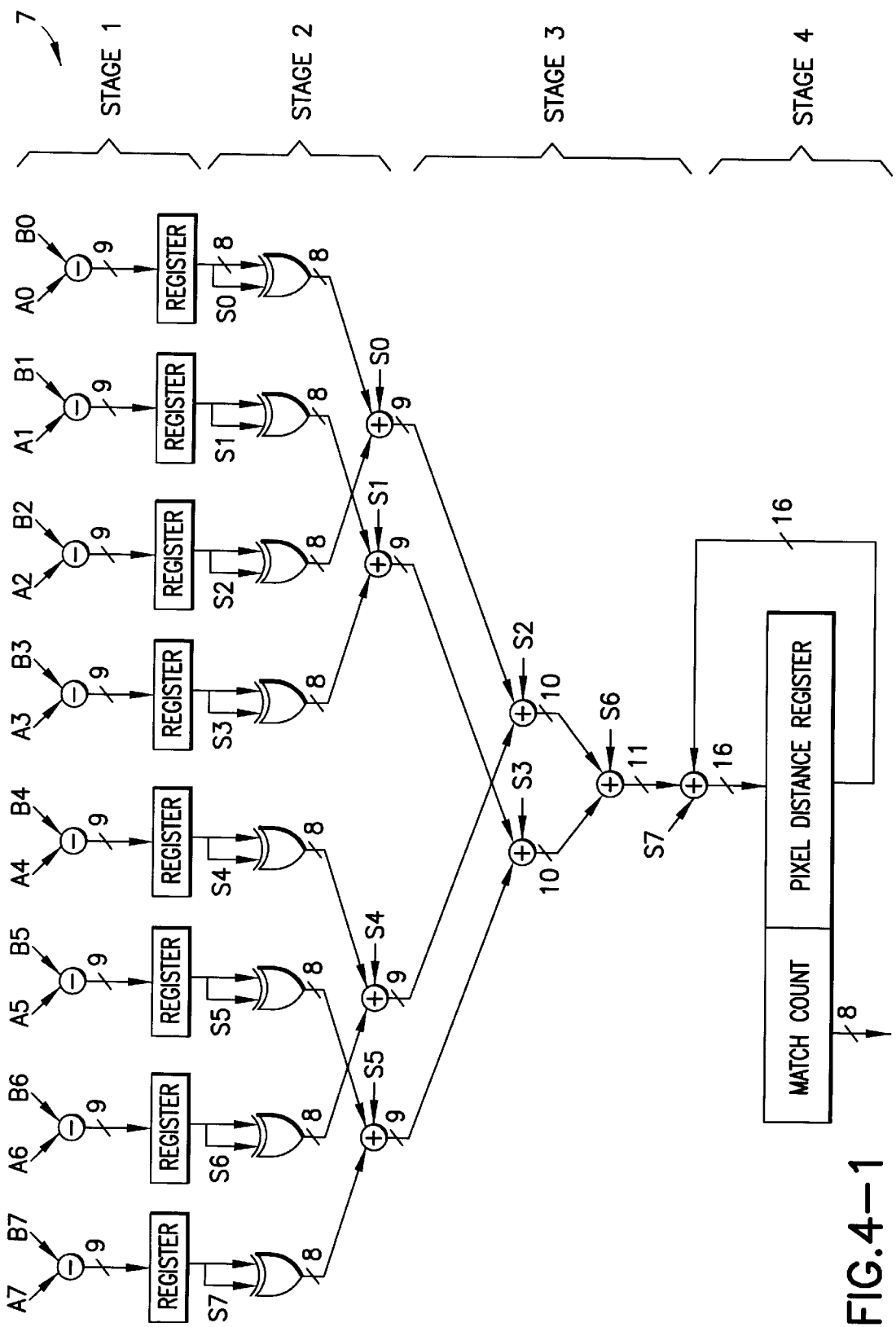
Figures 1B, 5:
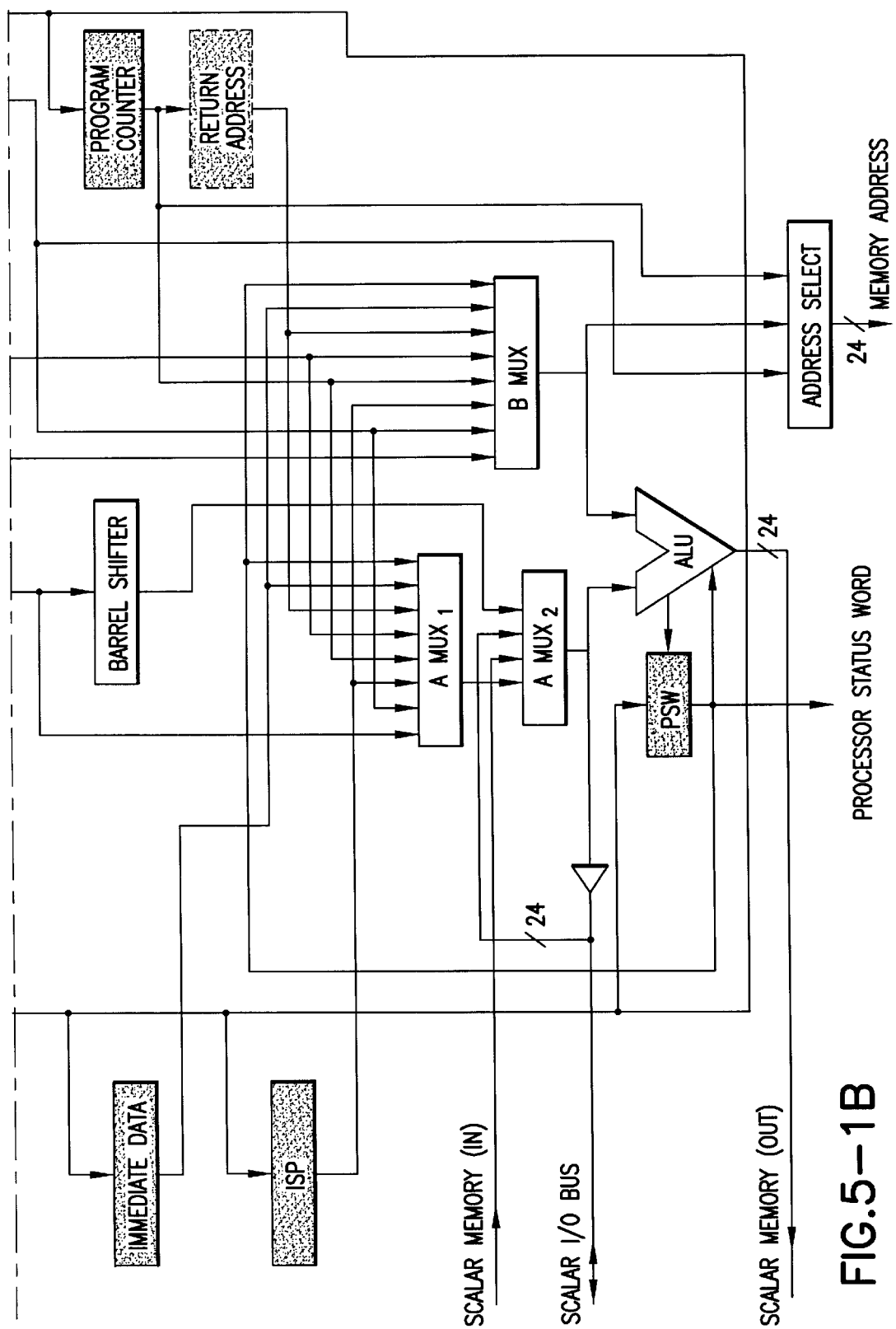
Figures 2, 4:
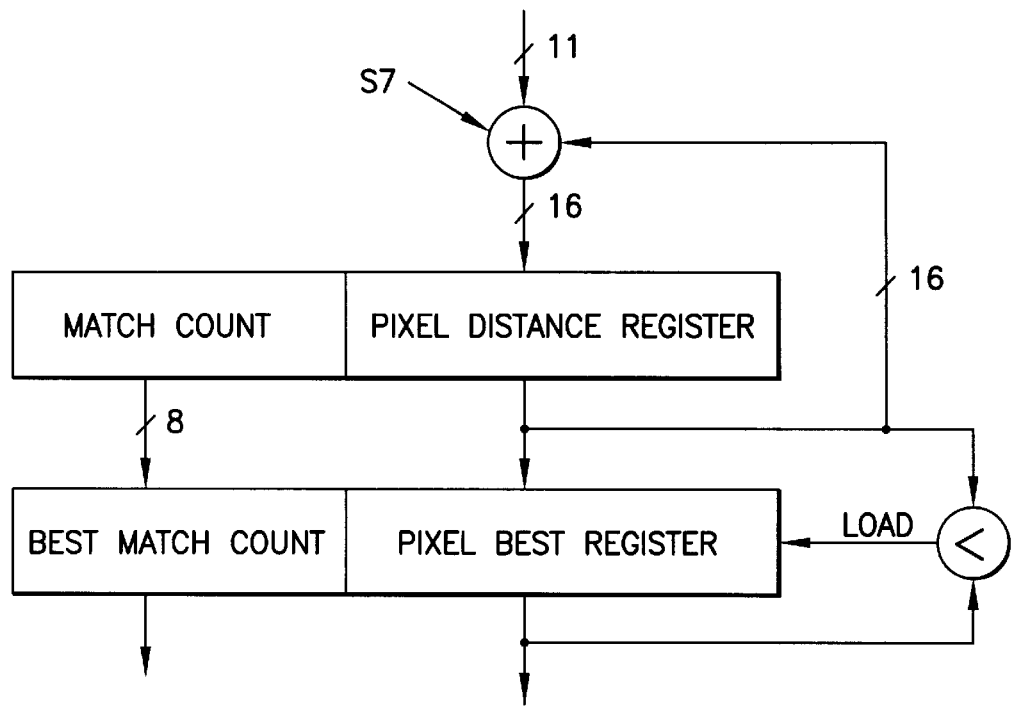
Figures 2, 5:
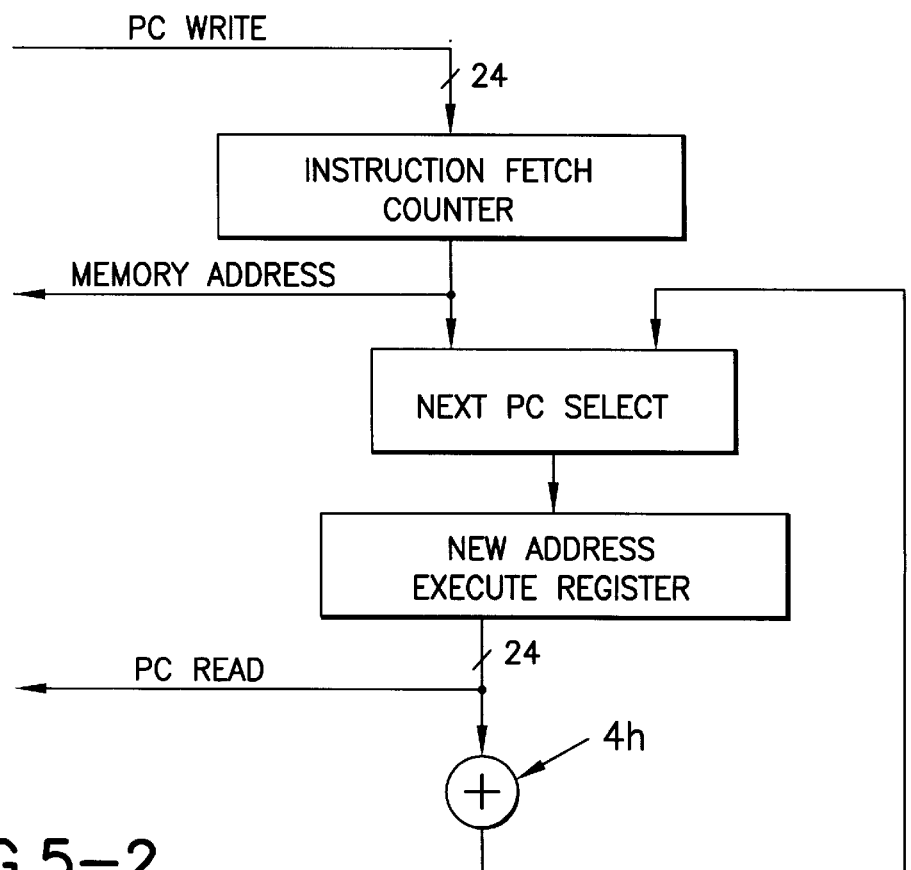
Figures 3, 5:
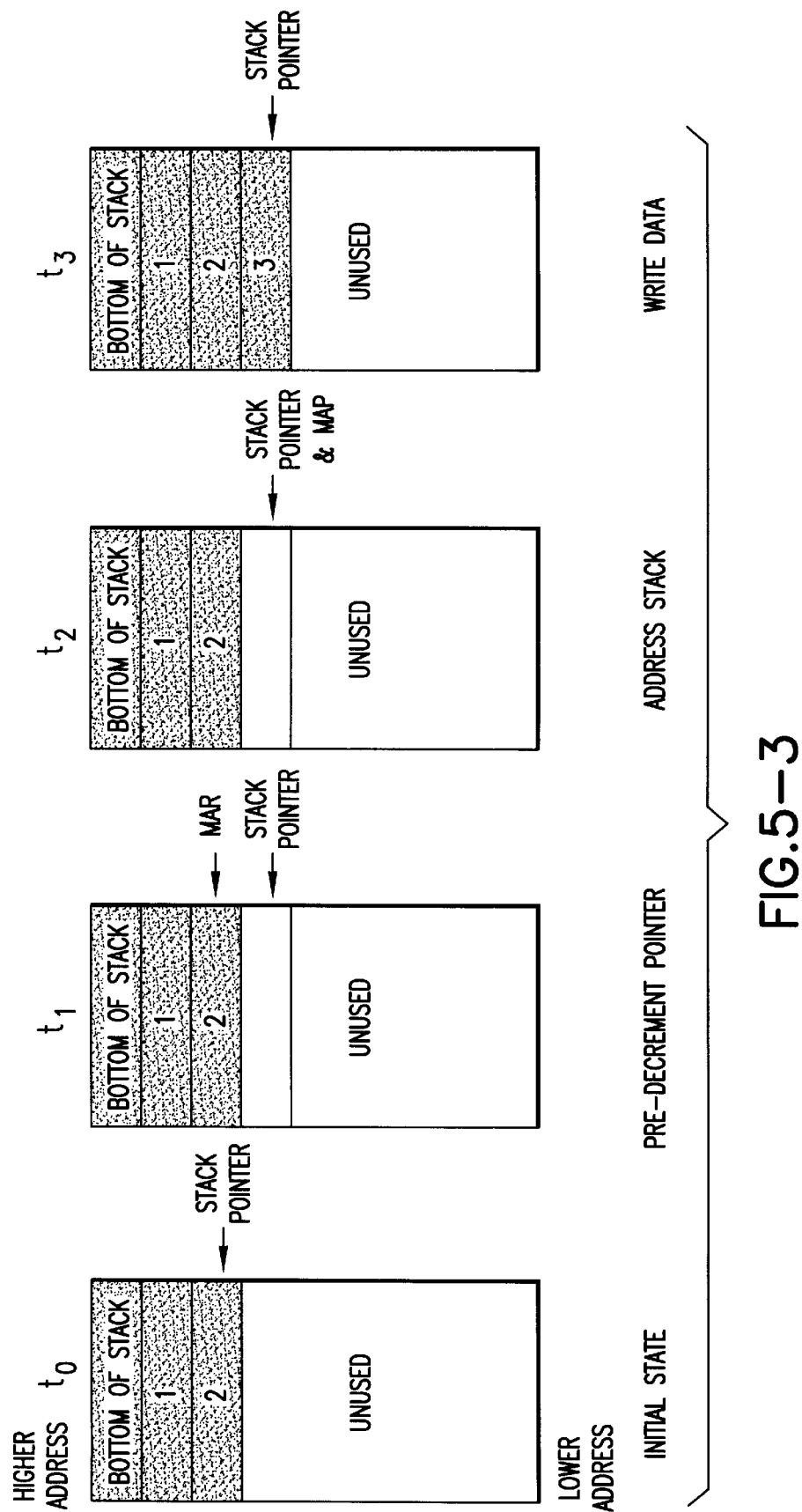
Figures 4, 5:
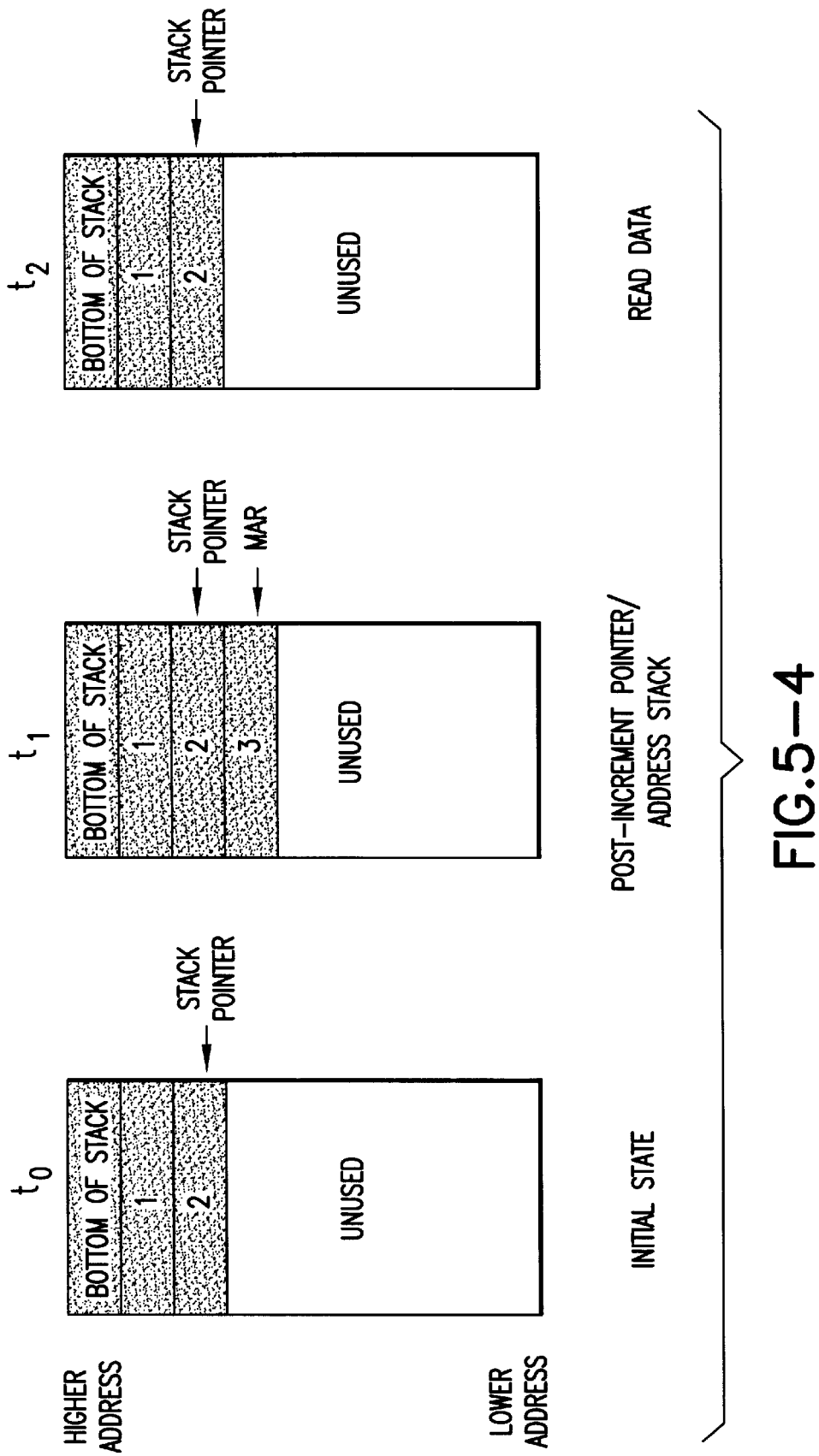
Figure 5:
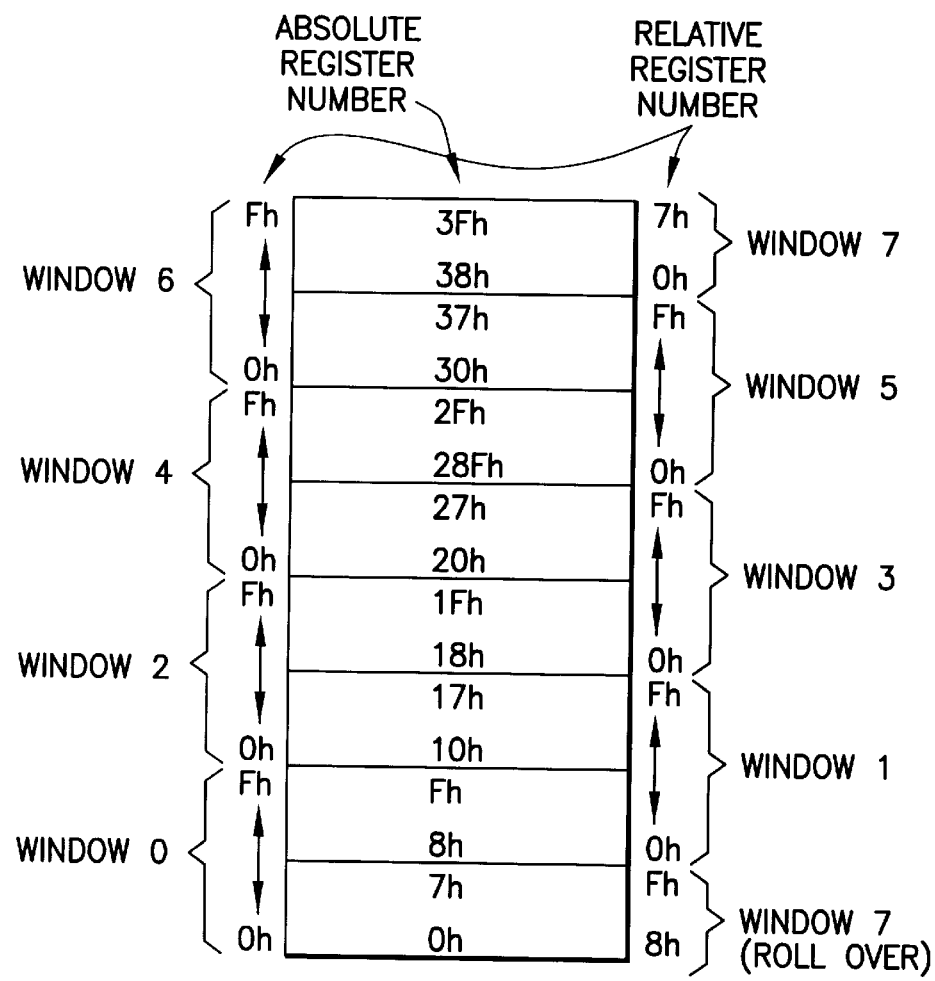
Figures 1, 6:
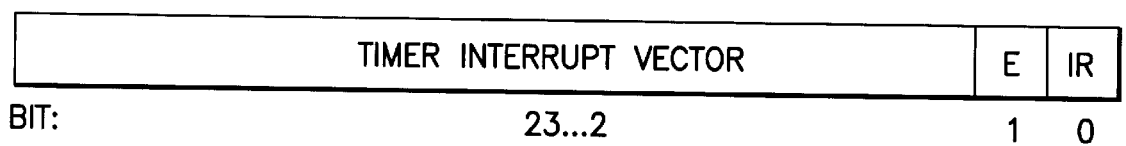
Figures 1B, 7:
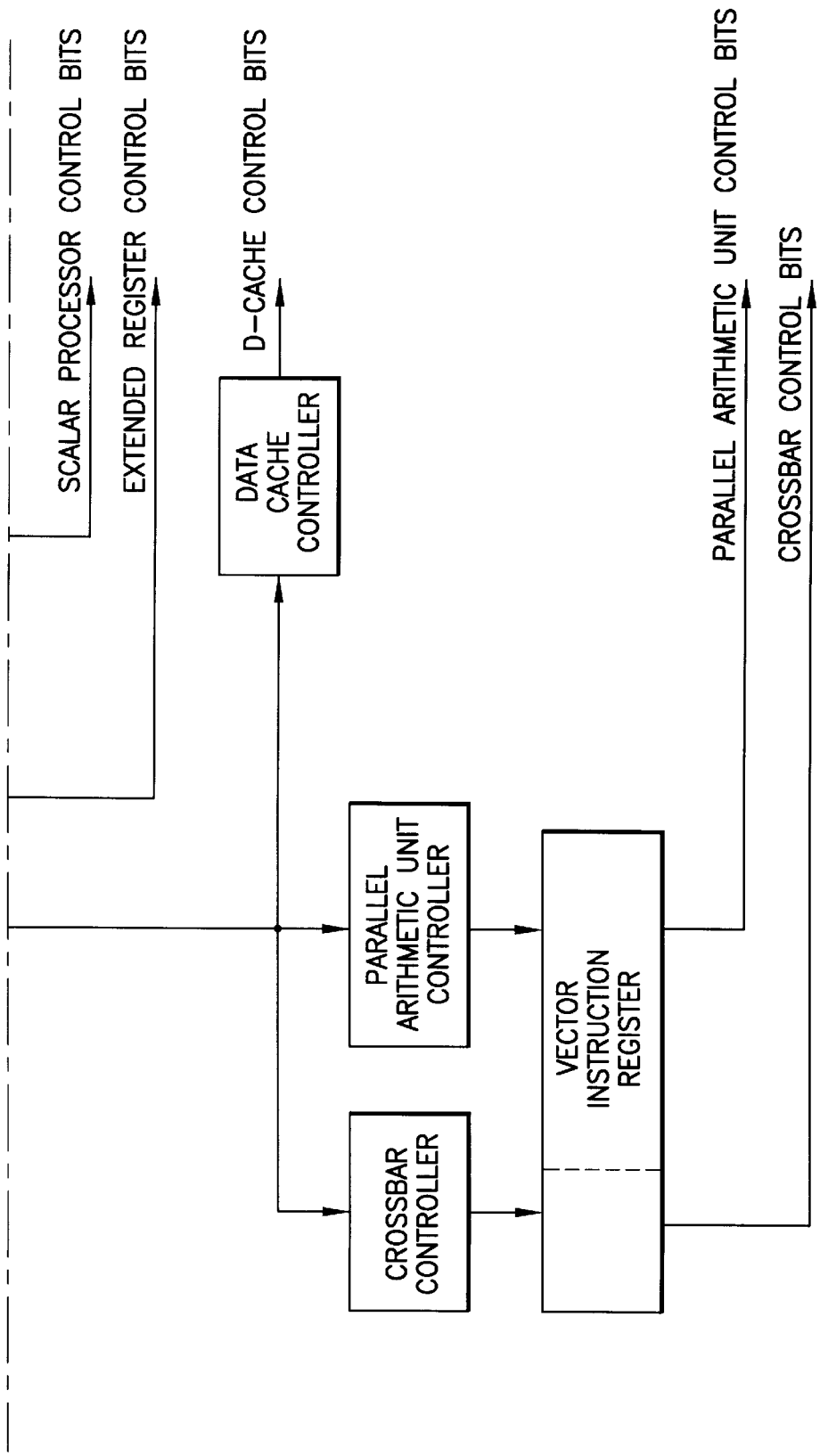
Figures 2, 7:
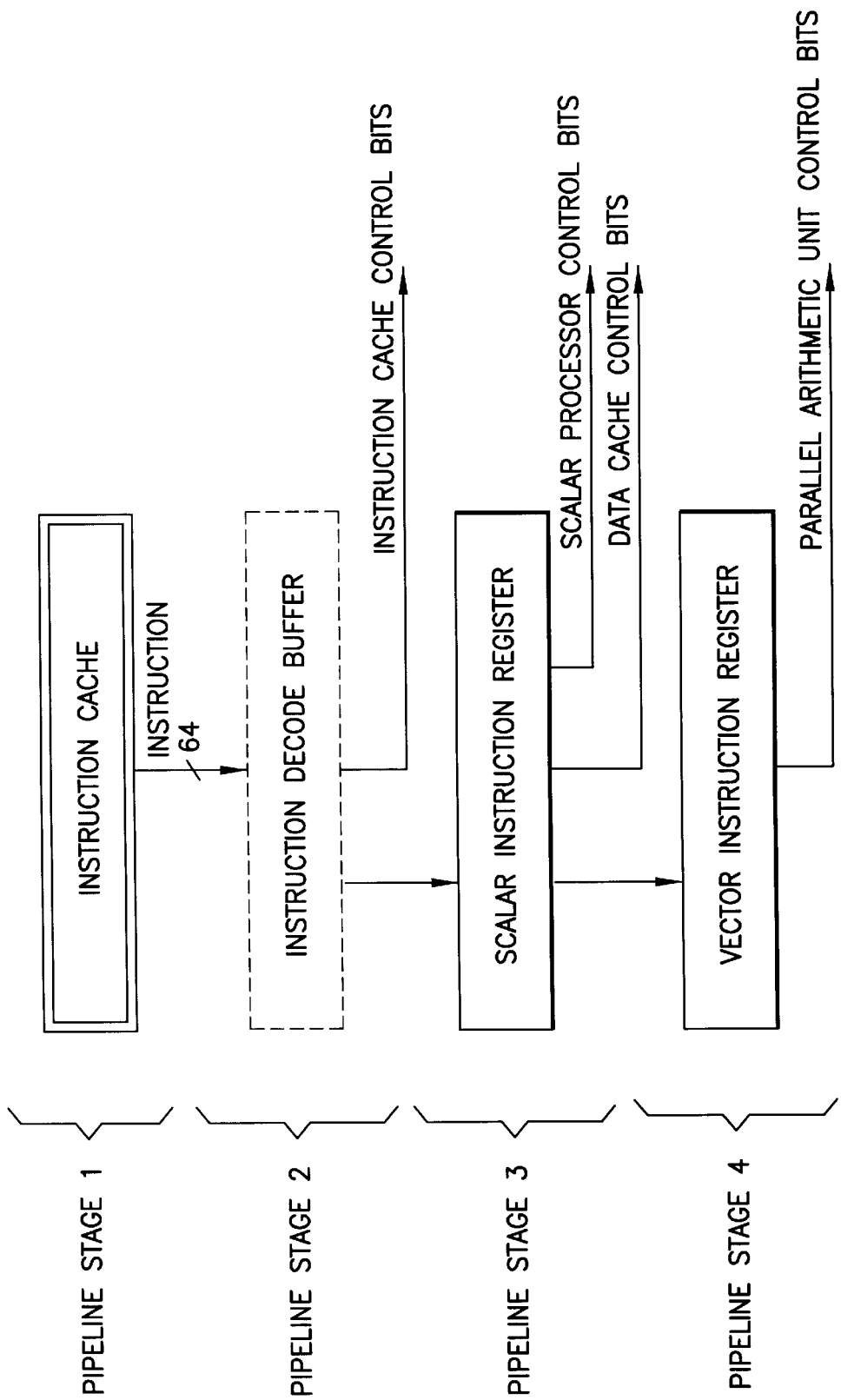
Figures 2, 8:
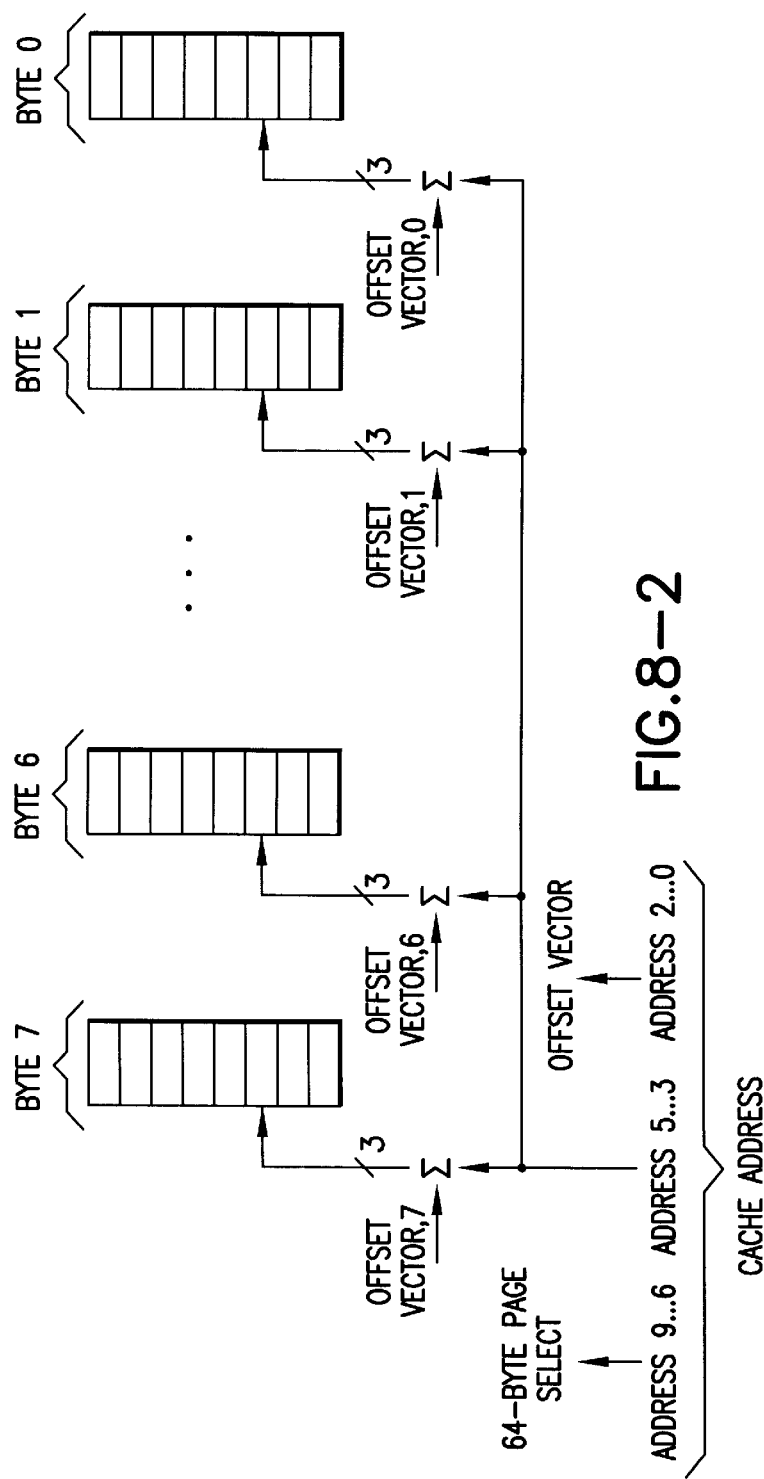
Figures 3, 8:
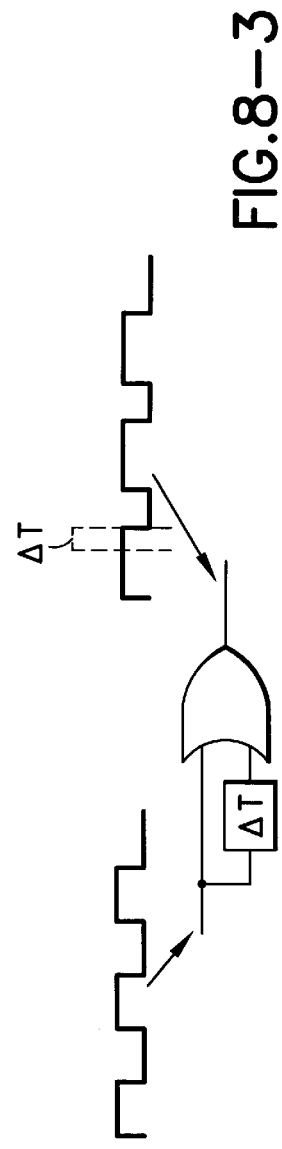

A block diagram of a generic cache controller is seen in FIG. 8-1. This diagram can be applied to either the instruction cache 11 or the data cache 12cache since they contain identical elements.

Instruction Cache 11

The instruction cache 11 provides instructions to the instruction unit 4 and scalar data to the scalar processor 5. Instructions to the instruction unit 4 are 64-bits wide to support extended instructions or access to two basic instructions each cycle. Data to the scalar processor 5 is 32-bits wide, but the upper 8-bit are stripped before being sent to the scalar processor 5, which supports 24-bit wide data. When the scalar processor 5 writes to the instruction cache 11 the 24-bit scalar data is sign-extended to create a 32-bit word.

When the scalar processor 5 is accessing the instruction cache 11, the instruction unit 4 is cut-off from receiving any new instructions. The instruction cache 11 supports only a single requester at any one of its ports during any given cycle.

Data Cache 12

The data cache 12 provides vector data to the parallel arithmetic unit. The operation of the data cache 12 is similar to the instruction cache 11 except that indexed addressing is provided to support the vector processor 6A's index addressing mode.

Data Cache 12 Indexed Addressing

When a vector instruction references the index register (vindex) the data cache 12 enables its indexed addressing capability. Indexed addressing provides a means to use three bits of the cache address to offset the row address within a cache page. The offsets that are currently supported are +0 and +1.

Addressing is handled as follows, and is illustrated in FIG. 8-2. Address bits 9 . . . 6 are used to select a page within the data cache 12. Address bits 5 . . . 3 are added to an offset vector to determine the row to access within the selected cache page. Address bits 2 . . . 0 are used to create the offset vector. The offset vector is a string of 1's whose count is determined by the three least significant bits of the cache address. The table below lists the offset vector combinations:

| Address bits (2. . .0) | Offset Vector |
|---|---|
| 000 | 00000000 |
| 001 | 00000001 |
| 010 | 00000011 |
| 011 | 00000111 |
| 100 | 00001111 |
| 101 | 00011111 |
| 110 | 00111111 |
| 111 | 01111111 |

Tag Registers

The level-1 cache has two banks of eight tag registers. One tag register exists for each page in the cache memory. Each time a location in memory is referenced, the address is compared to store information in the level-1 caches' tag registers. The stored information, referred to as a tag, is a minimum set of information that uniquely identifies a 64-byte page of memory and its current status in the cache.

The DSP Chip 1 uses a two-way, set-associative cache, meaning that a page of memory can reside in one of two possible locations in the level-1 cache. The address of the desired location is compared to both tags and, if a match is found, then a new 10-bit cache address is produced to access the appropriate page. If the address and tag do not match then a cache miss is produced, and the cache waits until the requested data is available.

The scalar processor 5 can access any one of the tag registers as an extended register. A tag register is selected by setting the least significant 4 bits of the extended register used for tag accesses. This 4-bit quantity is used as an index to select the appropriate register. Since the tag index cannot be set until the end of the cycle, the selected tag register cannot be read or written until the subsequent cycle.

Page Status Word

The Page Status word for each page in the cache contains information vital to the correct functioning of the cache controller. The Tag Valid status bit is set if the status word is valid indicating that the appropriate cache page is valid. The Dirty status bit is set if the referenced page is dirty— different from the page in main memory. The LRU status bit is set if the referenced page has been used most recently and cleared if used least recently. The 15-bit address tag is matched against the memory address to determine if a page is present of not in the cache. The format of the page status word is:

| V | D | L | 15-bit Address Tag |
|---|---|---|---|

Where:
V: Tag Valid Status
D: Dirty Status
L: LRU Status

Use-as-fill Access

When use-as-fill accesses are enabled in the caches 11 and 12, the processors 5 and 6A can continue as soon as the requested data is available and before the memory interface completes the current transaction. The caches determine when the processors can proceed using synchronous estimation.

Synchronous estimation utilizes a counter to determine when a desired location is available. The counter is employed since the memory interface is running off a different clock than the DSP core logic. The memory interface preferably runs at least twice the DSP core frequency. Using a control signal from the memory interface to indicate that it has started a transfer of data, the counter can be started to estimate the number of bytes transferred. Since the counter is running off the DSP core clock, it provides a count that is equal to or less than the current completed transfer size.

Using the estimated amount of data that has been transferred, the cache 11 or 12 can determine what data has been stored and what data is not yet available. In addition, the caches know the location that the processors are trying to access and can compare the estimated count to this address to determine if the processor can proceed.

LRU Replacement Algorithm

The DSP Chip 1 has the set-associative caches 11 and 12 which rely upon a replacement algorithm to maintain data in the level-1 caches. The preferred replacement algorithm is the Least Recently Used (LRU). When a new page is needed in the cache, one of two currently resident pages must be written back to main memory before the new page can be stored in the cache. The one page that is written back is the one that was used least recently (the longest time ago). This theoretically leaves in the cache the one of the two pages that is most likely to be accessed, along with the new page that is currently being accessed.

The LRU replacement algorithm functions according to two types of locality, temporal and spatial. Temporal locality specifies that if an item is referenced, then it will tend to be referenced again soon (in time). Spatial locality specifies that if an item is referenced, then nearby items will tend to be referenced again soon.

Cache Miss Counter

Each cache has a miss counter that is used primarily for performance analysis. Each time a cache miss occurs the miss counter is incremented by 1. When the miss counter overflows, it will rap-around and begin counting at zero again. The miss counter cannot be written at any time. It resets to zero when RESET is asserted and counts in response to misses after RESET is de-asserted.

Caching Policy

The Level-1 cache uses a write-back policy for page management. Information from the processors 5 and 6A is written only to the appropriate cache page on the main memory. When the modified page needs to be replaced with another page, the modified page is written back to main memory. The advantage to a write-back caching policy is that it reduces main memory bandwidth by not requiring a modification to main memory every time a location in the cache is updated.

The preferred write-back caching policy labels each page as being either clean or dirty. Each page in cache memory has a status bit in the tag register that stores the page dirty status. If a page is dirty then it has been modified, so the local page does not match the page in main memory. Since the page is dirty, it needs to be written back to main memory before flushing the page from the cache in the event a new page needs to replace the current page.

The DSP chip 1 caching of pages does not account for coherency among the two caches 11 and 12 and three parallel ports 3A–3C. The user is responsible for maintaining cache coherency, where no two caches hold different values of a shared variable simultaneously.

Cache Clock Pulse Stretching

The caches 11 and 12 require a clock that has a slightly longer high clock period than low clock period. To accomplish this a simple pulse stretching circuit is used. The preferred pulse stretching circuit is shown in FIG. 8-3. The delta T value is chosen to support the widest range of operational frequencies. Nominally, delta T is 2 ns.

Parallel Ports 3A, 3B, 3C

Figures 1, 9:
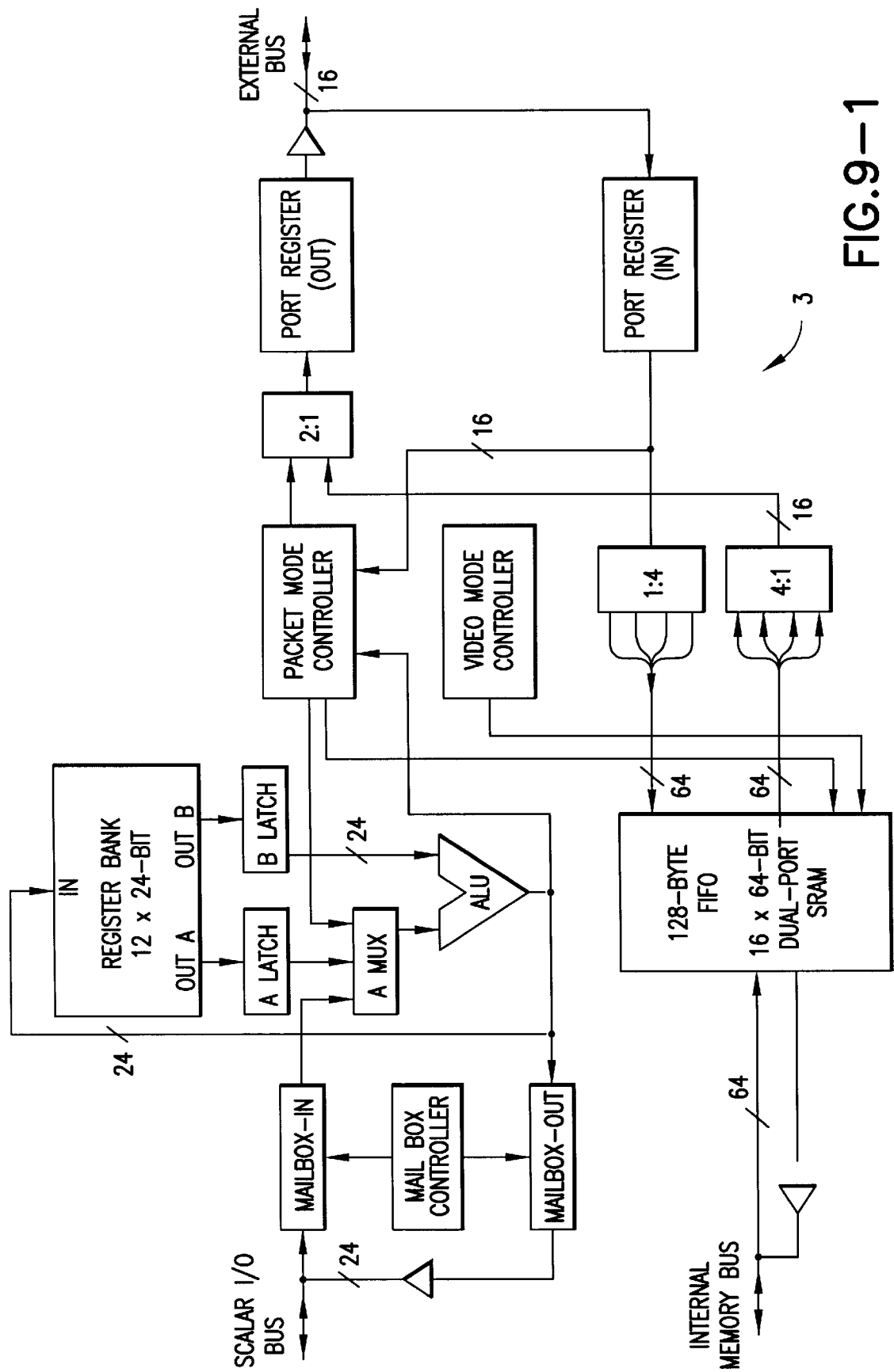
Figures 2, 9:
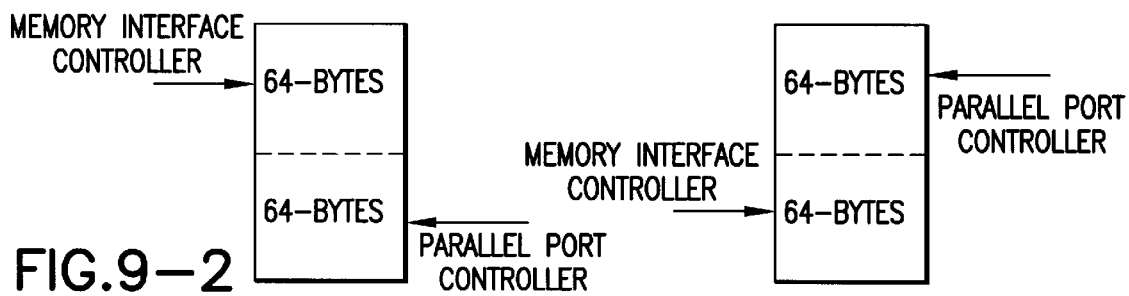
Figures 3, 9:
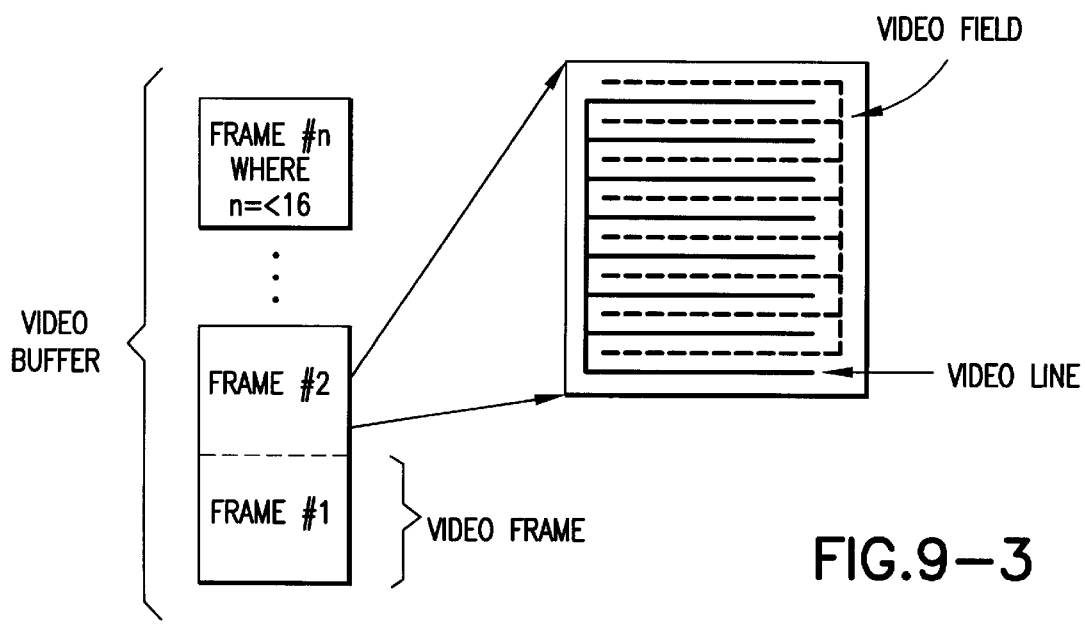
Figures 4, 9:
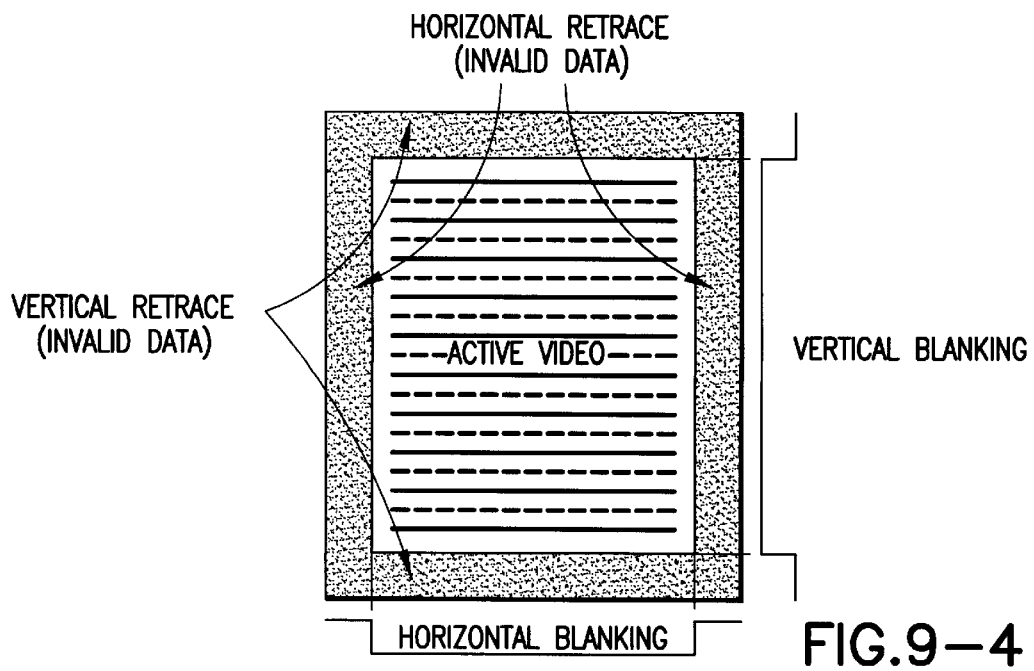
Figures 5, 9:
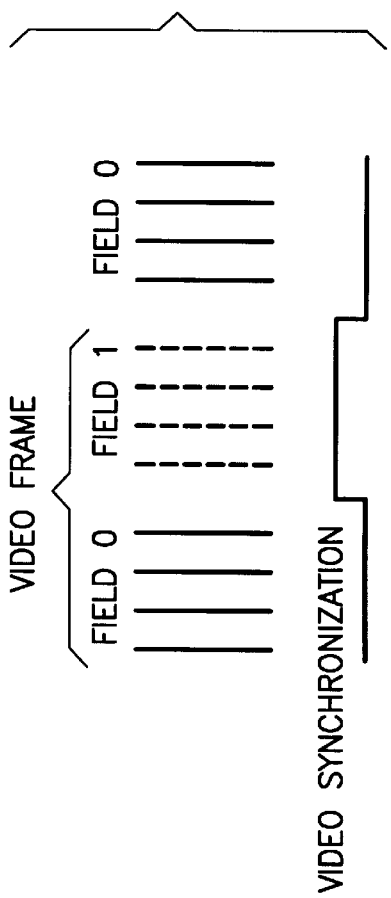
Figures 6, 9:
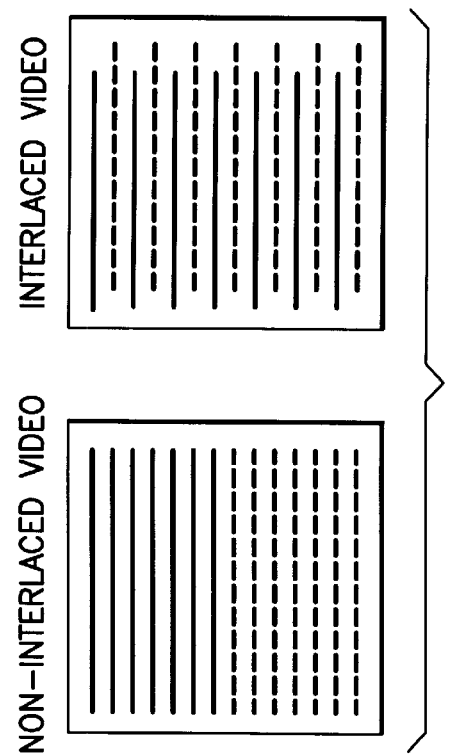
Figures 7, 9:
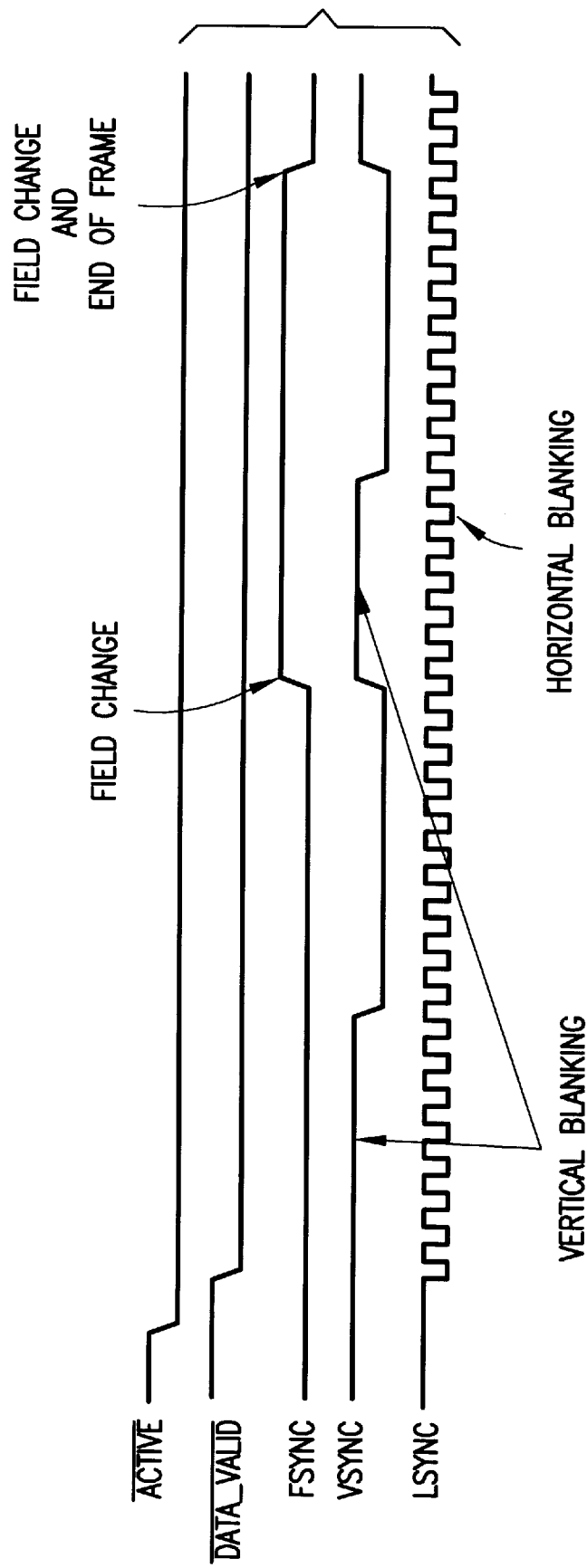
Figures 8, 9:
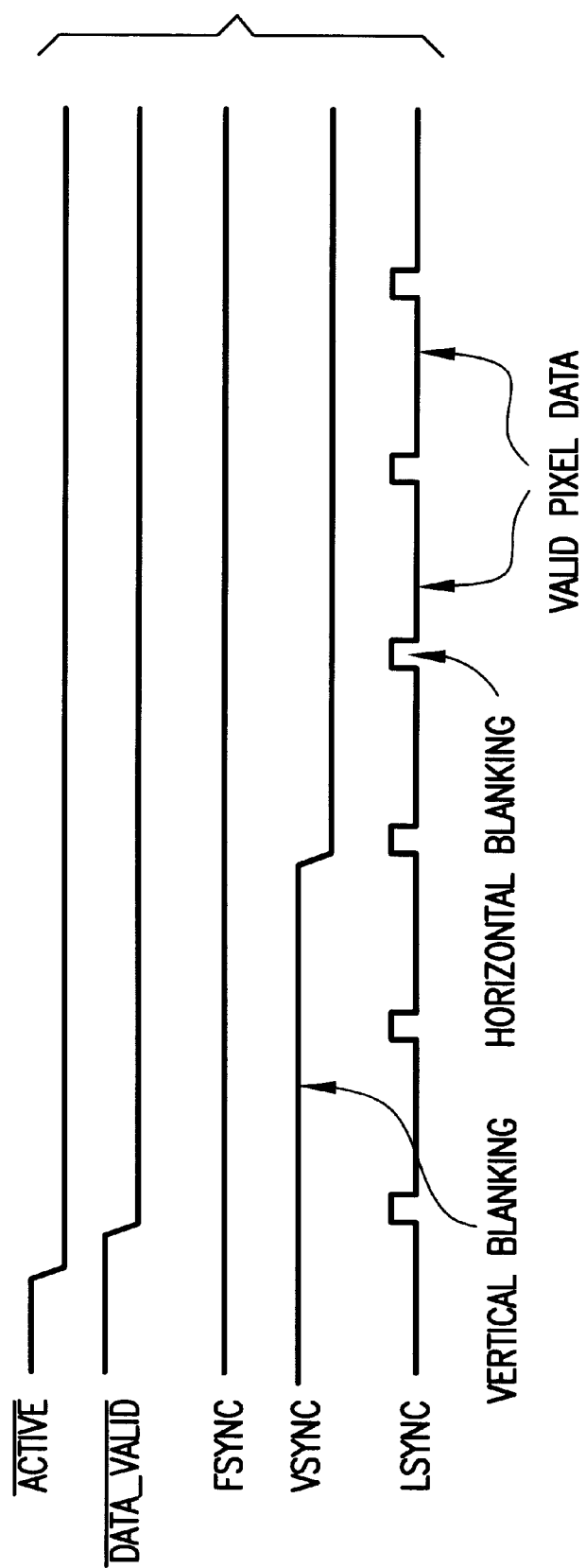
Figure 9:
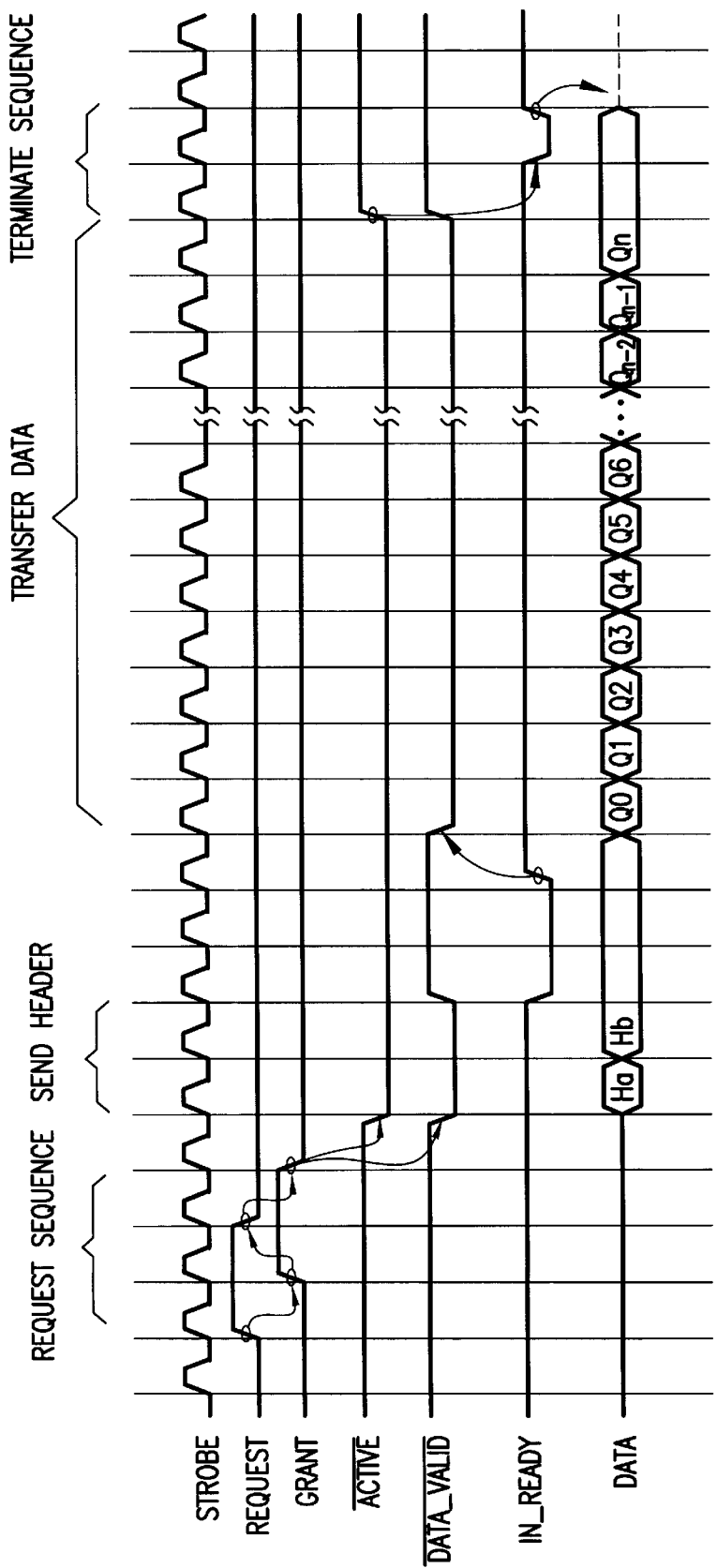

The DSP Chip 1 includes the three parallel ports 3A–3C. Each of the ports is identical except for the Host Port 3C, which has additional logic for the serial bus controller 10. A block diagram of a parallel port is seen in FIG. 9-1.

The parallel ports 3 are DMA controlled allowing independent control of all memory transactions. This alleviates the DSP Chip 1 of overhead produced by parallel port activity. Compared to the main memory port, each parallel port 3 is a relatively slow speed port (80 MB/sec) for moving data into and out of the DSP Chip 1. A 128-byte FIFO is provided to buffer data between each port and the high speed synchronous memory bus. The capacity of the FIFO is selected to avoid data loss.

Each parallel port 3 supports two modes of operation, packet mode and video aware mode. Packet mode is intended to allow the DSP Chip 1 to perform DMA transfers of data to or from other DSP Chips or other devices, which can interface with the simple packet protocol used, by the parallel ports 3. A Video Aware Mode is intended for interfacing with NTSC compliant video encoders and decoders. The parallel ports 3 supply control pins that are used specifically to format image data.

FIFO

To convert from the high speed, 64-bit, internal bus to the low speed, 16-bit, external I/O bus, each FIFO is organized as 8 bytes wide by 16 words deep. The FIFO is built from a dual-port SRAM with one read path and one write path for each port. This configuration provides an independent high-speed port and an independent low-speed port connected via the memory array. The controllers of the parallel port are designed to avoid potential conflicts with both ports accessing the same address by dividing the FIFO into two logical 64-byte FIFOs.

Configuring the FIFO into two logical 64-byte FIFOs allows the memory interface to access one of the 64-byte FIFOs while the internal control logic accesses the other 64-byte FIFO, as is illustrated in FIG. 9-2. When both the parallel port controller and memory interface controller 2 agree, access can flip to the other's logical 64-byte partition. Now each of the controllers can access the other half of the FIFO without addressing conflicts.

Treating the FIFO as two 64-byte buffers, then at maximum port data rate (80 MB/sec@40 MHz) the parallel port requires a transfer to or from main memory every 0.8 $\mu$s. The worst case time to accomplish the transfer is approximately 0.26 $\mu$s with a 400 MB/sec synchronous memory interface. However, the memory interface 2 may not be able to respond to a parallel port's request for service immediately, as there are other functional units which require the services of the memory interface 2. If all three parallel ports 3A–3C, the data cache 12, and the instruction cache 11 are accessing memory, and a refresh is required, then the time between service requests is approximately 1.44 $\mu$s (4*0.26 $\mu$s+400 ηs refresh time). Under these conditions the memory interface 2, running at 100 MHZ, can service each 64-byte burst request from the parallel ports in 1.7 $\mu$s. Since the parallel port controller cannot begin accessing a 64-byte block that the memory interface is accessing, it must wait until the memory interface finishes. Therefore a fully active DSP Chip 1 has a theoretical maximum transfer rate for the parallel ports of approximately 37 MB/sec. Even though the ports are capable of higher bandwidth, the memory interface 1 will not support these higher bandwidths if all ports are needed.

Extended Register Mailbox

The parallel ports 3 take their clock from the signal applied to the port's strobe pin. Since this clock can be different from the DSP core clock, mailboxes are implemented to allow synchronization of register bank data between the scalar processor 5 and the parallel ports 3. Each parallel port has two mailboxes, an in-box and an out-box. When the scalar processor 5 needs to write the register bank of a parallel port via extended registers, it sends data to the mailbox-in register. The data is actually written to the register bank a few cycles later. When the scalar processor 5 reads the register bank of a parallel port, it reads the mailbox-out register first as a dummy read, i.e., the contents are insignificant, and then reads it a second time to retrieve the requested data.

In addition to synchronization considerations, interfacing the scalar processor 5 through the mailbox registers allows the parallel port to maintain control over the register bank. Since each parallel port runs independently of other processors, having the parallel ports control their own register banks prevents the scalar processor 5 from simultaneously accessing a register that is being used by the parallel ports 3.

Two registers are not accessed via the mailbox register since they are running off the DSP core clock. The interrupt vector and interrupt status registers are directly accessible as extended registers.

Mailbox In

The mailbox-in register stores the address and data that the scalar processor 5 has requested to be written to the parallel port's register bank. When a write to this register is performed a write done flag (described below) is cleared in the interrupt status register, indicating that a request has been made to write the register bank. The mailbox controller will proceed to write the contents of the mailbox-in-register during a cycle that the parallel port is not using the register bank.

Once the contents of the mailbox-in register have been synchronized and stored in the register bank, the mailbox controller will set the write done flag indicating that the write was successful. By polling this bit, the scalar processor 5 can determine when a write was successful and proceed with other register bank reads or writes.

Mailbox Out

The mailbox-out register stores the contents of a requested register bank read. Reading from the parallel port's register bank is a two step process. The first step is to request an address and the second step is to retrieve the data.

To request the contents of a register, the scalar processor 5 reads a dummy value from the appropriate address of the register it wishes to obtain. The mailbox controller then clears the read done flag (see below) in the interrupt status register, indicating that a read has been initiated. Once the mailbox controller has obtained the requested address and synchronized the data, it loads the mailbox-out register and sets the read done flag. By polling the read done flag the scalar processor 5 can determine when the requested data is valid and finally read the appropriate data.

The contents of the mailbox-out register are only updated when a read is requested allowing the data to remain available until the scalar processor 5 is ready.

Register Bank

Each parallel port 3A–3C has a register bank composed of 12 locations. The register bank is implemented as a triple-port SRAM with one read port, A, one read port, B, and a third write port, C. In a single cycle, two locations, A and B, can be read and location C can be updated.

Two transparent latches are provided to separate read and write operations in the register bank. During the first half of the clock cycle, data from the register bank is passed through the A latch and the B latch for immediate use and the write logic is disabled. During the second half of the clock cycle, the data in the latches is held and the write logic is enabled.

Video Current Line/Source Address

The video current line/source address register contains the current pixel line in video mode and the source address in packet mode. In video mode this register needs to be initialized to the beginning line of a video frame. Once video transfer has begun, the video mode controller updates this register as appropriate. In packet mode the contents of this register are used as a local address pointer for storing data. As the transfer progresses this register is automatically updated to reflect the current pointer address.

At the beginning of slave packet mode, the source address register is loaded from the packet header to establish a staring address for the transfer to follow. This register resets to 000000h.

Video Field Start/Destination Address

The video field start/destination address register contains the address of the current field in video mode and the destination address in packet mode. In video mode this register needs to be initialized at the beginning of a transfer, but is updated by the video mode controller thereafter. In master packet mode, the destination address is broadcast to the external devices via the packet header. This address is stored in the source address register (described above) of the slave device. This register resets to 000000h.

Serial EEPROM Addressing

Even though the destination address resets to 000000h, during bootstrap loading from the serial EEPROM, the address temporarily is 0000A0h. This is for addressing the EEPROM on the serial bus. Once bootstrap loading ends, the destination address returns to 000000h.

Video Line Start

The video line start register contains the starting address of the current video line. The video mode controller is responsible for updating the register as video data streams into the port. The user is responsible for initializing this register at the beginning of a video transfer. This register resets to a random state.

Video Buffer Start

The video buffer start register contains the starting address of the current video buffer. The video buffer is a block of locations containing all the video frames, as seen in FIG. 9-3. When all the frames in the video buffer have been loaded then the video mode controller resets the video line start, video field start, and video current line to the buffer starting location to begin streaming into the first frame again. The video buffer start register resets to a random state and needs to be user initialized before beginning any video transfers.

Video Line Length

The video line length register contains the length of a video line in bytes. This value is important for determining how data is stored in memory. When the video mode controller determines that an end-of-line is reached it sets the starting address of the next line based upon he line length. If the line length is too small then valuable data may be overwritten. It is best to set line lengths at multiples of 64-bytes, the size of the one cache page. The video line length register resets to a random state and the user is responsible for initializing it before beginning any video transfers.

Transfer Size

The transfer size register contains the number of bytes in a master packet mode transfer. In slave mode the transfer size is irrelevant. The register can be set prior to starting a transfer and will decrement by two bytes each cycle valid data is received or sent. When the transfer size reaches zero the transfer is automatically terminated, and if end of transfer interrupts are enabled then a hardware interrupt will be generated.

Boot Strap Block Size

This register can reset to one of two values as determined by the state of the host port data pin 10 (HOST10) at reset. If HOST10 is cleared (default) then the transfer size register resets to 000400h for 1 Kbyte of data in the boot strap routine. If HOST10 is set, then the transfer size register resets to 000040h for 64 bytes of data in the boot strap routine. These values only apply for loading the boot strap routine from the serial bus. If the parallel port is used to load the boot strap routine then the transfer size is irrelevant.

Port Status

The port status register is used to control the operation of the parallel port 3 in packet mode. This register also contains the hardware version number in the most significant byte. The 24-bit port status word is as follows:

| reset value: | | | | | | | | | | | | | | | | |
|---|---|---|---|---|---|---|---|---|---|---|---|---|---|---|---|---|
| 0 | 0 | 0 | 0 | 0 | 0 | 0 | 1 | 0's | 0 | 0 | 0 | 0 | 0 | 0 | 0 | 0 |
| 0 | 0 | 0 | 0 | 0 | 0 | 0 | 1 | PKTB | 0 | 0 | 0 | BSY | C | EN | REQ | RW |
| bit: | | | | | | | | | | | | | | | | |
| 23 | 22 | 21 | 20 | 19 | 18 | 17 | 16 | 15...8 | 7 | 6 | 5 | 4 | 3 | 2 | 1 | 0 | mnemonic description
PKBB: user defined packet byte
BSY: port busy status
C: parallel port ALU carry out status (read-only)
EN: transfer enable
REQ: transfer request
RW: transfer direction: [0] receive or [1] send Packet Byte In packet mode the parallel ports 3 can send or receive a user-defined byte. If the parallel port is in master mode then the header it broadcasts contains the byte stored in PKTB. If the parallel port is in slave mode then the PKTB byte contains the byte taken from the header it received during the transfer request. Since this is a user-defined byte it does not affect the operation of the port.

Packet Mode Control and Status

The BSY flag indicates that a port is busy handling data in packet mode. This flag is set when the FIFOs are active with data for the current transfer. Even if the transfer has completed the FIFOs may need time to flush its contents in which case the BSY flag remains set. The BSY flag is read only.

The EN bit is the packet mode transfer enable. Setting this bit in master packet mode causes the port to begin a transfer, and clearing the bit terminates a transfer. The EN bit is also clear automatically when the transfer size has reached zero (0), i.e., transfer completed. In slave packet mode the combination of the EN bit and the BSY flag can be used to determine when the port is busy with a transfer and should not be reconfigured.

The REQ bit is the master packet mode request signal. This bit is tied directly to the parallel port's REQ pin. Setting this bit allows the port to indicate a request for transfer to the external bus arbiter. If the arbiter allows the parallel port access to the external bus then it asserts the GRT (grant) pin. Provided bus grant interrupts are enabled, an interrupt routine to configure the port and begin the transfer can be executed.

The RW bit determines the direction of data, either sending or receiving. This bit is set at reset for the boot strap controller which needs to send data to the external EEPROM for initialization before reading in the boot strap routine. Boot strap loading is described in further detail below.

Interrupt Vector

This 24-bit register stores the beginning address of the interrupt routine. When a hardware interrupt has been granted, the interrupt controller will load the program counter with the contents of this register and execution begins when valid data has been fetched. Since the interrupt controller must access this register immediately, it is running off the CPU clock to avoid potential synchronization delays that may exist between the CPU clock and parallel port clock. At reset this register defaults to 000000h.

Interrupt Status

Each parallel port provides an interrupt status register that is running off the CPU clock. This allows the interrupt controller to access the register without having to perform synchronization of data for a parallel port running on a different clock. The 24-bit parallel port interrupt status word is:

| reset value: | | | | | | | | | | | | | |
|---|---|---|---|---|---|---|---|---|---|---|---|---|---|
| 0's | 0 | 0 | 0 | 0 | 0 | 0 | 0 | 0 | 0 | 0 | 1 | 0 | 0's |
| 0's bit: | ECK | EBG | BG | EFL | FL | EFR | RF | ETR | TR | RD | WD | 0 | MODE |
| 23 ... 15 | 14 | 13 | 12 | 11 | 10 | 9 | 8 | 7 | 6 | 5 | 4 | 3 | 2 ... 0 | mnemonic description
ECK: external clock select
EBG: enable bus grant interrupt request
BG: bus grant interrupt request
EFL: enable end of field interrupt request
FL: end of field interrupt request
EFR: enable end of frame interrupt request
FR: end of frame interrupt request
ETR: enable end of transfer interrupt request
TR: end of transfer interrupt request
RD: read done
WD: write done
MODE: parallel port mode External Clock Select The ECK bit forces the parallel port to use the externally applied clock. In master packet mode the clock is normally driven from the internal CPU clock. Setting the ECK bit overrides this default.

Parallel Port Interrupts

Each parallel port 3 has four interrupts along with an enable for each interrupt. An interrupt must be enabled in order to generate a request. The interrupts are:

| Bit | Description |
|---|---|
| BG - bus grant: | A bus grant interrupt indicates that the grant pin has been asserted in response to a request. This interrupt is applicable in packet mode where the DSP Chip 1 needs to arbitrate for the external bus. |
| FL - end of field: | An end of field interrupt indicates that the video mode controller has changed the current video field from odd to even or from even to odd. |
| FR - end of frame: | An end of frame interrupt indicates that the video mode controller has changed the field twice, indicating that a new video frame has begun. |
| TR - end of transfer: | An end of transfer interrupt indicates that the active pin has been de-asserted in response to a transfer termination. End of transfer interrupts can be generated in either video mode or packet mode. |

Mailbox Done Flags

The RD and WD flags are used to indicate that the mailbox controller had completed a read request or write request respectively. These bits are read only. The mailbox controller is responsible for updating the flags as appropriate.

Parallel Port Mode

The MODE field selects the parallel port operating mode according to the following:

| MODE$_{2...0}$ | description |
| --- | --- |
| 000 | serial master mode |
| 001 | serial slave mode |
| 010 | master packet mode |
| 011 | slave packet mode |
| 100 | non-interlaced video mode |
| 101 | interlaced video mode |
| 110 | non-interlaced non-maskable video mode |
| 111 | interlaced non-maskable video mode |

Frame Status

The 24-bit parallel port frame status word is:

| reset value: | | | | | | | | |
| --- | --- | --- | --- | --- | --- | --- | --- | --- |
| 0's | 0 | 0 | 0 | 0 | 0 | 0 | X'S | 0'S |
| 0's bit: | SP | DVP | VP | FP | HP | CF | FRAME | FRAME COUNT |
| 23...14 | 13 | 12 | 11 | 10 | 9 | 8 | 7...4 | 3...0 | mnemonic description

SP: strobe phase: [0] true or [1] complement

DVP: data valid phase: [0] true or [1] complement

VP: video Vertical Sync phase: [0] true or [1] complement

FP: video Frame Sync phase: [0] true or [1] complement

HP: video Href phase: [0] true or [1] complement

CF: current field status: [0] odd or [1] even

FRAME: number of allocated video frames

FRAME COUNT: current video frame count

Strobe Phase Select

The strobe phase bit allows the user to control which edge is used to transfer data. With the SP bit cleared, the port 3 operates off the rising edge of the clock. Setting the SP bit causes the port 3 to operate off the falling edge of the clock.

Data Valid Phase Select

The Data Valid Phase (DVP) is generalized with the incorporation of a data valid phase bit. Clearing this bit requires that the parallel port's data valid pin be low level active (normal state). Setting the DVP bit requires that the data valid pin be high level active.

Video Signal Phase Select

Three signals are used to control the formatting of video data, vertical sync, frame sync, and H$_{ref}$. These signals are described in more detail below. The frame status words provide three bits to control the sense of these signals. These signals are normally true with a high state. Each of these bits that is cleared maintains an active high sense. Setting any of the VP, FP, or HP bits complements its sense, requiring a low signal to be considered active.

Field Status

The video mode controller uses the frame sync signal to determine which field is currently active. A change in the frame sync state indicates a change of field. For interlaced video there are two fields, odd and even. The CF bit in the frame status word is used to indicate the current field state. This bit is read only.

Video Frame Control

In video mode, data streams into the parallel port of the DSP Chip 1 delimited by a frame synchronization signal. When one frame has completed transfer, a frame sync is asserted and a new frame begins transfer. To prevent one frame from overwriting another frame, the user can reserve a finite number of frames in memory with the frame status bits. Between 1 (0h) and 16 (Fh) frames can be reserved. When one frame completes its transfer, the video mode controller increments the current frame count and proceeds to store data at a new reserved frame buffer. The frame count will continue up to the limit set in the frame status bits and then reset, beginning the process all over again.

Parallel Port ALU

Each parallel port has a dedicated arithmetic logic unit (ALU) for calculating addresses in video and packet modes. The 24-bit parallel port ALU only has three functions, add, subtract, and move.

Video Mode

Video Aware Mode is designed for interfacing with NTSC compliant video encoders and decoders. The parallel ports have a set of pins that allow communication with the video encoders and decoders to transfer and format image data. These pins are VSYNC, LSYNC, and FSYNC for vertical blanking, horizontal blanking, and field synchronization respectively. These signals are generalized for interfacing with various manufactures that may have different nomenclatures.

FIG. 9-4 illustrates how the vertical blanking and horizontal blanking relate to active video data. The vertical-blanking signal (VSYNC) is used to mask invalid data that is present in the vertical retrace region of an image. The horizontal blanking signal (LSYNC) is used to mask invalid data that is present in the horizontal retrace region of an image. These two regions exist to prevent the electron gun of a cathode ray tube from destroying active video during retrace. Using these two signals, the parallel port can discard invalid data and therefore store or transmit only active video data.

FIG. 9-5 illustrates field synchronization. Field synchronization is necessary for identifying fields and for identifying frames. The current state of the field synchronization signal (FSYNC) is used to determine the current field's polarity, odd or even. The falling edge of the filed synchronization signal is used to denote the end of a frame, which infers that a new frame begins with the next valid data.

Although fields are transmitted sequentially, they may be displayed in one of two formats, interlaced or non-interlaced, seen in FIG. 9-6. Non-interlaced video is straightforward, data in the first field is displayed followed by the data in the second filed. The resulting image has an upper half and a lower half that are representative of their respective fields. Interlaced video displays the first field by leaving a blank line between each successive active video line. When the next field is displayed, the lines begin at the top of the image and new video lines will fill the blank lines left by the previous field.

Data from a video encoder is sent as a stream of data masked with the vertical and horizontal blanking control signals. Data to a video decoder is received as a stream of data masked with the blanking signals. FIGS. 9-7 and 9-8 illustrate the use of these control signals. Logically, the ANDing of the VSYNC and LSYNC signals generates the mask used to validate data.

The LSYNC signal is also used to determine when an end of line has been reached. When an end of line has been reached, the video mode controller may increment the Line Start pointer by the line length to compute a new line address.

The FSYNC signal is used to determine when there has been a change of fields or, if there have been two field changes, a change of frames. When a change of fields is detected, the video mode controller modifies the field start register. If the video format is non-interlaced, the field start register is changed to the last line start address plus the line length. If the video format is interlaced, the field start register is incremented by the line length.

When a change of frames is detected, the video mode controller modifies the field start register to the last line start address plus the line length. Additionally, the frame count in the frame status register is updated.

If the frame count and number of allocated frames in the frame status register are identical, then the end of the video buffer has been reached. The video mode controller uses the buffer start register to reload the field start register and line start register. The video mode controller also uses the buffer start register to reload the field start register and line start register. Video data then begins writing over previously stored data, which should have been processed by this time.

Video Buffer Synchronization

The video mode is not very precise. No header is sent and data simply streams into the port 3. It may take a few frames before the reserved video buffer is synchronized with the data. Since data just streams into the port, the DSP Chip 1 does not know where the data is in relation to the current line, current field, or current frame. After completing a line the DSP Chip 1 is line synchronized, and after completing a frame the DSP Chip 1 is frame synchronized. After completing a series of frames that fill the video buffer, then the video begins at the bottom of the buffer, completing the synchronization of data. It may require a few frames of video until the data is totally synchronized.

Packet Mode

Packet mode allows the parallel port 3 to burst a finite amount of data to or from another parallel port or another device that can communicate using the port's packet protocol. The steps to transfer data, for a parallel port 3 configured as a master, are: (1) request use of the external bus, (2) send configuration header, (3) transfer data, and (4) terminate the sequence.

The steps to transfer data for a parallel port 3 configured as a slave are similar, except the first step is not necessary since the slave is not requesting the bus, rather it is responding to another device that has already been granted bus access.

The present embodiment of the DSP Chip 1 does not include a capability of arbitrating for access to a bus that connects multiple devices. It does, however, have request and grant handshake signals that it can use to communicate with a bus arbiter. The DSP Chip 1 sends a request by asserting the REQ bit in the port status word. When a grant has been received by the parallel port 3 it issues a bus grant interrupt, as discussed above. I should be recalled that the bus grant interrupt must be enabled to generate the interrupt request.

In response to the bus grant, software routines are responsible for clearing the request bit and the interrupt flag.

Assuming the destination address and appropriate control registers have been set up for a transfer, then to begin the transfer the enable bit in the port status register is set. The packet mode controller then takes over the broadcast of the 4-byte packet header and waits until the ready pin indicates that the devices on the bus are ready. The ready pin is an open-drain pad to allow for a wired-AND configuration, i.e., all the devices on the bus must indicate ready.

So long as the ready pin remains asserted the parallel port 3 continues to transmit data. If a slave port's FIFO is unable to maintain data transfer, it de-asserts the ready signal and the master port then waits until the FIFO on the slave port indicates it is available again. The master port can use the data valid signal to indicate that it is unable to maintain data transfer. By de-asserting the data valid signal the port 3 can generate a wait state.

Once the master port has completed transfer, i.e, its transfer size has reached zero, it de-asserts the data valid and active signals. The slave port de-asserts the ready signal to indicate that it needs time to flush any data that may need to be stored in its local memory. Once the slave has completed all transactions and the port is ready to be disabled, it asserts the ready signal. When the master port detects that the slave port is ready it releases the external bus.

This transfer sequence is illustrated in FIG. 9-9. The master port generates the STROBE, REQUEST, ACTIVE__bar, DATA__VALID__bar, and DATA. A bus arbiter generates the GRANT signal. The IN__READY signal is the feedback signal from the slave port.

Packet Header

Packet mode transfers begin with a header that configures the DMA controller of the receiving (slave) device. The header is 4 bytes in length and contains the direction, address, and a user defined packet byte found in the interrupt status register.

| word #1 | | |
|---|---|---|
| | $Address_{15\ldots 1}$ | RW |

| word #2 | | |
|---|---|---|
| User Defined Byte | | $Address_{23\ldots 16}$ | bit:  15  14  13  12   11  10  9   8   7   6   5   4   3   2   1   0

RW - direction status: This single bit configures the direction of data in the slave device. A zero [0] is for writing data, i.e., data streams into the port. A [1] is for reading data, i.e., data streams out of the port.

$Address_{23\ldots 1}$: The beginning address of the transfer. The address is only 23 bits because the external bus is 16-bits wide, therefore the minimum address offset is set at 2 bytes.

User Defined Byte: This is a byte of data that is stored in the interrupt status register. This byte has no effect on the operation of the port.

Boot Strap Loading

The DSP Chip 1 loads a small program from an external source in order to configure itself for loading much larger programs. This small program is referred to as a boot strap routine. The boot strap routine can be configured to load from the serial bus 10 attached to an EEPROM or from the host parallel port 3C.

To configure the DSP Chip 1 for loading the bootstrap routine from the serial bus 10, the host port data pin 8 (HOST8) is held low at reset. The size of the routine can be set using HOST10. The serial bus clock can be set to one of two frequencies. The 1 MHz clock is for testing and the 78 KHz clock is for normal operation. When RESET is de-asserted the DSP Chip 1 proceeds to load the boot strap routine from the EEPROM and begin executing at address 000000h.

To configure the DSP Chip 1 for loading from the host parallel port 3C, HOST8 pin must be held high at reset. When RESET is de-asserted the DSP chip 1 immediately suspends itself and places the host parallel port 3C into slave mode, allowing it to receive data. After the transfer has completed, the DSP chip 1 begins executing code at address 000000h.

Boot Code

The boot code of the DSP Chip 1 is a string that controls the initialized state, and is applied to the host port 3C data pins at reset. When RESET is de-asserted, the value on the pins is irrelevant.

The 11-bit Boot Code is:

| SIZE | SCLK | BOOT | SDRAM | PLL | Default PLL Phase |
|---|---|---|---|---|---|
| bit: | 10 | 9 | 8 | 7...6 | 5 | 4...0 |
| | | | bit 10 | | SIZE | |
| | | | 0 | | 1024 Bytes | |
| | | | 1 | | 64 Bytes | |
| | | bit 9 | | | SCLK | |
| | | 0 | | | 78 KHz | |
| | | 1 | | | 1 MHz | |
| | | | bit 8 | | BOOT | |
| | | | 0 | | Serial Bus | |
| | | | 1 | | Host Parallel Port | |
| | | | | bits 7...6 | SDRAM | |
| | | | | 00 | 4 × 16 b × 2 MB | |
| | | | | 01 | 4 × 32 × 1 MB | |
| | | | | 10 | 1 × 16 b × 8 MB | |
| | | | | 11 | 2 × 32 b × 8 MB | |
| | | | | bit 5 | PLL | |
| | | | | 0 | enabled | |
| | | | | 1 | disabled | |
| | | | | | bits 4...0 | DEFAULT PLL PHASE |
| | | | | | 00000 | 1.0 ns |
| | | | | | 00001 | 1.5 ns |
| | | | | | 00010 | 2.0 ns |
| | | | | | 00011 | 2.5 ns |
| | | | | | 00100 | 3.0 ns |
| | | | | | 00101 | 3.5 ns |
| | | | | | 00110 | 4.0 ns |
| | | | | | 00111 | 4.5 ns |
| | | | | | bits 4...0 | DEFAULT PLL PHASE |
| | | | | | 01000 | 5.0 ns |
| | | | | | 01001 | 5.5 ns |
| | | | | | 01010 | 6.0 ns |
| | | | | | 01011 | 6.5 ns |
| | | | | | 01100 | 7.0 ns |
| | | | | | 01101 | 7.5 ns |
| | | | | | 01110 | 8.0 ns |
| | | | | | 01111 | 8.5 ns |
| | | | | | 1XXXX | memory interface clock |

Memory Interface 2

Introduction

The memory interface 2 connects the DSP Chip 1 to the synchronous memory bus. It converts an off-chip, high speed, relatively narrow synchronous bus to a half-as-fast, twice-as-wide, on-chip memory bus. Memory bandwidth ranges from 300 MB/S to 400 MB/S using a 75 MHz to 100 MHz clock. A block diagram of the Memory Interface 2 is seen in FIG. 10-1.

The memory size granularity provided by synchronous DRAMs (SDRAMs) is much better than that provided by common DRAMs. To obtain a fast memory bus with normal DRAMs requires a wide memory bus and many DRAMs, supplying all of the memory capacity required. Since synchronous DRAMs provide a very fast transfer rate, a single synchronous DRAM provides the same data transfer rate that otherwise requires many ordinary DRAMs.

Data Input Pipeline

Figures 1, 10:
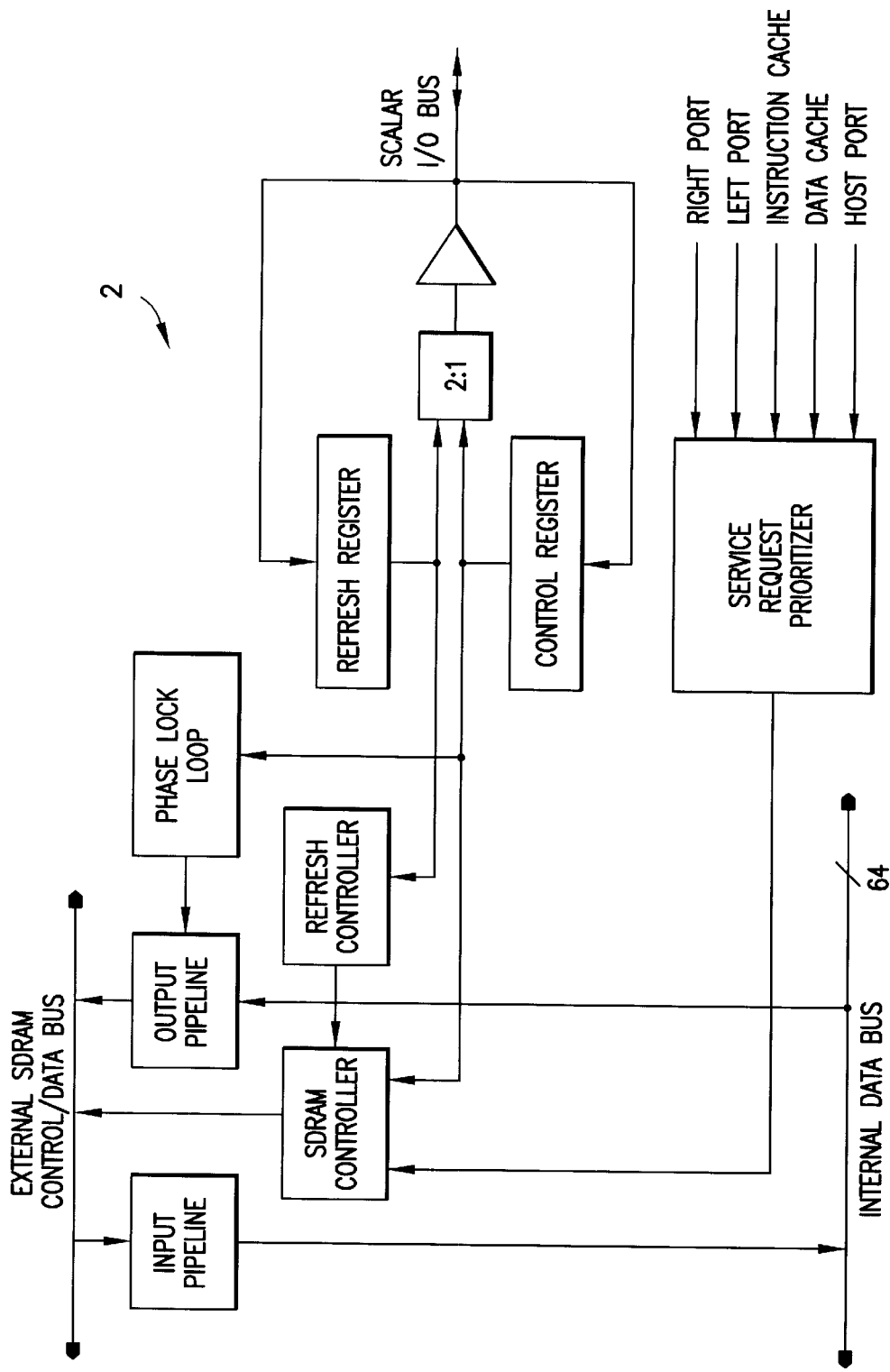
Figures 2, 10:
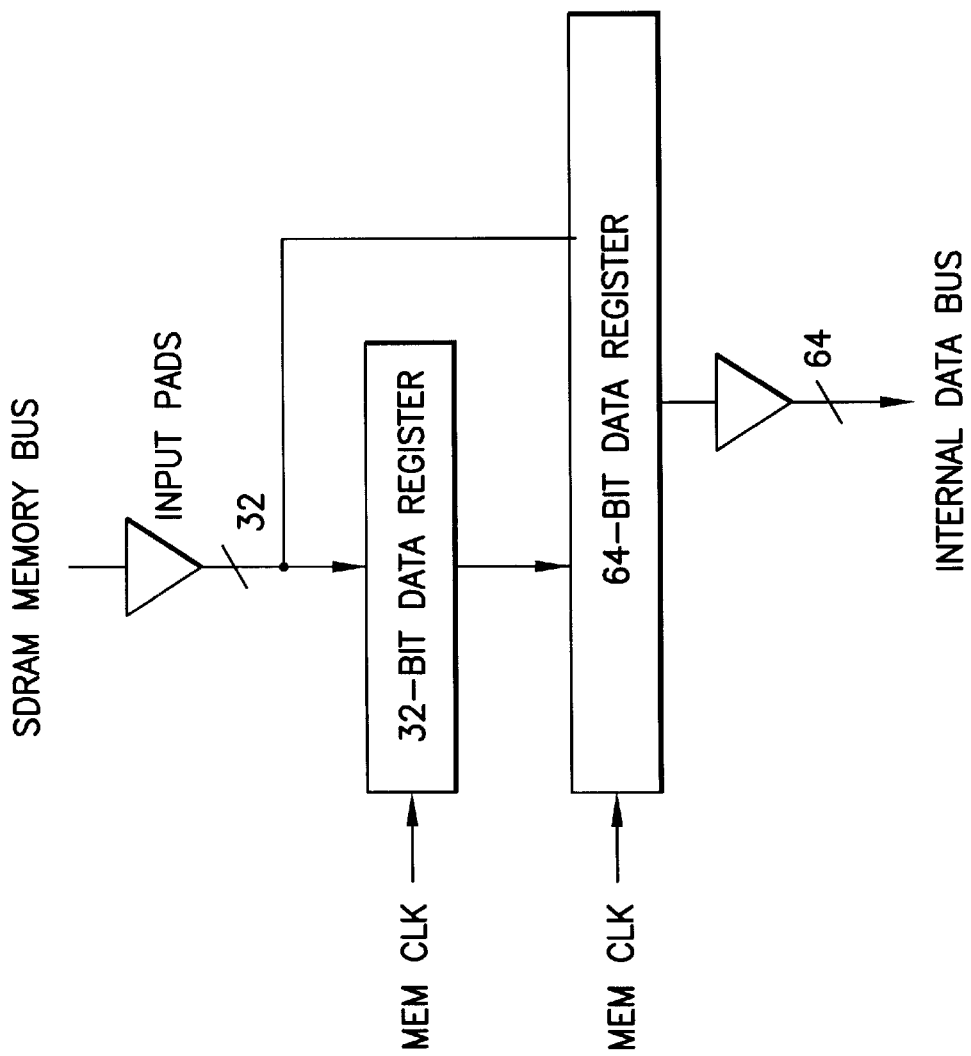
Figures 3, 10:
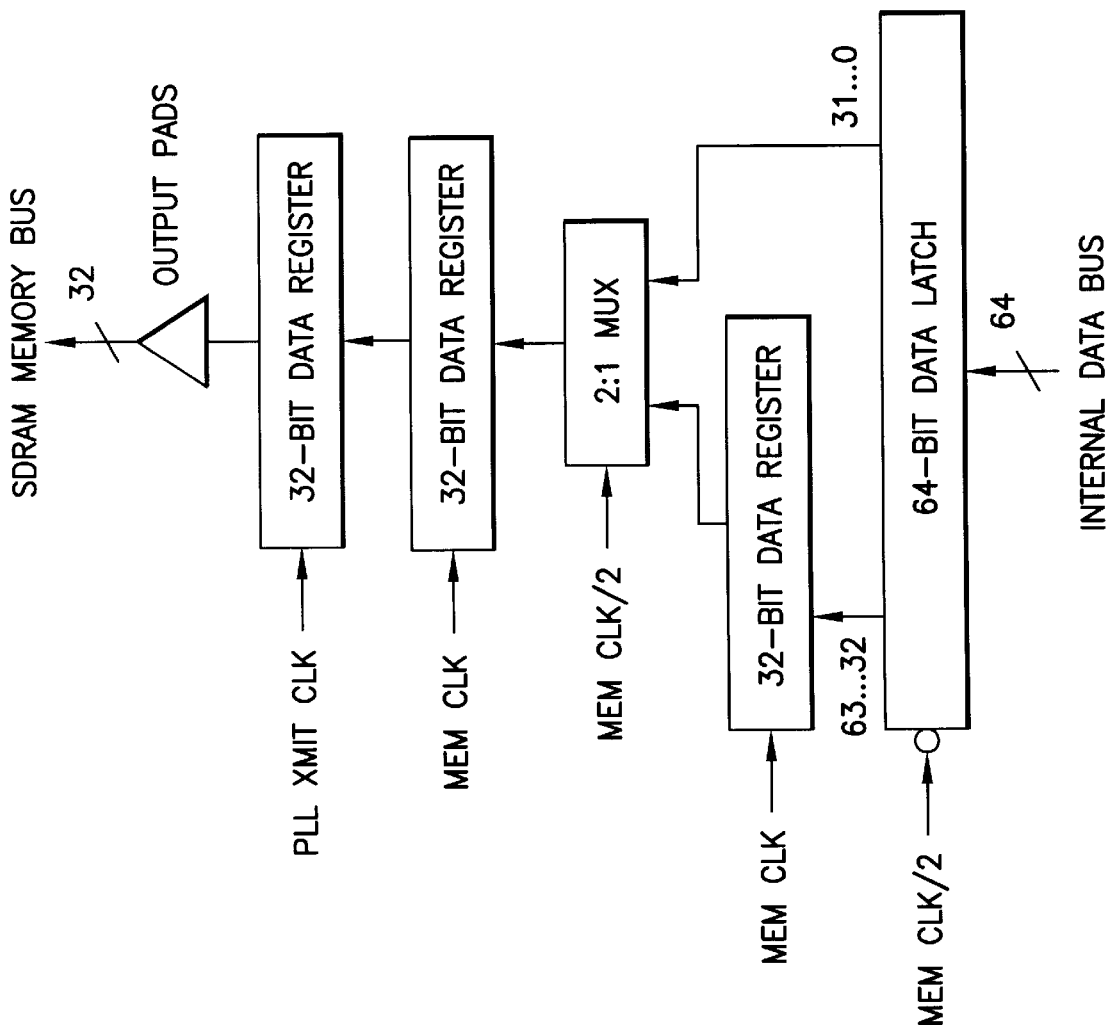
Figures 4, 10:
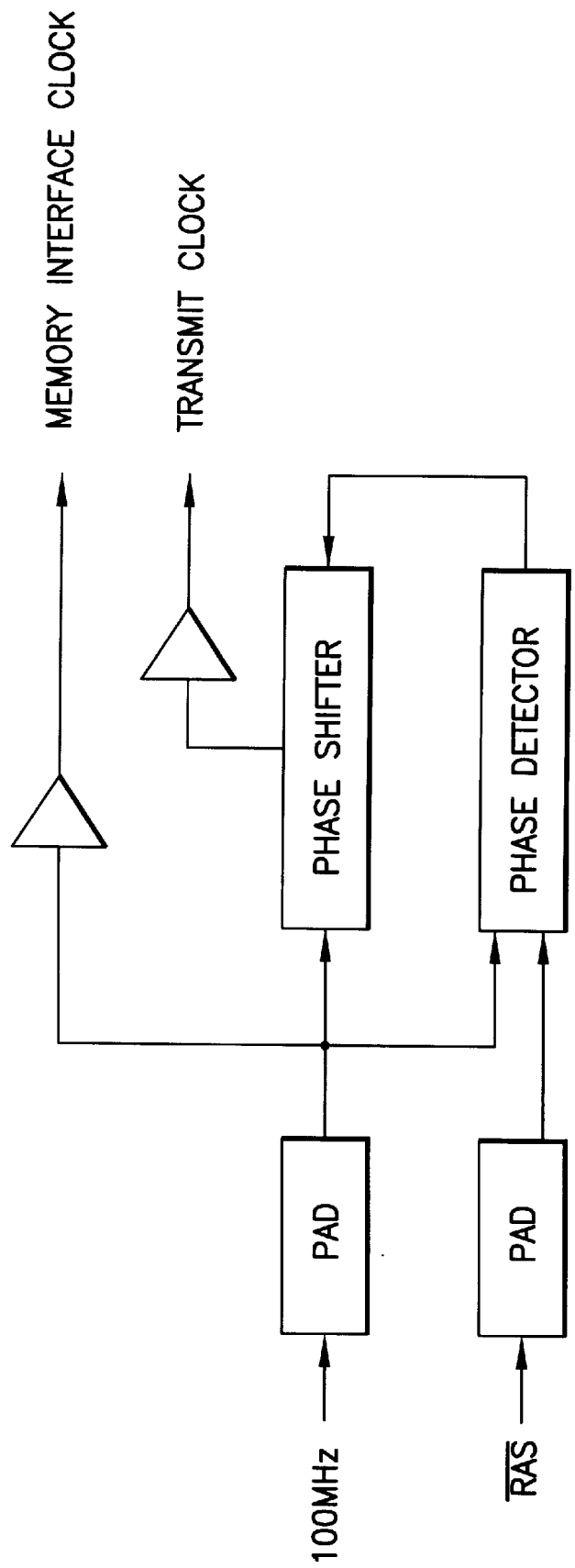
Figures 5A, 10:
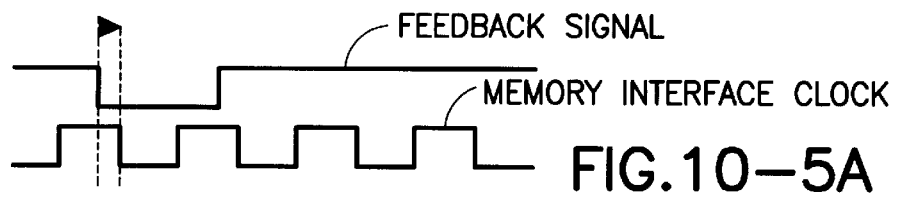
Figures 5B, 10:
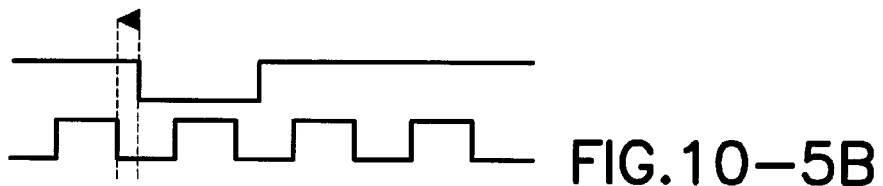

A block diagram of the data input pipeline is seen in FIG. 10-2. Data from the SDRAM flows through the memory interface input pipeline before being written to the proper location within the DSP Chip 1. The input pipeline is comprised of two stages that are intended to convert the 32-bit memory bus into the 64-bit internal bus.

Data Output Pipeline

A block diagram of the data output pipeline is seen in FIG. 10-3. Data from the internal memories of the DSP Chip 1 propagate through the memory interface output pipeline before being driven onto the SDRAM memory bus. The output pipeline is comprised of three stages that are intended to convert the 64-bit internal bus into the 32-bit memory bus.

A 64-bit data latch is provided to de-sensitize the output pipeline registers from the transmit buffers on the internal memories. This allows the memory interface clock to withstand clock skew between the internal memories, which are running off the memory interface clock divided by two (MEM CLK/2), and the output pipeline, which is running off the memory interface clock (MEM CLK).

SDRAM Initialization

The external SDRAM requires a power-on sequence to become ready for normal operation. This initialization has the following steps: apply power and start the clock with the inputs stable for at least 200 $\mu$s; precharge both memory banks; execute eight auto refresh cycles; and the set mode register to configure SDRAM for proper program mode.

With the exception of applying a stable clock and inputs for at least 200 $\mu$s, the DSP Chip 1 accomplishes these initialization steps without user intervention. By applying RESET to the DSP Chip 1, the memory interface 2 outputs reset and stabilize. Continuing to assert RESET for at least 200 $\mu$s then satisfies the first step of SDRAM initialization.

Once RESET is de-asserted the memory interface 2 begins executing the last three steps of the SDRAM power on sequence. During this period the memory interface 2 is suspended, therefore normal operation of the DSP Chip 1 is suspended as well.

Memory Refresh

Since the technology for building SDRAMs can vary slightly from manufacturer to manufacturer, the refresh rate of SDRAMs can vary also. To allow the DSP Chip 1 to interface with a broad range of SDRAMs, a programmable refresh sequencer is incorporated. The refresh cycle time can be set using the refresh control register (described below).

The refresh sequencer contains a free running counter. When this counter is at zero a refresh is initiated and the count is reset to the value in the refresh control register to begin counting down to the next refresh sequence. Each refresh sequence refreshes four rows of the SDRAM memory matrix.

The refresh sequencer makes use of the auto refresh capabilities of the SDRAM. This allows the refresh sequencer to keep account of the cycle time. The SDRAM automatically refreshes the appropriate rows.

The refresh cycle time is determined by determining the amount of time consumed refreshing and subtracting this time from the refresh period of the device. The result is the amount of time consumed not refreshing. By knowing the number of rows to refresh in the memory cell array, the amount of time between refresh sequences can be determined. Consider the following example for a common SDRAM.

memory interface frequency=100 MHz
period=10 ns
number of rows=2048
refresh period=32 ms
row refresh time=10 cycles*period=100 ns/row
time not refreshing=refresh period−[10 ns/row*2048 rows]=31.7 ms Since each refresh initiated by the DSP memory interface 2 does four auto refresh cycles, the number of refreshes initiated is reduced by a factor of four. Therefore:

time between refreshes=time not refreshing/refresh sequences=31.7 ms/512=61.9 $\mu$s
refresh count value=time between refreshes/period=61.9 $\mu$s/10 ns=6191

Refreshes are critical or data could be lost. The count value of 6191 is thus preferably reduced to account for possible delays in initiating a refresh sequence. By default the refresh cycle time is 5800.

Phase Lock Loop

At 100 MHz, the memory interface 2 has only 10 ns to propagate data on the memory bus. Some of this time is spent just propagating the data from the memory port. Additional time is lost due to bus capacitance. The data on the memory bus thus does not always have enough time to meet the setup and hold requirements of the input data registers in the SDRAM. To provide the extra time necessary to meet the timing requirements of the SDRAM, a digital phase lock loop (PLL) has been included. The phase lock loop essentially sends data slightly sooner than when data would be sent if no phase lock loop was present. The data and control can be advanced or retarded to account for additional delay factors such as bus loading, circuit board capacitance, and environmental conditions.

Figures 5C, 10:
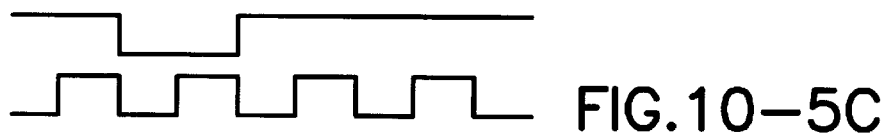
Figures 6, 10:
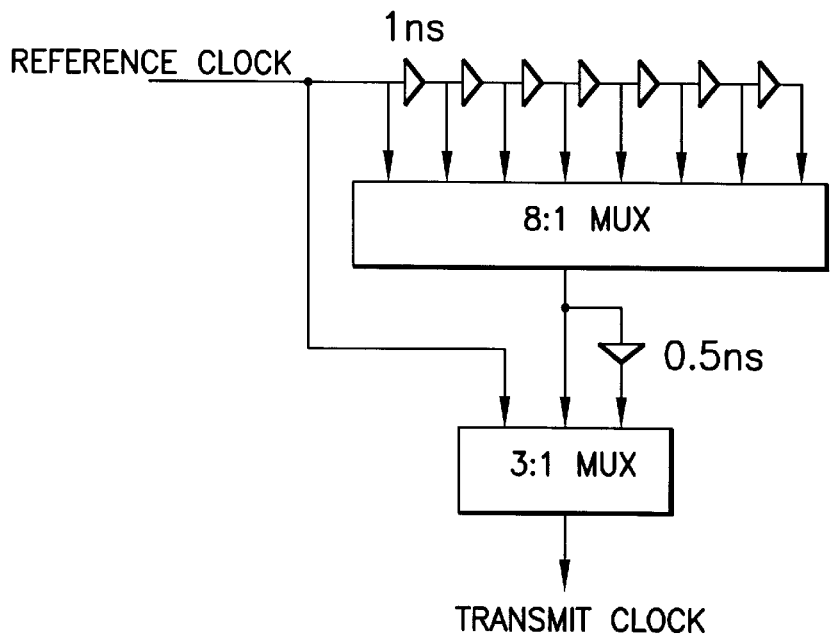
Figures 7, 10:
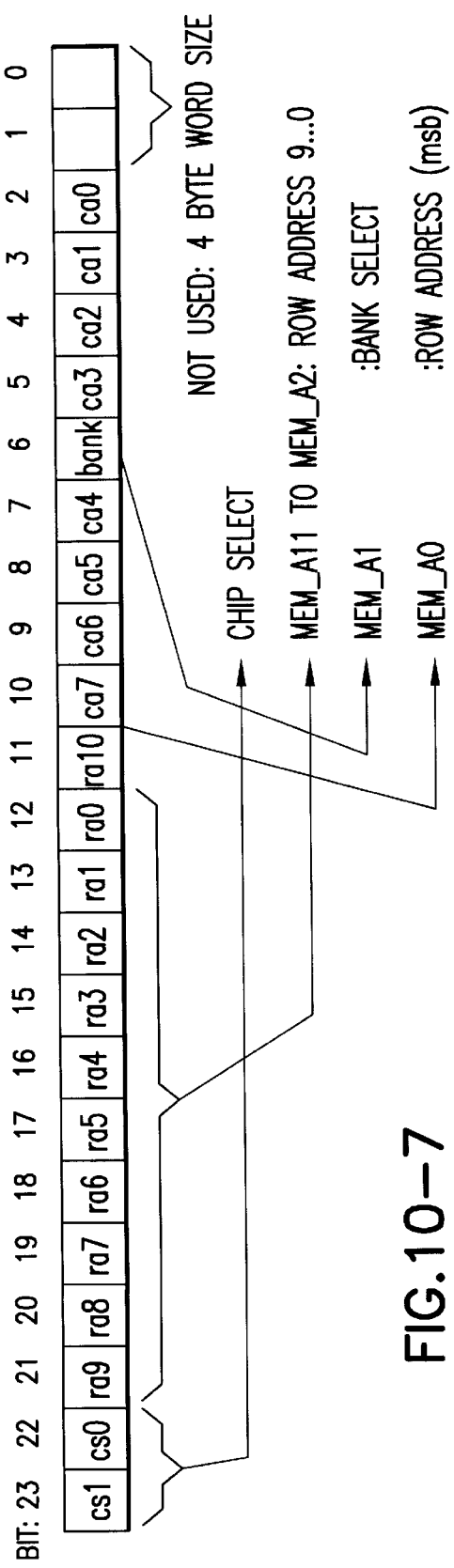
Figures 8, 10:
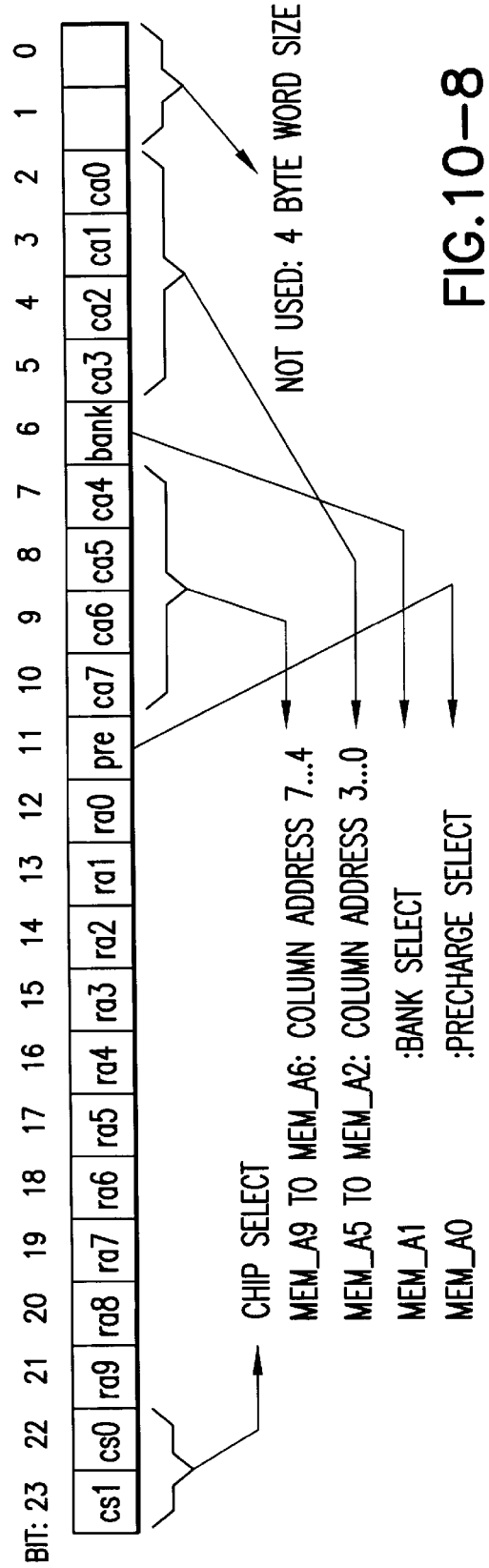
Figures 9, 10:
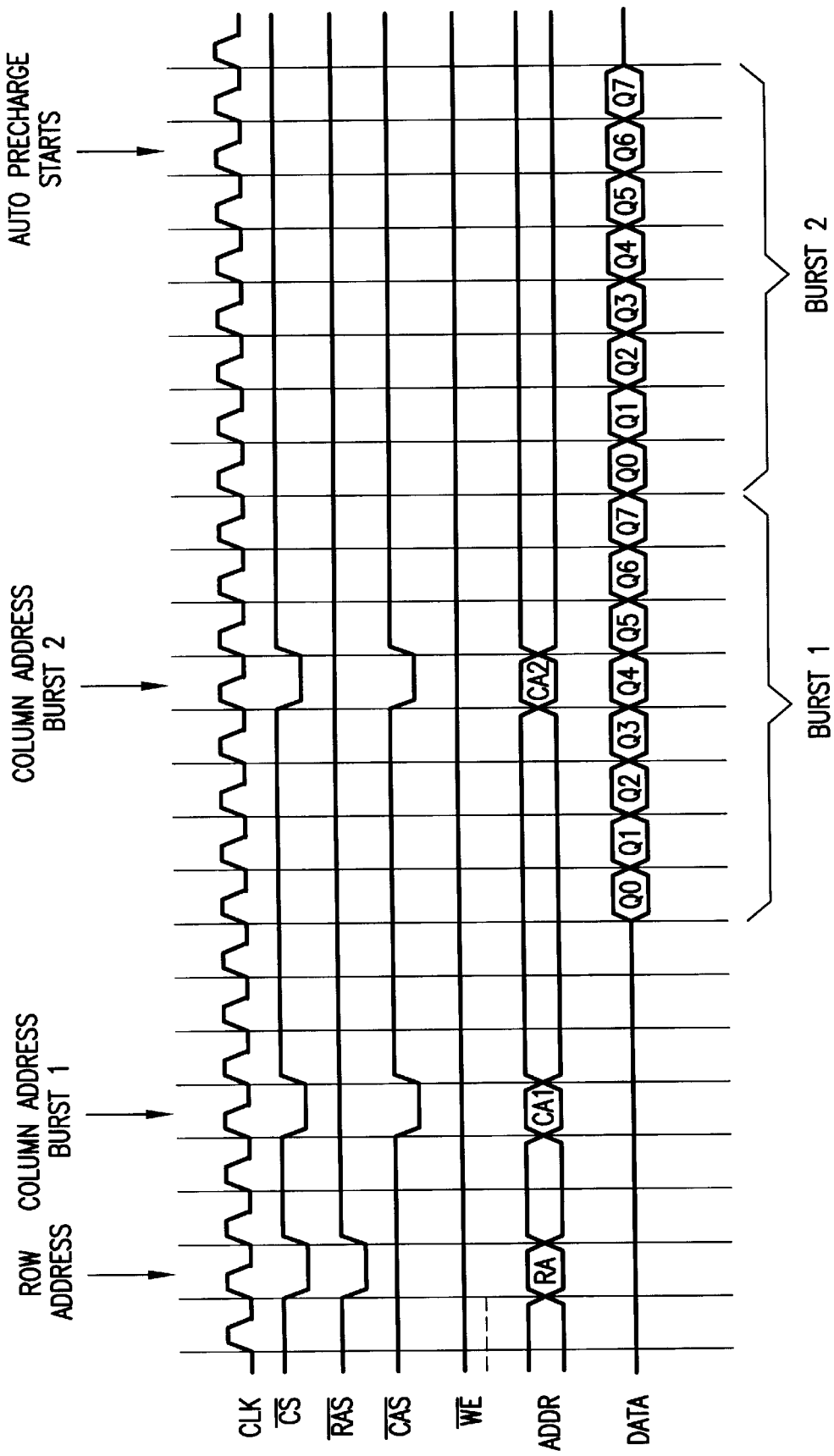
Figure 10:
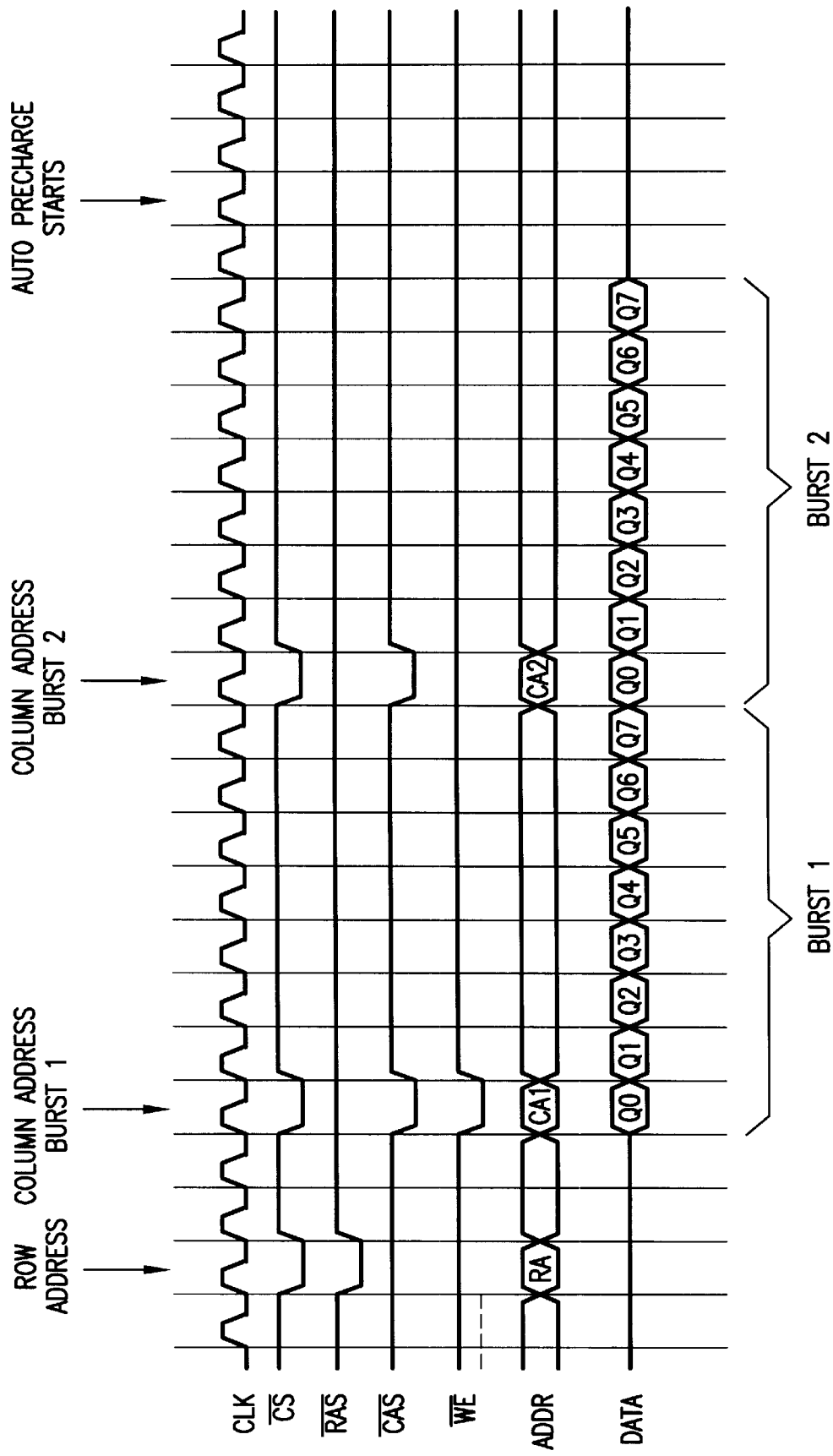

The phase lock loop functions by comparing a reference clock with feedback signal using a phase detector, as seen in FIG. 10-4, and adjusts the transmit clock using a phase shifter. If the feedback signal is fast, as seen in FIG. 10-5(A), then the phase shifter advances the transmit clock. If the feedback signal is too slow, as seen in FIG. 10-5(B), then the phase shifter retards the transmit clock. The desired condition is to have the feedback signal synchronous with the falling edge of the reference clock, as seen in FIG. 10-5(C). This allows for maximum setup and hold times for the SDRAMs.

The operation of the phase lock loop is very flexible. At reset, the state of host port pin 5 (HOST5) determines if the phase lock loop is enabled or disabled. Setting HOST5 disables the phase lock loop. If it is disabled the value on the Host port pins 4 . . . 0 is used to retard or advance the clock to the specified phase. The value on HOST4 is inverted for the PLL. Once disabled the DSP Chip 1 must be reset to enable the phase lock loop again. If the phase lock loop is enabled then it operates automatically to sense the phase of the transmission clock, unless the user fixes the phase using the PLL control bits (described below).

With the phase lock loop fixed, the phase shifter (see FIG. 10-6) sets the transmit clock phase to the value specified with the PLL code bits, making the change during the next auto refresh sequence. The phase lock loop does not adjust the clock until it is again enabled for automatic sensing. The resolution of the digital phase lock loop is approximately 0.5 ns in 16 steps, with an additional by-pass state. The by-pass state allows the phase lock loop to run in phase with the memory interface clock (MEM CLK).

Since the bus characteristics are a very slow dynamic system the phase lock loop does not need to be constantly sensing the bus. Only when a refresh sequence is initiated does the digital phase lock loop sense the bus and advance or retard the transmit clock if necessary. The memory bus is quiet during an auto refresh so this proves to be a good time to adjust the timing.

Memory Addresses

The memory address is configured in such a way as to make it possible to interface with a variety of SDRAM sizes. There are two addresses that are used when accessing data, row addresses and column addresses.

Row Address

The row address is constructed from the more significant address bits as seen in FIG. 10-7. Bit 6 is used to select the bank for row access. Bit 11 is the most significant bit (MSB) of the row address and has an alternate function for column addresses. Bits 12 to 21 form the remainder of the row address.

If a larger SDRAM is used then the chip select bits are appended to the row address bits, with bit 11 remaining the most significant bit. If the SDRAM memory is sufficiently large then there may not be any chip select bits, indicating that only one level of memory exists on the memory bus. When the DSP Chip 1 is configured for a memory of this size it generates the one and only chip select, allowing the higher order bits to be used as part of the row address.

Column Address

The column address is constructed from the low order address bits as seen in FIG. 10-8. Bit 6 is used to select the bank which has an activated row. Bits 10 to 7 and 5 to 2 are concatenated to form a column address on the selected row. Bit 11 is used to indicate an auto precharge at the completion of burst transfer. The auto precharge is set only on the second burst of eight, as the first burst does not need to be precharged. As with the row address, the chip select bits, if any, are determined by the memory configuration.

Read Cycle

The read cycle contains two, back-to-back transfers of 8 words followed by an automatic precharge cycle, as seen in FIG. 10-9. The read sequence is begun by activating a row from one of the two banks by asserting a row address, part of which contains the bank select, in conjunction with a row address strobe (RAS). Three cycles must elapse before asserting a column address because the access latency for the SDRAM is set for three.

Again, three cycles must elapse before the data becomes available. After the first word is received the SDRAM will continue to burst seven additional words. Three cycles before the end of the burst transfer, a second column address with an offset of 32 bytes from the first column address is applied. The data from the second read becomes available after a three-cycle latency. However, since the column address was applied early to compensate for pipeline delays, a continuous stream of data is maintained.

At the same time the second column address is applied, the precharge select is set. Setting auto precharge signals that the SDRAM must precharge the current row after transferring the requested data. Due to pipelining, the precharge actually starts one cycle before the clock that indicates the last data word output during the burst.

Write Cycle

The write cycle contains two, back-to-back transfers of eight words followed by an automatic precharge cycle as seen in FIG. 10-10. The write sequence is begun by activating a row from one of the two banks by asserting a row address, part of which contains the bank select, in conjunction with a row address strobe (RAS). Three cycles must elapse before asserting a column address because the access latency for the SDRAM is set for three.

On the same cycle that the column address is applied, data must be asserted on the inputs. For eight consecutive cycles a data word must be applied. At the end of the burst of eight, a second column address is applied followed by an additional eight words, one word per cycle.

As with the read sequence, when the second column address is applied, the precharge select is set. The write with precharge is similar to the read with precharge except when the precharge actually begins. The auto precharge for writes begins two cycles after the last data word is input to the SDRAM.

Memory Bank Switching

After every 64-byte transfer an automatic precharge to the current bank is initiated. This is done to simplify the memory interface 2 by alleviating the need to keep track of how long the current row has been active. While precharge is active no reads or writes may be initiated to the same bank. However, a read or write may be initiated to the other bank provided the address required is located there.

To increase the probability of data being in the other bank, the memory interface 2 ping-pongs every 64-byte page from bank 0 to bank 1. If data is accessed sequentially then a constant data stream can be supported, if random accesses are made to the SDRAM then there is a possibility of two required addresses being in the same bank. If this occurs then the memory interface 2 must stall for a number of cycles to allow the row precharge to complete.

Control Registers

The memory interface 2 has two control registers which are accessed as extended registers. One of these control registers is for the refresh logic and the other control register is for memory interface control.

Refresh Register

FIG. 10-10A depicts the format of the refresh register.
Refresh Cycle Time (bits 13 . . . 0)

The refresh cycle time is the value loaded into the free-running refresh counter when the counter reaches zero. The courter then begins counting down with this newly loaded value. By changing the refresh cycle, the user has control of the refresh rate for the SDRAM(s) on the memory interface 2 bus. The refresh cycle time can be set from 0h to 3FFFh (0 to 16383) memory interface cycles.

| Use-As-Fill Control (bits 16. . .14) | |
| --- | --- |
| bit 14 | use-as-fill |
| 0 | disabled |
| 1 | enabled |
| bit 14. . .15 | access advance |
| 00 | no advance |
| 01 | advance 1 cycle |
| bit 16. . .15 | access advance |
| 10 | advance 2 cycles |
| 11 | advance 3 cycles |

Use-as-fill is a performance enhancing option. By enabling the use-as-fill mode the instruction cache 11 and data cache 12 allow reads when the requested data has been stored in the cache, even if the entire cache page has not been loaded yet. Hence the term use-as-fill, i.e., the data can be used while the memory interface 2 fills the page. With use-as-fill disabled the memory interface 2 must complete a page transfer before allowing the caches 11 and 12 to continue normal functioning.

Since the memory interface 2 and caches are on different frequencies they need to synchronize the control signals between them. To negate the synchronization delays the user can select between 0 and 3 cycles to advance the control signal that indicates the memory is updating a cache page. The caches use this signal to determine when use-as-fill can be performed, provided use-as-fill is enabled.

To determine advancement the user needs to know the CPU clock period and the memory interface 2 clock period. The number of cycles of advance times the memory interface 2 period should not exceed the period of one CPU clock:

CPU clock period>number of cycles to advance*memory interface clock period

Control Register

FIG. 10-10B depicts the format of the control register.
SDRAM Mode (bits 6 . . . 0)

| SDRAM Mode (bits 6. . .0) | |
| --- | --- |
| bit 0 | wrap type |
| 0 | sequential |
| 1 | interleave |
| bits 3. . .1 | latency mode |
| 000 | reserved |
| 001 | 1 cycle |
| 010 | 2 cycles |
| 011 | 3 cycles |
| 100 | reserved |
| 101 | reserved |
| 110 | reserved |
| 111 | reserved |
| bits 6. . .4 | mode register |
| 000 | normal |
| 001–111 | reserved |

The SDRAM mode bits do not control the memory interface 2. Rather they reflect the configuration of the mode bits in the SDRAM. When any of these bits is changed the memory interface 2 issues a mode register update sequence to program the SDRAM mode register accordingly.

The wrap type specifies the order in which burst data will be addressed. This order can be programmed in one of two modes-sequential or interleaved. The DSP Chip 1 is optimized for use with sequential addressing.

The latency mode controls the number of clocks that must elapse before data will be available. Latency mode is critical parameter to be set for the SDRAM. The DSP Chip 1 is optimized for use with a 3-cycle latency mode.

The mode register bits are vendor specific bits in the SDRAM mode register.

| Phase Lock Loop (bits 12. . .7) | |
| --- | --- |
| bits 10. . .7 | PLL Code |
| 0000 | 1.0ns |
| 0001 | 1.5ns |
| 0010 | 2.0ns |

-continued

| Phase Lock Loop (bits 12...7) | |
|---|---|
| 0011 | 2.5ns |
| 0100 | 3.0ns |
| 0101 | 3.5ns |
| 0110 | 4.0ns |
| 0111 | 4.5ns |
| bits 10...7 | PLL Code |
| 1000 | 5.0ns |
| 1001 | 5.5ns |
| 1010 | 6.0ns |
| 1011 | 6.5ns |
| 1100 | 7.0ns |
| 1101 | 7.5ns |
| 1110 | 8.0ns |
| 1111 | 8.5ns |
| bit 11 | clock by-pass |
| 0 | phase select clock |
| 1 | interface clock |
| bit 12 | run mode |
| 0 | automatic |
| 1 | fixed phase |

The phase lock loop control bits are provided to allow the user to program the phase lock loop to a specific phase, or to read the current configuration. If the PLL run mode is set to automatic, then writing bits 11 ... 7 has no effect. However, reading these bits provides the current phase shifter configuration. If the PLL run mode is set to fixed phase, then writing to bits 11 ... 7 will manually configure the phase shifter to the specified value, overriding any previous settings.

The clock by-pass bit is provided to set the transmit clock in phase with the clock of the memory interface 2. The PLL run mode must be configured for fixed phase in order for the clock by-pass to remain set.

| Memory Configuration (bits 14...13) | |
|---|---|
| bits 14...13 | memory configuration |
| 00 | 4 × 16 b × 2 MB |
| 01 | 4 × 32 b × 1 MB |
| 10 | 1 × 16 b × 8 MB |
| 11 | 2 × 32 b × 8 MB |

Figures 10, 11:
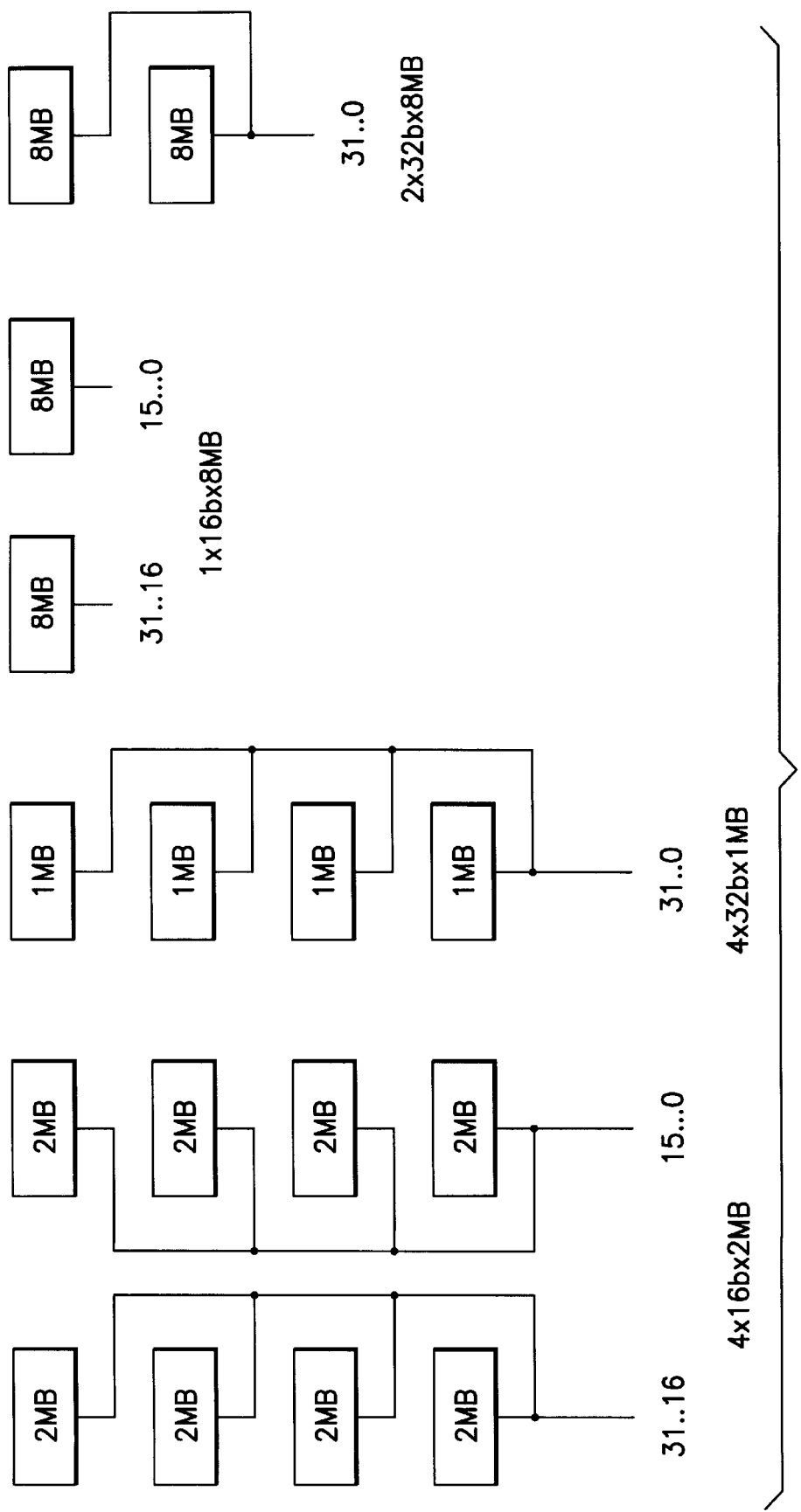
Figures 1, 11:
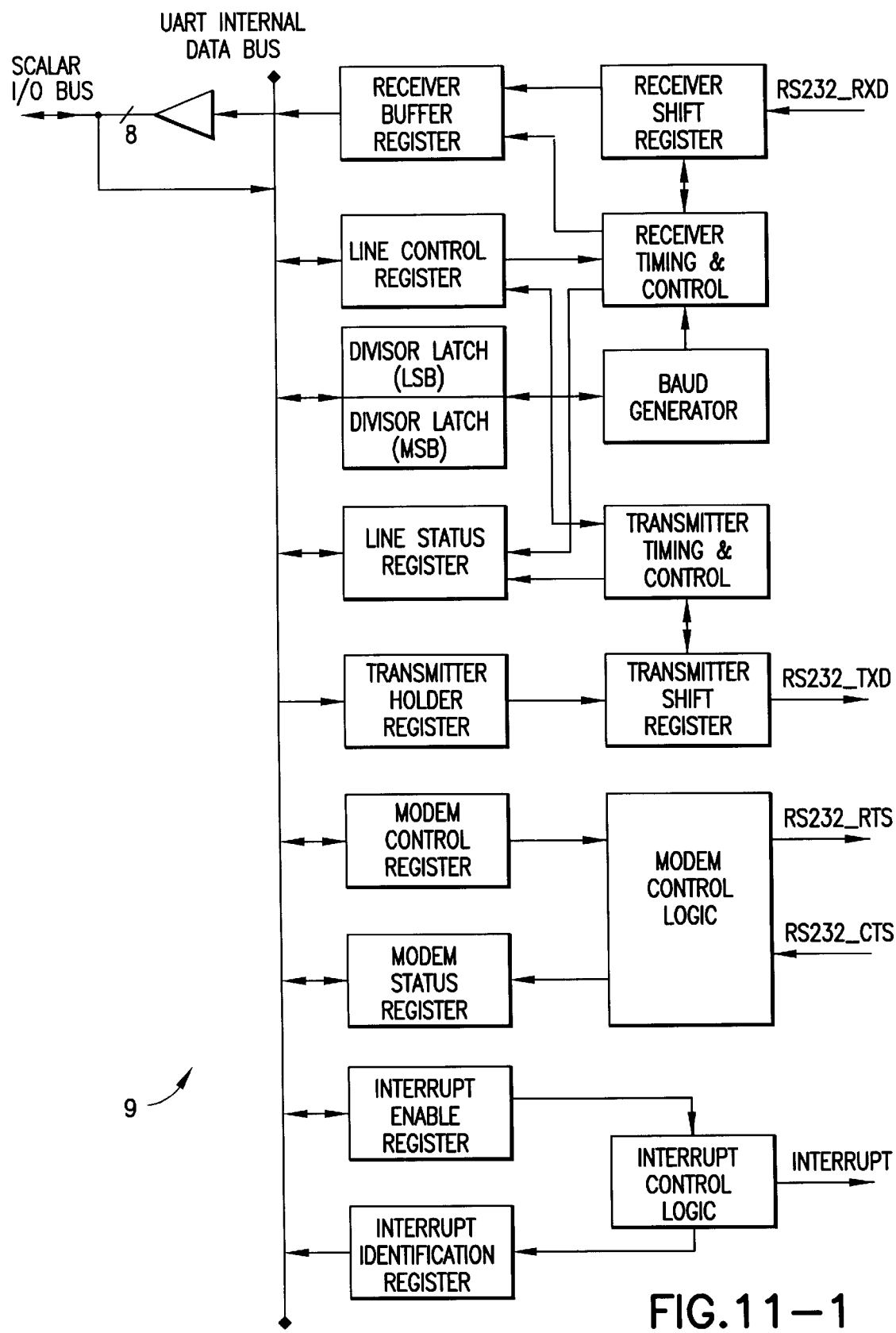

The DSP Chip 1 supports four different memory configurations. The memory configuration is set from host port pins 7 and 6 (HOST7 and HOST6) when the DSP chip 1 is reset. Two of the memory configurations allow interfacing to 16-bit SDRAMs and the other two are for interfacing with 32-bit SDRAMS. These four memory configurations are illustrated in FIG. 10-11. The default configuration is 4×16b×2 MB.

UART 9

The DSP Chip 1 also includes the built-in Universal Asynchronous Receiver/Transmitter (UART) 9. A block diagram of the DSP UART 9 is found in FIG. 11-1. The UART 9 performs serial-to-parallel conversion of data received at its RS232_RXD pin and parallel-to-serial conversion of data applied to its RS232_TXD pin. The UART 9 is entirely interrupt driven, that is each time a byte is received or transmitted a hardware interrupt is generated to prompt the operating system to supply the UART 9 with additional data or to store the currently received data.

The UART 9 provides four interfacing pins. These pins are RS232_RXD for receive data, RS232_TXD for transmit data, RS232_CTS for clear to send, and RS232_RTS for request to send. The clear to send can generate hardware interrupts, which is useful for handshaking protocols; using the request to send and clear to send as the two passes signals.

Control Registers

The control registers affect the operation of the UART 9 including the transmission and reception of data. There are seven 8-bit UART 9 control registers, as follows: receive buffer/transmitter holding register; interrupt enable register; interrupt identification register; line control register; modem control register; line status register and modem status register.

Receive Buffer/Transmitter Holding Register

The receive buffer/transmitter holding register has a dual purpose. Data written to this register is moved to the transmitter register for transmission serial-fashion out the RS232_TXD pin. Data read from this register was received from the RS232_RXD pin. This register thus serves as the parallel-to-serial and serial-to-parallel conversion point.

When the divisor latch access bit is set, this register is the least significant byte of the divisor latch.

Interrupt Enable Register

This register is responsible for enabling the four UART 9 interrupts. When the Divisor Latch Access bit is set, this register is the most significant byte of the Divisor Latch. The bits of the Interrupt Enable Register are detailed below:

| | |
|---|---|
| Bit 0: | This bit enables the receiver data available interrupt (second). |
| Bit 1: | This bit enables the transmitter holding buffer empty interrupt (third). |
| Bit 2: | This bit enables the clear to send (CTS) interrupt (lowest). |
| Bits 7...4: | Always logic 0. |

Interrupt Identification Register

The interrupt identification register contains an identification code indicating the type of interrupt pending. The UART 9 prioritizes four interrupts and sets the interrupt identification register according to the highest priority received. The contents of the register are "frozen" to prevent additional interrupts from destroying the current status. The interrupts are prioritized according to the table below:

| Bit (2...0) | Priority | Description |
|---|---|---|
| 001 | | no interrupt pending |
| 110 | highest | over-run error, parity error, framing error, or break error |
| 100 | second | receiver data available |
| 010 | third | transmitter holding buffer empty |
| 000 | lowest | clear to send interrupt |

Line Control Register

The line control register contains bits to control the format of the asynchronous data exchange. The divisor latch access bit is also set using the line control register. The divisor latch controls the transmit baud rate. The line control register bits are detailed below:

Bits 0 and 1: These bits control the number of bits in each serial character using the following encoding:

| Bit (1. . .0) | Character Length |
|---|---|
| 00 | 5 bits |
| 01 | 6 bits |
| Bit (1. . .0) | Character Length |
| 10 | 7 bits |
| 11 | 8 bits |

Bit 2: This bit controls the number of stop bits transmitted or received for each character.

| Bit 2 | Stop Bits |
|---|---|
| 0 | 1 bit |
| 1 | = 00 then 1.5 bits |
| | if bits$_{1...0}$ |
| | 01, 10, 11 then 2 bits |

Bit 3: This bit controls the parity. Parity is enabled by setting this bit. Clearing the bit will disable parity generation or checking.

Bit 4: This bit selects the type of parity when parity is enabled. If this bit is cleared then odd parity is transmitted or checked. If the bit is set then even parity is transmitted or checked.

Bit 5: This bit controls the stick parity. Clearing bit 5 disables stick parity. If even parity is enabled and bit 5 is set, then the parity bit is transmitted and checked as a logic 0. If odd parity is enabled and bit 5 is set, then the parity bit is transmitted and checked as a logic. 1.

Bit 6: This bit serves as the break control bit. If this bit is set then the serial output (RS232_RXD) is forced to the spacing (logic 0) state. Clearing the bit disables break control.

Bit 7: This bit controls the divisor latch access. This bit must be set to access the divisor latch of the baud generator. Clearing this bit allows access to the receiver buffer/transmitter holding buffer or the interrupt enable register.

Modem Control Register

This register contains information for controlling the UART 9 interface. The modem control register bits are detailed below:

Bit 0: This bit has no effect on the UART 9.

Bit 1: This bit is the request to send signal (RS232_RTS). Setting this bit causes the RS232_RTS pin to output a logic 1. Clearing this bit forces the RS232_RTS pin to output a logic 0.

Bit 3 and 2: These bits have no effect on the UART 9.

Bit 4: This bit enables the local feedback path for diagnostic testing. Internally the UART 9 connects the RS232_RXD pin to the RS232_TXD pin to loop transmitted data back to the receive side of the UART 9.

Bit 7 . . . 5: Always logic 0.

Line Status Register

This register contains information on the status of the data transfer. The line status register bits are detailed below:

Bit 0: This bit is the receiver buffer ready indicator. This bit is set by the UART 9 when a character has been received and transferred into the Receiver Buffer. Bit 0 is cleared when the contents of the receiver buffer are read.

Bit 1: This bit is the overrun error indicator. If a character is received before the contents of the receiver buffer are read then the new character will overwrite the contents of the receiver buffer, causing an overrun. This bit is cleared when the line status register is read.

Bit 2: This bit is the parity error indicator. This bit is set by the UART 9 when the received character does not have a stop bit. Reading the contents of the line status register will clear the framing error indicator. If there is a framing error, then the UART 9 assumes that the Start bit to follow is also a Stop bit, therefore the Start bit is "read" twice in order to resynchronize data.

Bit 4: This bit is the break interrupt indicator. This bit is set by the UART 9 when the received data is held in the spacing state longer than a full word transmission time. Reading the contents of the line status register clears this bit.

Bit 5: This bit is the transmitter holding register empty indicator. This bit causes the UART 9 to generate an interrupt for the transmitter holder register to be loaded with additional data. Loading data into the transmitter holder buffer clears bit 5.

Bit 6: This bit is the transmitter empty indicator. When the UART 9 has no more data to transmit then this bit is set, indicating the transmitter register and transmitter holding register are both empty. Loading the transmitter holder register with data clears bit 6.

Bit 7: Always logic 0.

Modem Status Register

This register provides the DSP Chip 1 with the current state of the UART 9 control lines. When the scalar processor 5 reads the modem status register the contents are automatically cleared. The modem status register bits are detailed below:

Bit 0: This bit is the delta clear to send indicator. If the clear to send pin (RS232_CTS) has changed state since the last time the scalar processor 5 read the clear to send status bit.

Bit 3 . . . 1: Always logic 0.

Bit 4: This bit is the complement of the clear to send input (RS232_CTS).

Bit 7 . . . 5: Always logic 0.

Baud Rate Generator

The UART 9 is capable of transmitting using a frequency derived from the CPU clock divided by the value stored in the 16-bit Divisor Latch. The Baud rate can be between CPU_frequency to CPU_frequency$\div 2^{16}-1$. When the divisor latch access bit is set, then the divisor latch can be accessed as the receiver buffer/transmitter holding buffer for bits 7 . . . 0 and the interrupt enable register for bits 15 . . . 8. Clearing the divisor latch access bit reverts the two aforementioned registers back to their normal state.

Serial Bus 10

The DSP Chip 1 has a 2-wire serial bus that allows connection to multiple devices that utilized the same serial bus protocol. The serial bus 10 is an 8-bit oriented, bidirectional transfer interface that can operate at 78 kbits/sec. One important purpose for the serial bus 10 is to provide an interface to an external EEPROM that contains the above-described bootstrap routine.

The serial bus 10 interface can only be accessed through the host parallel port 3C. When the host parallel port 3C is in serial master mode, the port becomes dedicated to the serial bus 10 and cannot be simultaneously used as a parallel port.

The DSP Chip 1 serial bus 10 interface should be the only master on the bus since it does not have any built-in arbitration logic. With the DSP as a single master, the serial bus must be populated with only slave devices, i.e., devices that can respond to requests but cannot generate requests of their own. The DSP Chip 1 can be a receiving-master (reading data from a slave device) or a transmitting-master (writing data to a slave device).

Transfer Protocol
Beginning and Ending Transfers

Figures 4, 12:
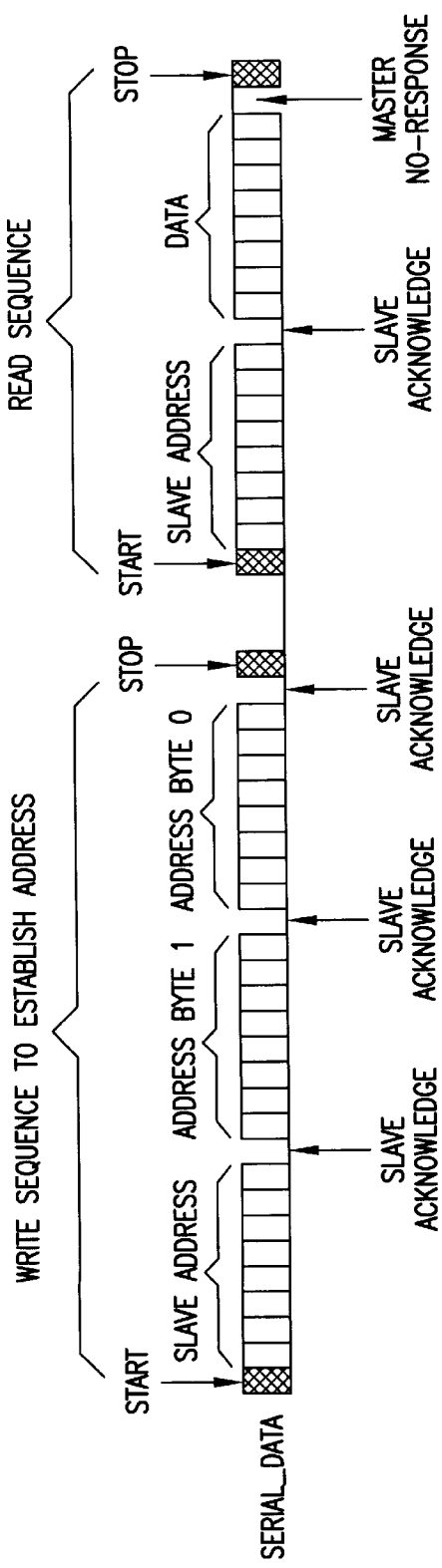
Figures 5, 12:
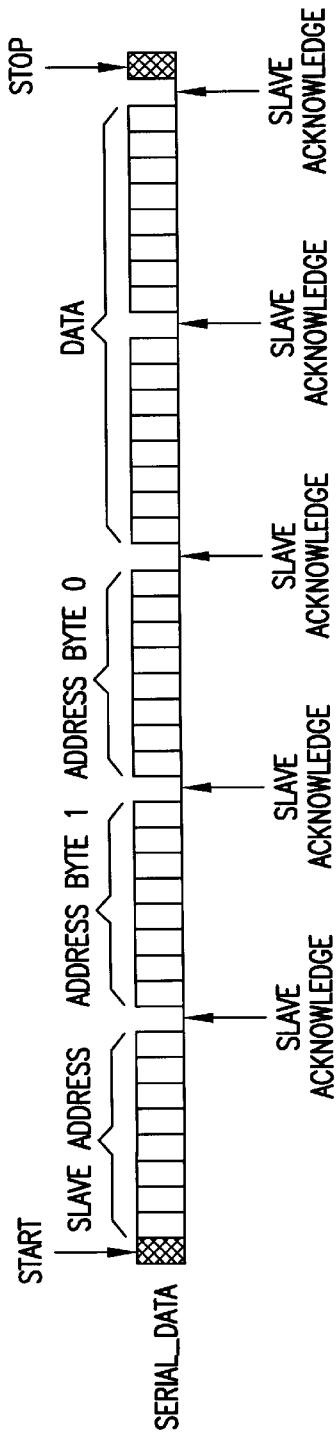

The DSP Chip 1 begins a transfer by creating a high to low transition of the data line (serial_data) while the clock line (serial_clk) is high, as seen in FIG. 12-1. All slaves on the bus will not respond to any commands until the start condition has been met. Following the start condition the serial bus 10 interface transmits a 24-bit header, which is then followed by the data to be read or written.

To terminate a transfer, the DSP Chip 1 creates a low to high transition of the data line while the serial clock line is high, as seen in FIG. 12-2. The serial bus 10 interface creates a termination condition only after all data has been transferred.

Serial Bus Header

Any time the serial bus 10 begins a transfer it sends a 24-bit header that is taken from the destination address register in the host parallel port 3C. The header contains information for addressing a specific device on the bus and the beginning address of a location to access. FIG. 12-3 shows the format for the header.

The dt3, dt2, dt1, dt0 bits are used as a device type identifier. The type identifier is established by a manufacturer. The ds2, ds1, ds0 bits are used to select one of eight devices with the matching type identifier. This allows for up to eight identical devices on the serial bus 10. Although 16 bits have been provided for addressing, most slaves on the serial bus 10 will never require this many bits of addressing.

When transmitting the header, the slave address is sent first, followed by address byte 1 and then address byte 0. The serial bus 10 is completely software controlled. The user is responsible for initializing the appropriate registers to control the serial bus 10 interface.

Sequential Read

To read from a slave device, and referring to FIG. 12-4, a zero transfer size write sequence must be performed to initialize the slave device with the correct address. Immediately following the write sequence, a read sequence can begin.

Once the destination address register has been correctly initialized, the serial write transfer can begin. The DSP Chip 1 will send a start condition followed by the 3 bytes in the source address. Between each sent byte, the serial bus 10 interface waits for the slave to send an acknowledge. Once the acknowledge has been received, transfer of the next byte resumes.

With a transfer size of zero, the serial interface terminates the transfer after three bytes have been sent with a stop condition. This initializes the-slave with an address. Next, the user sets a transfer size for the number of bytes to read from the slave.

With the newly initialized control registers, a serial read transfer can begin. The DSP Chip 1 sends a slave address and then expects to receive a series of sequential bytes. The serial bus 10 interface responds between each byte with an acknowledge until all the data has been received. After all the data has been received the serial bus 10 interface sends a stop condition to terminate the transfer.

Sequential Write

Writing to a slave device is similar to reading in that a write sequence begins the transfer. However, the transfer can continue sending data after sending a three byte header.

Referring to FIG. 12-5, the write sequence is begun by initializing the proper control registers in the host port 3C and setting the transfer enable bit in the port status register. The DSP Chip 1 then sends a start condition followed by the three bytes in the destination address. Once the three bytes have been sent the serial bus 10 interface continues to send data from the appropriate address in the DSP's memory. The slave responds between each sent byte with an acknowledge. Once the transfer size has been reached the serial bus 10 interface sends a stop condition to terminate the transfer.

Test Modes

The DSP Chip 1 does not contain scan path logic for testing internal nodes. However, some signals can be observed using the DSP's four test modes. Two pins are provided for selecting a test mode, Test 0 and Test 1. The results for each test mode can be observed from the host port 3C (Host15 . . . Host0). A table of the test modes is seen below.

| Test (1. . .0) | Description |
| --- | --- |
| 00 | normal mode |
| 01 | observe PC |
| 10 | observe Memory Address Register |
| 11 | observe I-cache/D-cache Addresses |

Normal mode links the output register of the host parallel port 3C to the host port pins. The other test modes force the host port pins on and propagate a selected test vector. Since the host port pins are forced on, the user is responsible for requiring that the bus is not being driven by an external device.

Figures 1, 13:
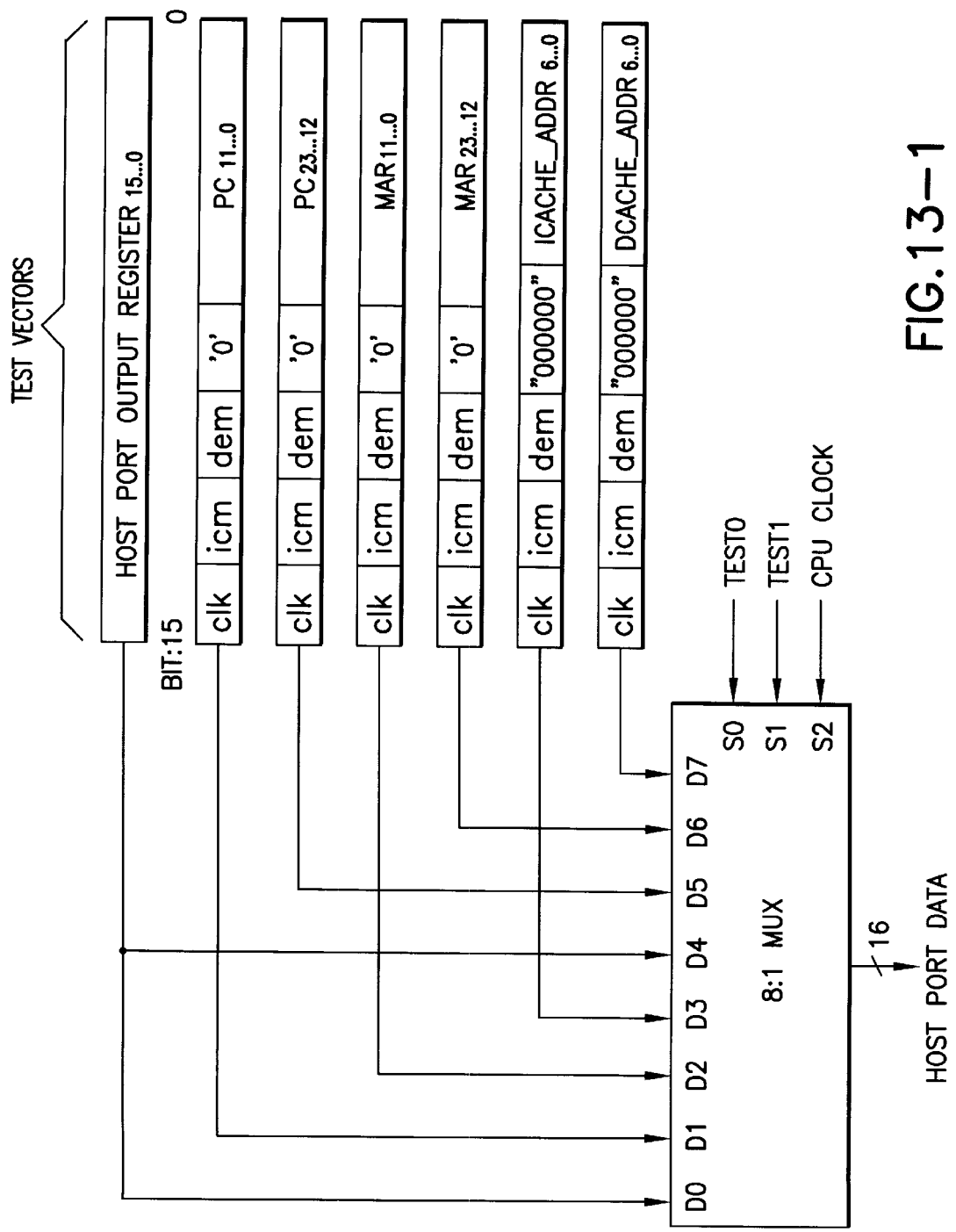

Since the external bus of the Host port is only 16 bits wide and the internal signals that can be observed are 24 bits wide, the DSP Chip 1 uses the first half of a clock cycle to output the lower 12 bits of a vector and the second half of a clock cycle to output the upper 12 bits. Regardless of the current test vector being observed, the DSP Chip 1 always propagates the cache miss signals for both caches, labeled icm and dcm, and the CPU clock, labeled clk. A block diagram of test vector selection is seen in FIG. 13-1.

The PC is the value of the program counter that is used to fetch instructions. The MAR is the address used by the instruction cache 11 (this may be the same as the PC for some cases). The ICACHE_ADDR is the actual address used to fetch data from the instruction cache 11 matrix. The matrix is 128 rows by 64-bits, and the ICACHE_ADDR addresses one of the 128 rows. The DCACHE_ADDR functions the same except applies to the data cache 12.

The Appendix provides a listing of all of the input/output pins of the DSP Chip 1, as well as a brief description of their function.

It should be now be appreciated that the DSP Chip 1 of this invention can be applied with advantage to the processing of data in real time or substantially real time, and can be used in applications such as, but not limited to, communications devices, image processors, video processors, pattern recognition processors, encryption and decryption processors, authentication applications as well as image and video compression applications. A realtime analysis of one or more fingerprints for identifying and authenticating a user of a device, such as an electronic lock, is but one example of an important application for the DSP Chip 1.

Thus, while the invention has been particularly shown and described with respect to preferred embodiments thereof, it will be understood by those skilled in the art that changes in form and details may be made therein without departing from the scope and spirit of the invention.

What is claimed is:

1. A digital data processor integrated circuit comprising:
a plurality of functionally identical first processor elements; and
a second processor element; wherein
said plurality of functionally identical first processor elements are bidirectionally coupled to a cache memory via a crossbar switch, and further comprising circuitry, operable during a single cycle, for performing an N-byte operand cache memory read access or an N-byte operand cache memory write access, where the N-byte operand is on other than an N-byte boundary in said cache memory, where N>1.

2. A digital data processor integrated circuit as in claim 1, wherein an operation of each of said plurality of first processor elements and an operation of said second processor element are locked together during an execution of a single instruction, the single instruction specifying in a first portion thereof, that is coupled in common to each of said plurality of first processor elements, the operation of each of said plurality of first processor elements in parallel, and in a second portion thereof the operation of said second processor element.

3. A digital data processor integrated circuit as in claim 1, and further comprising a motion estimator having inputs coupled to an output of each of said plurality of first processor elements.

4. A digital data processor integrated circuit as in claim 1, and further comprising an internal data bus coupling together a first parallel port, a second parallel port, a third parallel port, an external memory interface, and a data input/output of said first cache and said second cache.

5. A digital data processor integrated circuit comprising:

a plurality of functionally identical first processor elements; and a second processor element; wherein said plurality of functionally identical first processor elements are bidirectionally coupled to a first cache via a crossbar switch, and said second processor element is coupled to a second cache;

further comprising a motion estimator having inputs coupled to an output of each of said plurality of first processor elements, wherein said motion estimator operates in cooperation with said plurality of first processor elements to determine a best pixel distance value by executing a series of pixel distance calculations that are accumulated, and by a comparison for the best result.

6. A digital data processor integrated circuit comprising:

a plurality of functionally identical first processor elements; and a second processor element; wherein said plurality of functionally identical first processor elements are bidirectionally coupled to a cache memory via a data reordering logic block, and further comprising circuitry, operable during a single cycle, for performing an N-byte operand cache memory read access or an N-byte operand cache memory write access, where the N-byte operand is comprised of a plurality of discrete values operated on in parallel by said plurality of functionally identical first processor elements, and where the N-byte operand is stored on other than an N-byte boundary in said cache memory, where N>1.

7. A digital data processor integrated circuit comprising:

a plurality of functionally identical first processor elements; and a second processor element; wherein said plurality of functionally identical first processor elements are bidirectionally coupled to a cache memory via a data reordering logic block, and further comprising circuitry, operable during a single cycle, for performing an N-byte operand cache memory read access or an N-byte operand cache memory write access, where the N-byte operand is comprised of a plurality of discrete values operated on in parallel by said plurality of functionally identical first processor elements, and where the N-byte operand is stored in an interleaved manner in non-contiguous storage locations in said cache memory, where N>1.

8. A digital data processor integrated circuit, comprising;

a plurality of functionally identical first processor elements; and a second processor element; wherein said plurality of functionally identical first processor elements are bidirectionally coupled to said second processor element;

further comprising a third processor element having inputs coupled to an output of each of said plurality of first processor elements, wherein said third processor element operates in cooperation with said plurality of first processor elements to compute a value based on outputs of each of said plurality of first processor elements, wherein said third processor element is comprised of a motion estimation processor element.

9. A method for operating a digital data processor, comprising:

providing the digital data processor to include a plurality of functionally identical first processor elements and a second processor element;

bidirectionally coupling said plurality of fictionally identical first processor elements to a cache memory via a data reordering logic block; and during a single cycle, performing an N-byte operand cache memory read access or an N-byte operand cache memory write access, where the N-byte operand is comprised of a plurality of discrete values operated on in parallel by said plurality of functionally identical first processor elements, and where the N-byte operand is stored on other than an N-byte boundary in said cache memory, where N>1.

10. A method for operating a digital data processor, comprising:

providing the digital data processor to include a plurality of functionally identical first processor elements and a second processor element;

bidirectionally coupling said plurality of functionally identical first processor elements to a cache memory via a data reordering logic block; and during a single cycle, performing an N-byte operand cache memory read access or an N-byte operand cache memory write access, where the N-byte operand is comprised of a plurality of discrete values operated on in parallel by said plurality of functionally identical first processor elements, and where the N-byte operand is stored in an interleaved manner in non-contiguous storage locations in said cache memory, where N>1.

11. A method for operating a digital data processor, comprising:

providing the digital data processor to include a plurality of functionally identical first processor elements and a second processor element;

further providing a third processor element having inputs coupled to an output of each of said plurality of first processor elements; and operating said third processor element in cooperation the said plurality of first processor elements to compute a value based on outputs of each of said plurality of first processor elements, wherein said third processor element is comprised of a motion estimation processor element.

* * * * *